Sept. 22, 1942.   B. C. GOLDEN   2,296,783
BAG STRINGING MACHINE
Filed July 20, 1940   21 Sheets-Sheet 2

Fig. 2.

Bertie C. Golden,
INVENTOR

Sept. 22, 1942.　　　B. C. GOLDEN　　　2,296,783
BAG STRINGING MACHINE
Filed July 20, 1940　　　21 Sheets-Sheet 5

Bertie C. Golden, INVENTOR
BY Victor J. Evans & Co.
ATTORNEYS

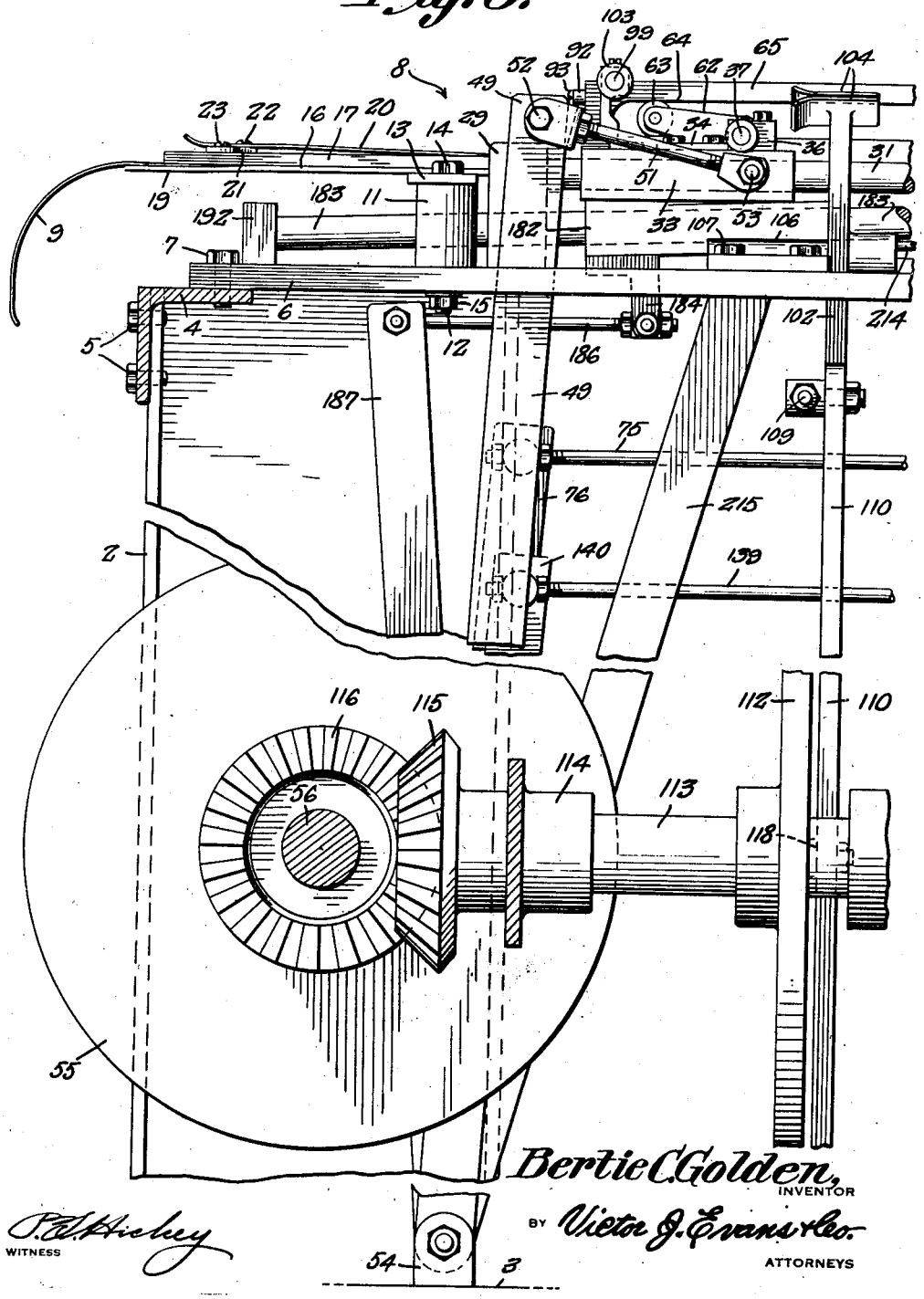

Sept. 22, 1942.   B. C. GOLDEN   2,296,783
BAG STRINGING MACHINE
Filed July 20, 1940   21 Sheets-Sheet 7
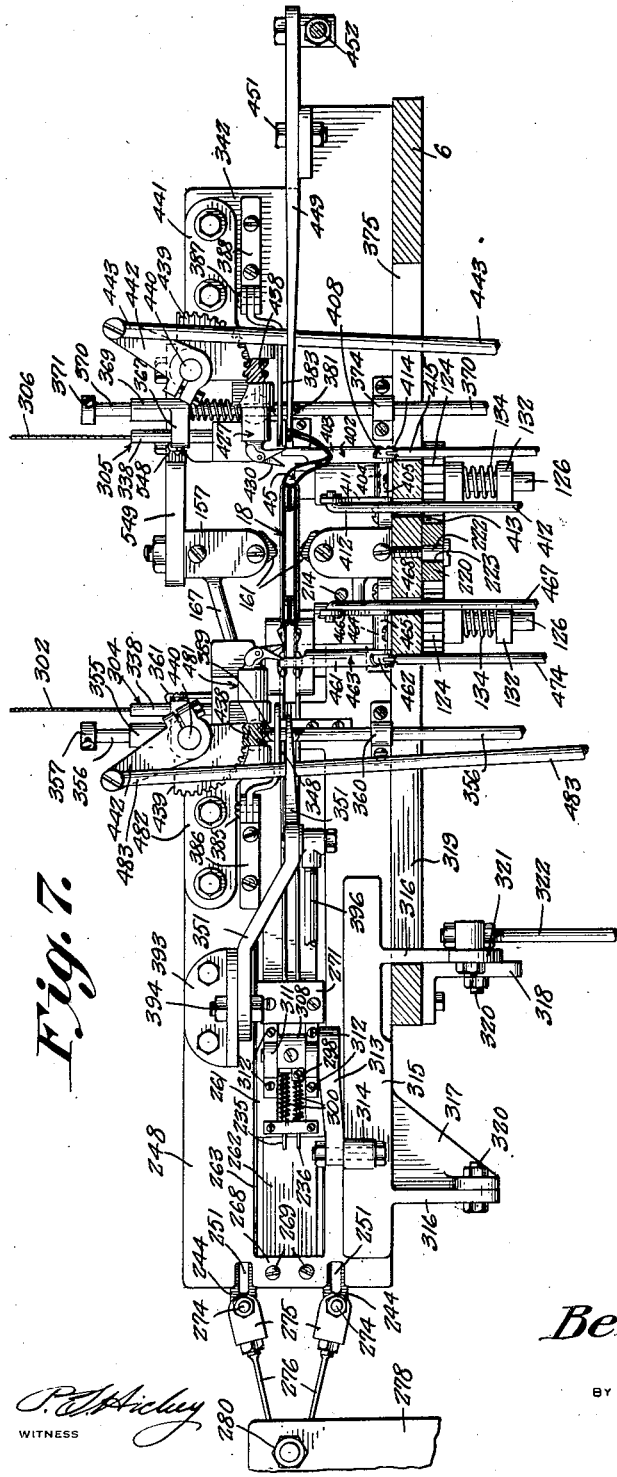
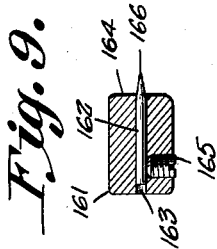
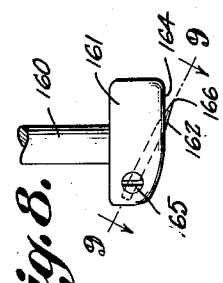
Bertie C. Golden,
INVENTOR
BY Victor J. Evans & Co.
ATTORNEYS

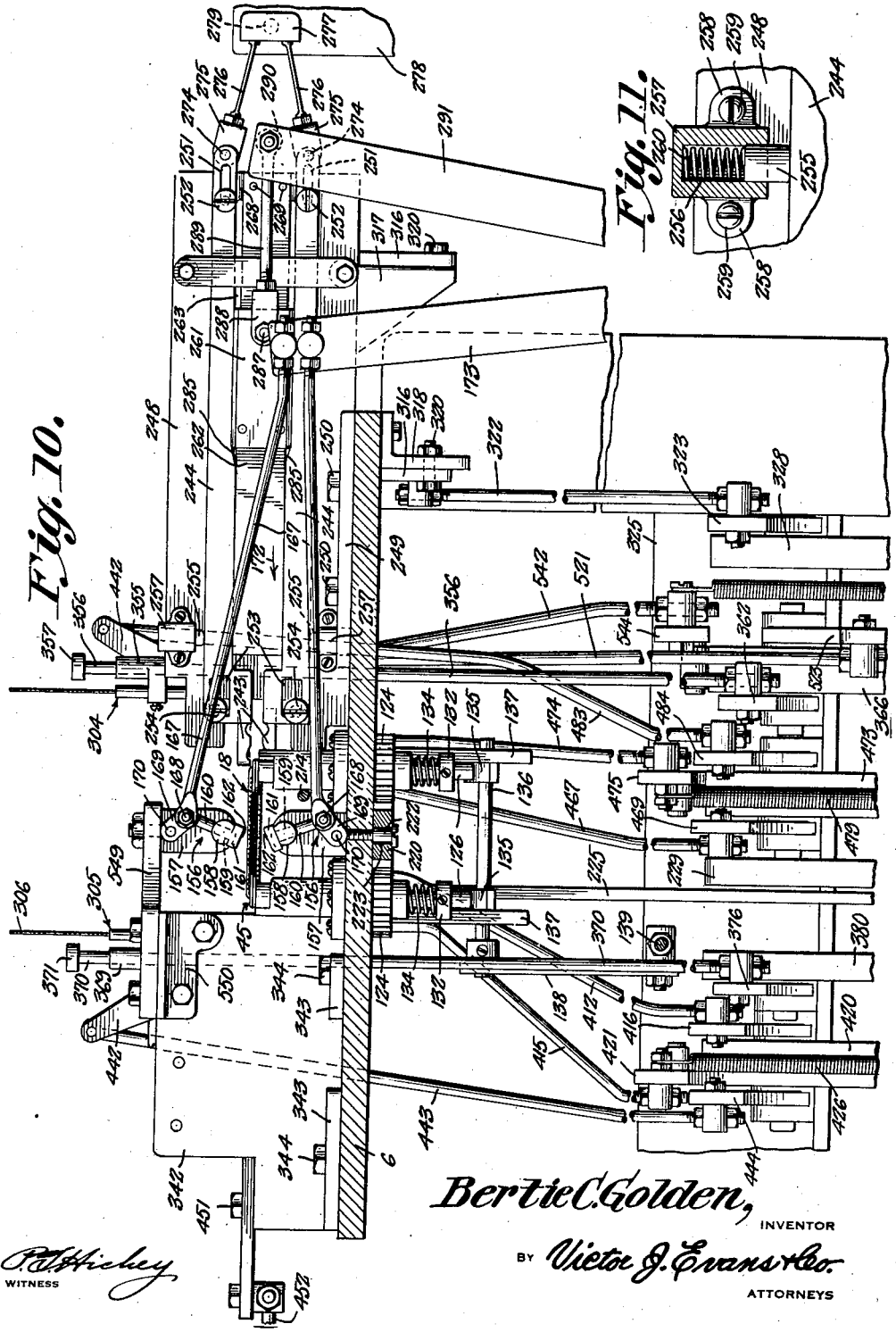

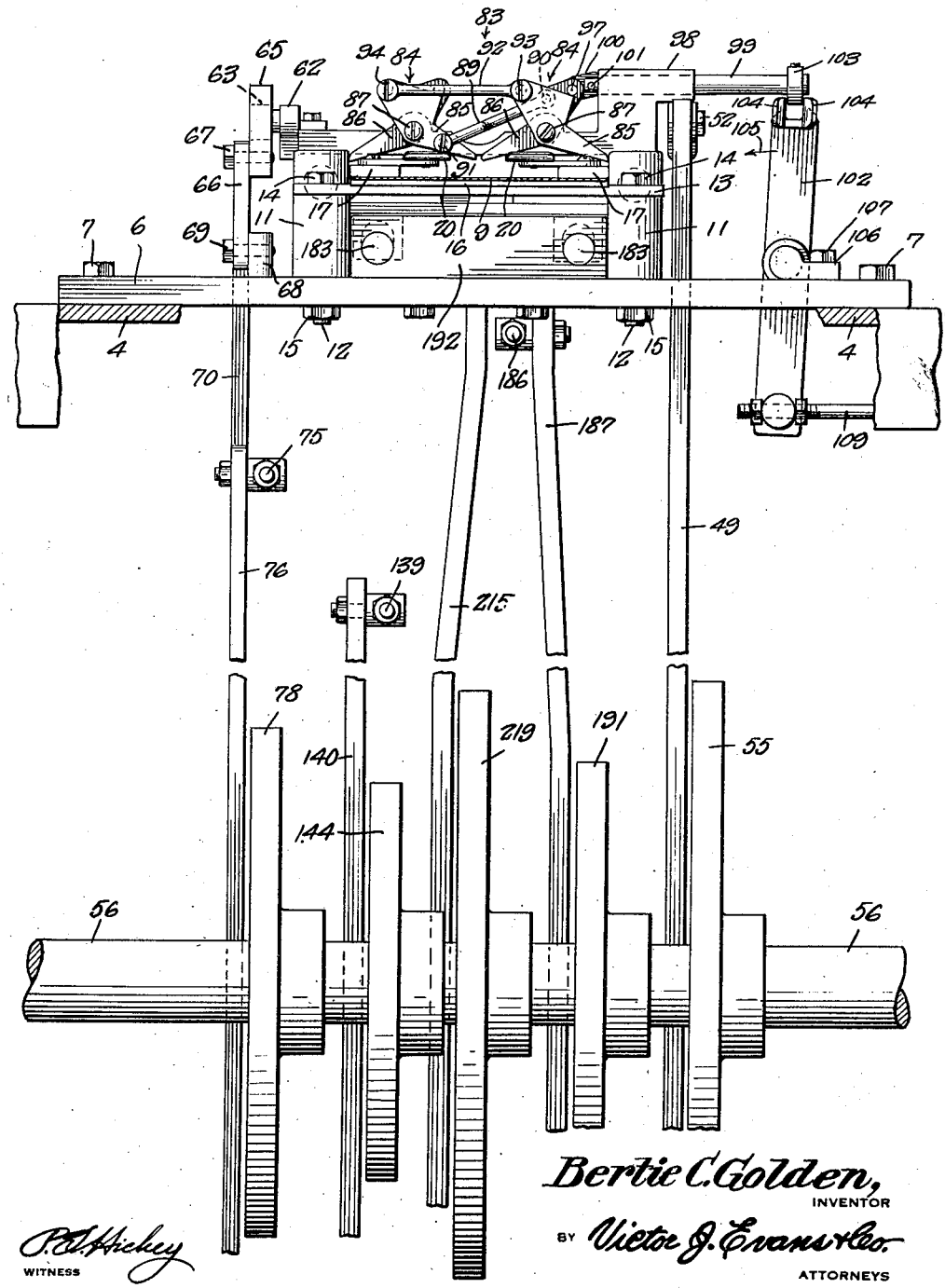

Sept. 22, 1942.　　　B. C. GOLDEN　　　2,296,783
BAG STRINGING MACHINE
Filed July 20, 1940　　　21 Sheets-Sheet 10

Bertie C. Golden,
INVENTOR

BY Victor J. Evans & Co.
ATTORNEYS

WITNESS

Bertie C. Golden, INVENTOR

Sept. 22, 1942.   B. C. GOLDEN   2,296,783
BAG STRINGING MACHINE
Filed July 20, 1940   21 Sheets-Sheet 12
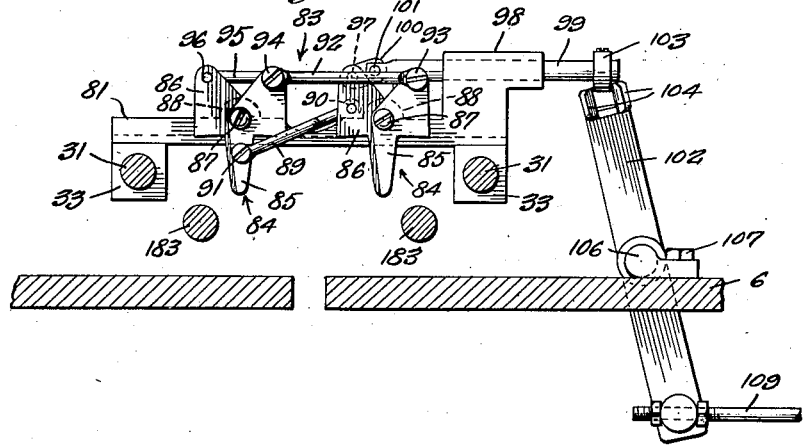
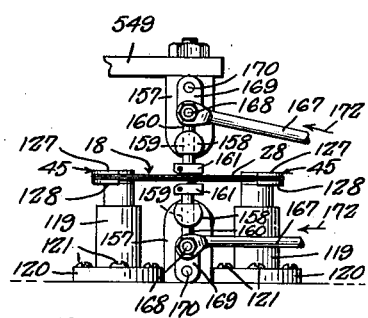
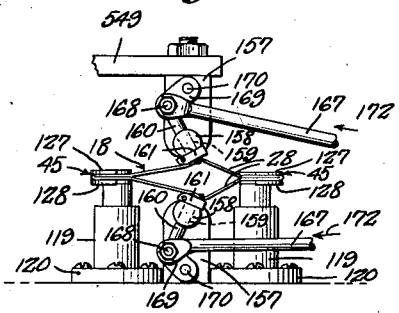
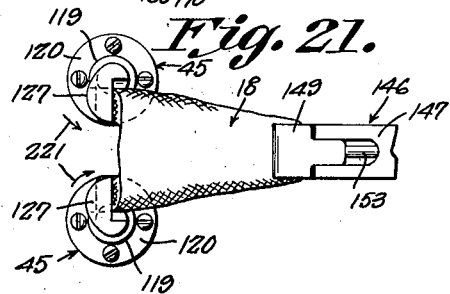
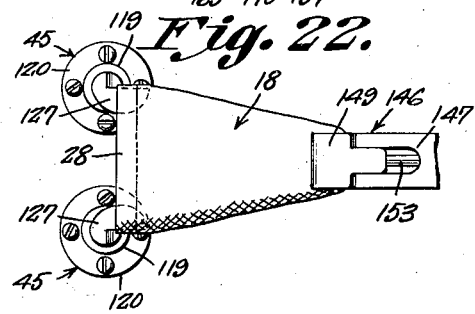
Bertie C. Golden,
INVENTOR Sept. 22, 1942.   B. C. GOLDEN   2,296,783
BAG STRINGING MACHINE
Filed July 20, 1940   21 Sheets-Sheet 13
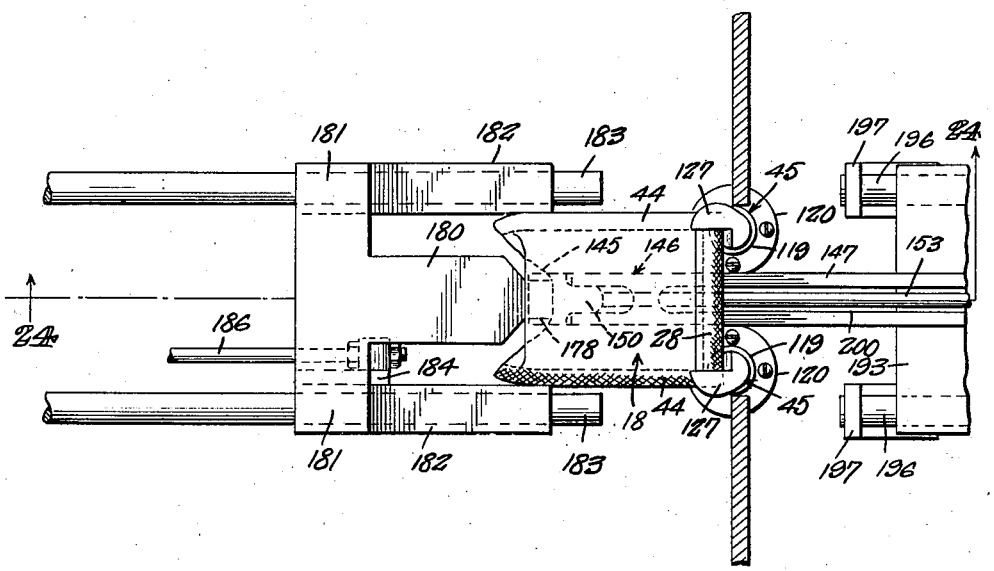
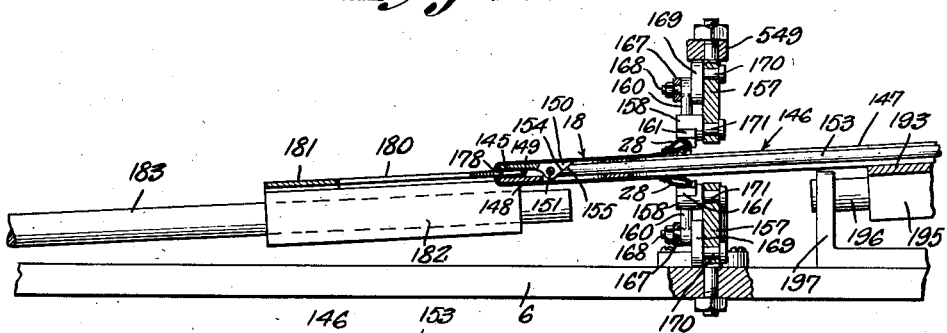
Bertie C. Golden,
INVENTOR

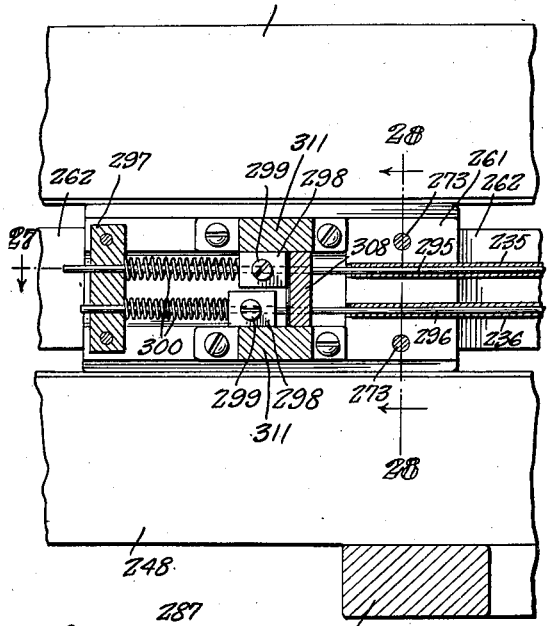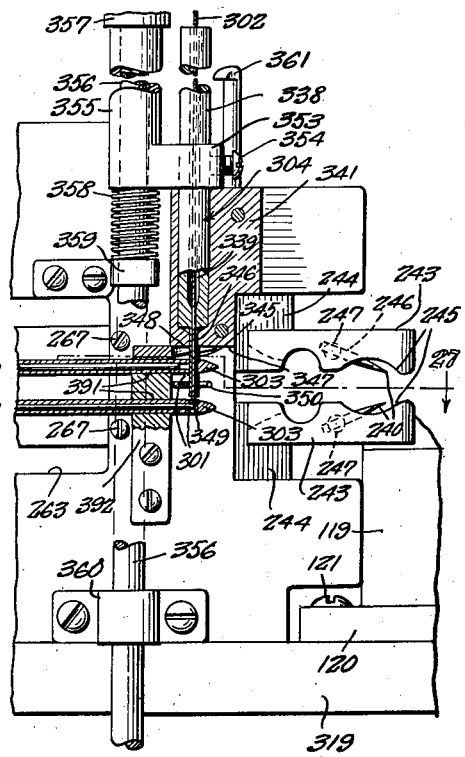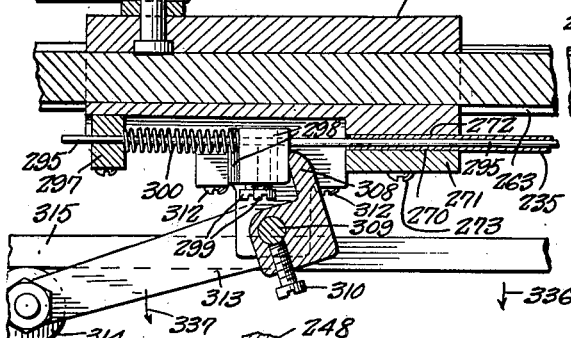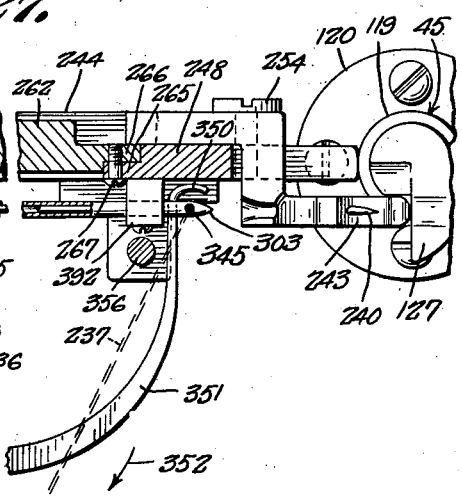

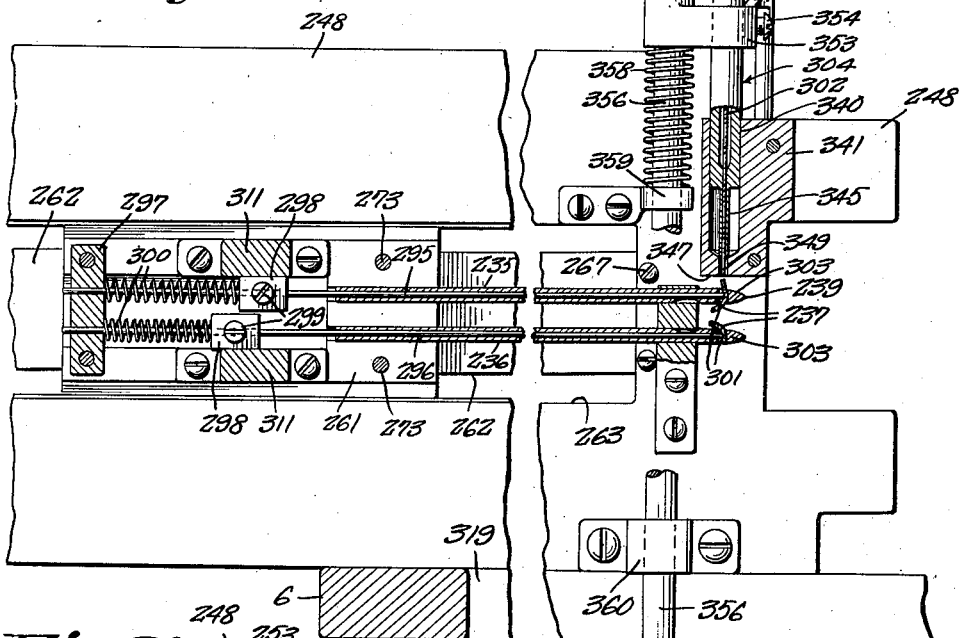
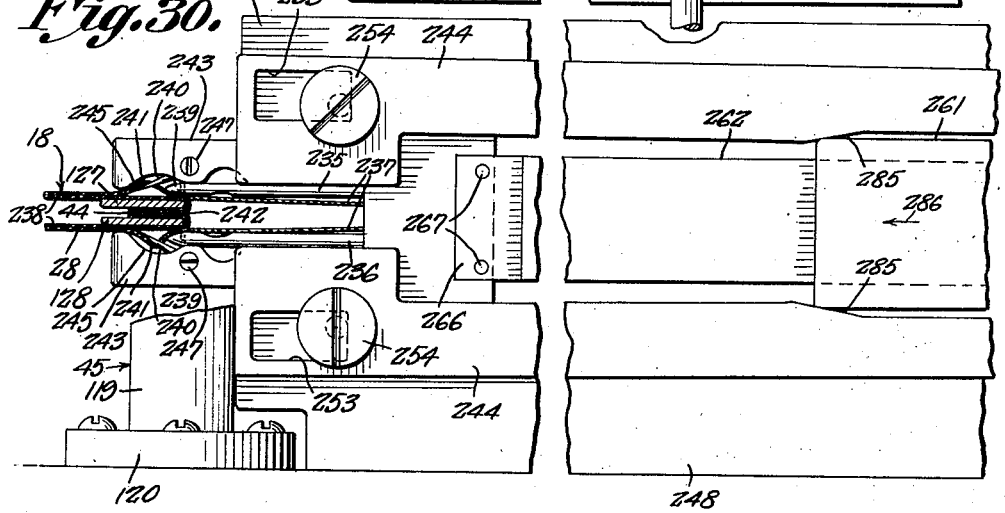

Sept. 22, 1942.   B. C. GOLDEN   2,296,783
BAG STRINGING MACHINE
Filed July 20, 1940   21 Sheets-Sheet 16
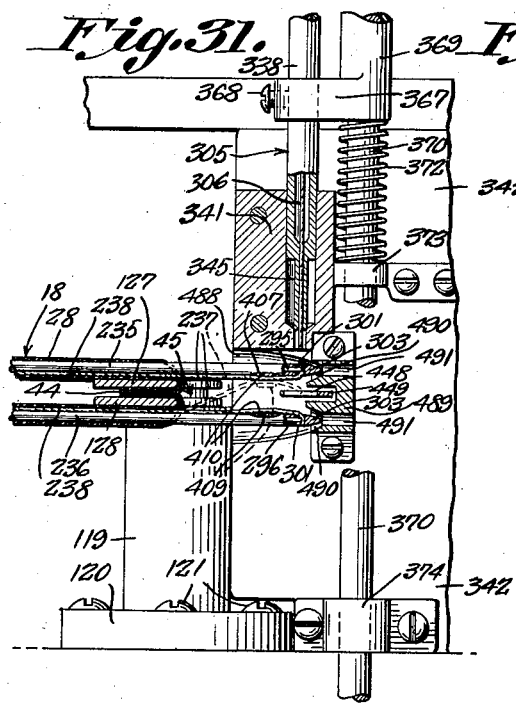
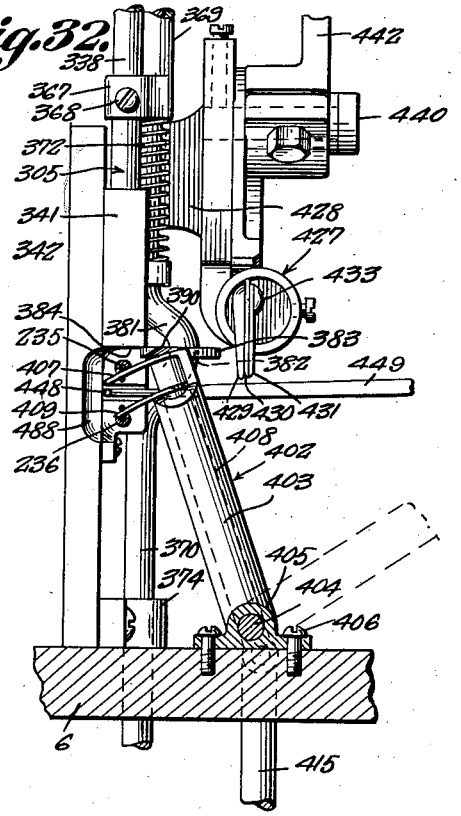
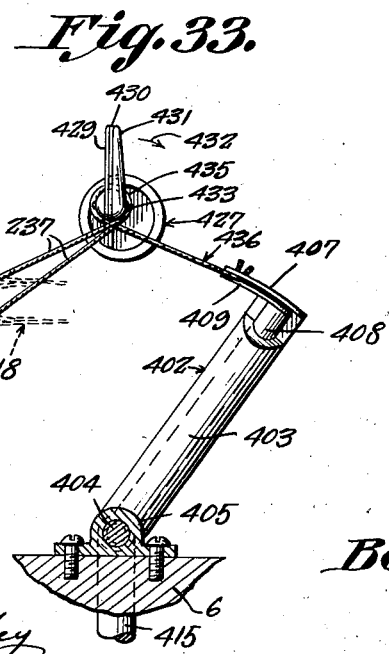
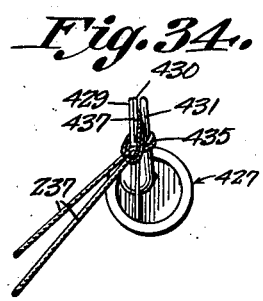
Bertie C. Golden,
INVENTOR
BY Victor J. Evans & Co.
ATTORNEYS Sept. 22, 1942.   B. C. GOLDEN   2,296,783
BAG STRINGING MACHINE
Filed July 20, 1940   21 Sheets-Sheet 17

Bertie C. Golden, INVENTOR
BY Victor J. Evans & Co.
ATTORNEYS

Sept. 22, 1942.　　　B. C. GOLDEN　　　2,296,783
BAG STRINGING MACHINE
Filed July 20, 1940　　　21 Sheets-Sheet 18
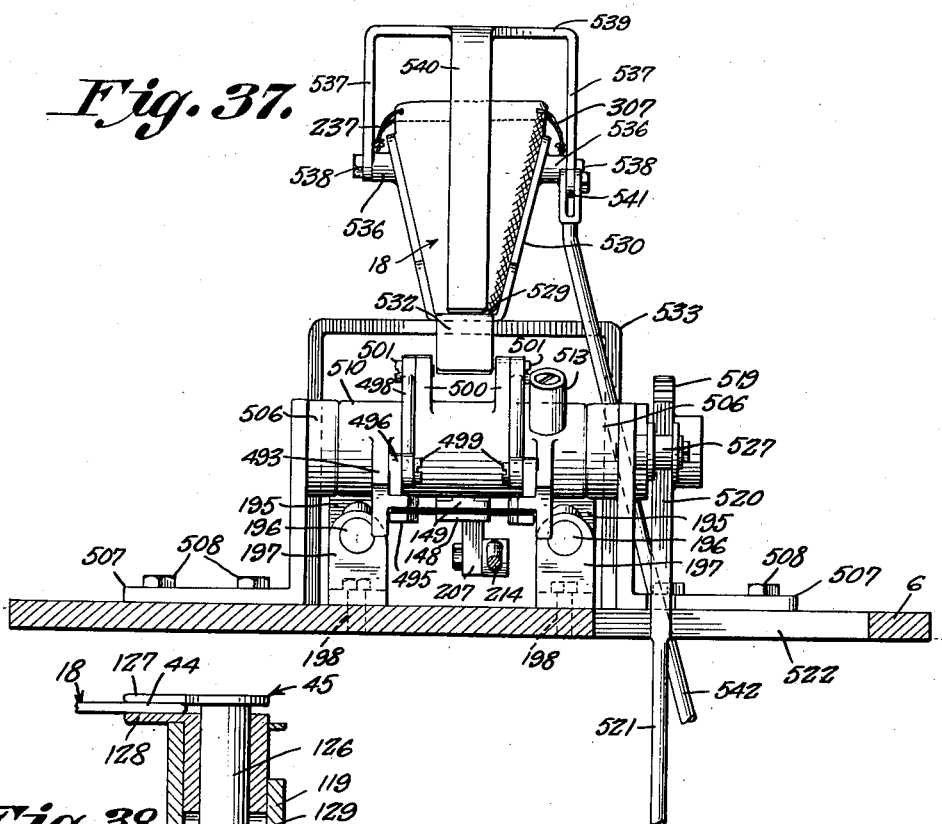
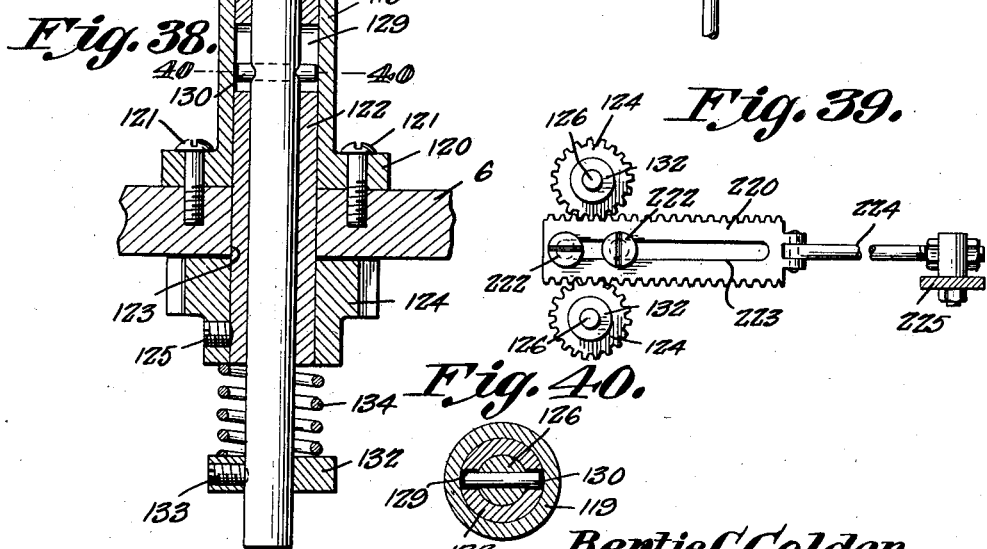

Sept. 22, 1942.    B. C. GOLDEN    2,296,783
BAG STRINGING MACHINE
Filed July 20, 1940    21 Sheets-Sheet 19
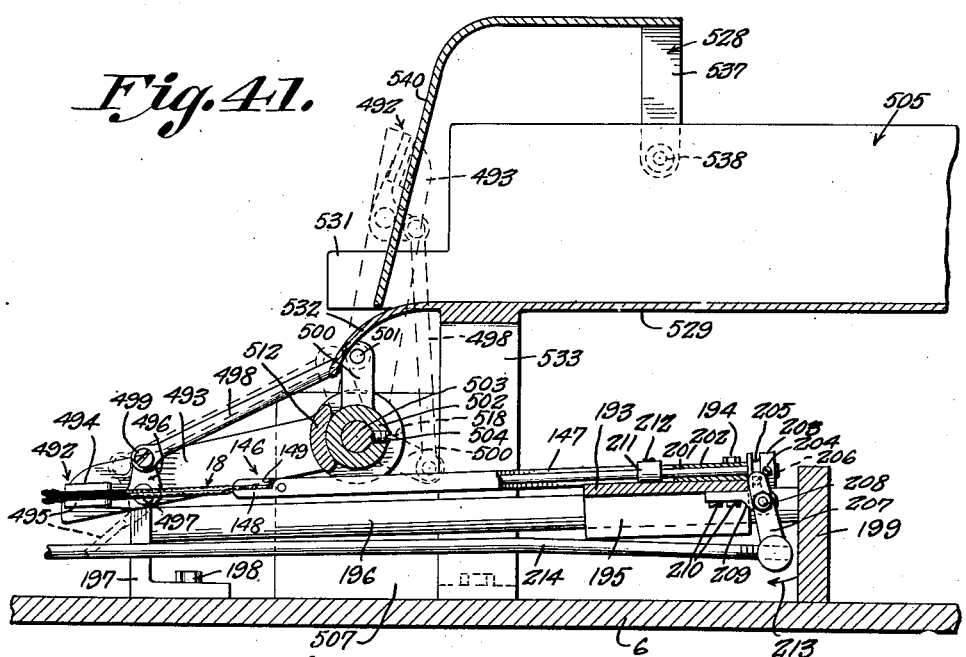
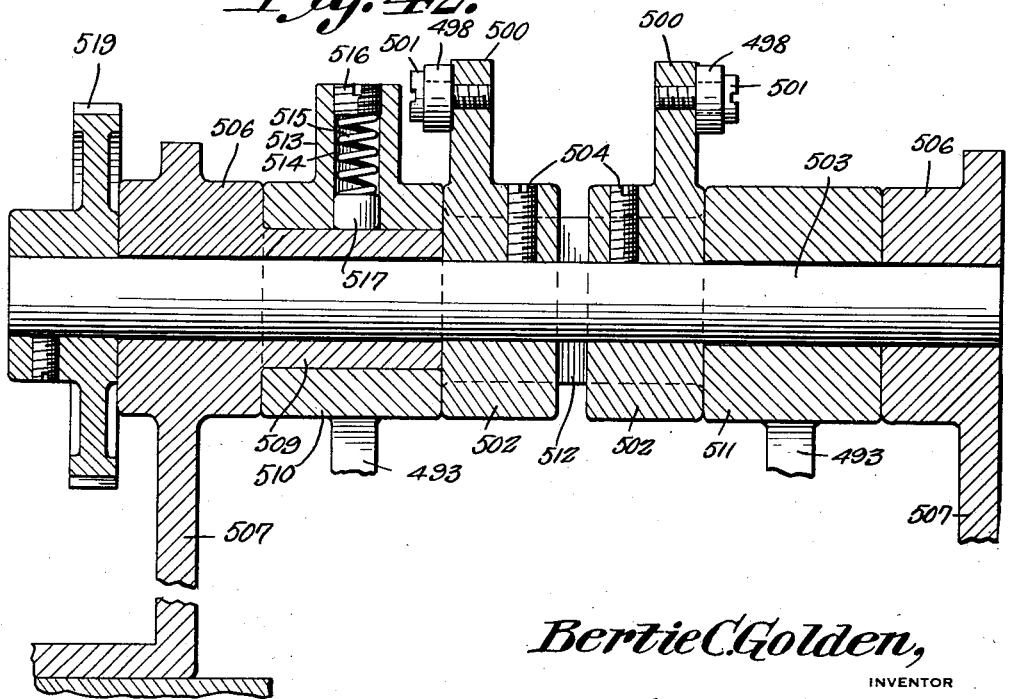
Bertie C. Golden,
INVENTOR
BY Victor J. Evans & Co.
ATTORNEYS Sept. 22, 1942.   B. C. GOLDEN   2,296,783
BAG STRINGING MACHINE
Filed July 20, 1940   21 Sheets-Sheet 20

Bertie C. Golden,
INVENTOR
BY *Victor J. Evans & Co.*
ATTORNEYS

WITNESS

Sept. 22, 1942.        B. C. GOLDEN        2,296,783
BAG STRINGING MACHINE
Filed July 20, 1940        21 Sheets-Sheet 21

Patented Sept. 22, 1942

2,296,783

UNITED STATES PATENT OFFICE 2,296,783

BAG STRINGING MACHINE

Bertie C. Golden, Reidsville, N. C., assignor to Millhiser Bag Company, Inc., Richmond, Va., a corporation of Virginia

REISSUED

Application July 20, 1940, Serial No. 346,645

68 Claims. (Cl. 112—173)

My invention relates to the manufacture of bags having draw strings for closing the mouth thereof, and includes among its objects and advantages the provision of an improved bag stringing machine.

The present invention is primarily concerned with the insertion of draw strings in tobacco bags, but is equally well adapted to the application of draw strings to bags of other types. The manufacture of tobacco bags according to modern production methods involves two separate and distinct stages. The first stage consists in sewing hems at two opposite ends of a rectangular sheet of fabric, folding the sheet back upon itself intermediate its hemmed ends, with the line of fold constituting the central bottom area of the bag, and subsequently sewing the folded sheet along two opposite side margins thereof.

The bag is uniform in width from the hemmed end, which constitutes the open end of the bag, down to its bottom. The bags are sewed in the formation of a chain, wherein the bags are connected together at spaced intervals by the continuous side seam threads which close the sides of the bag, as above set forth, and the bags are so arranged that the open end of one bag follows the closed bottom end of the preceding bag.

The second stage consists in the insertion of draw strings in the hems of the individual bags, and the bags in the chain are wrong side out so that the stringing stage requires reversal of the bags to bring the right sides out, in addition to insertion of the draw strings. My machine is designed to handle the bags as they come from the sewing stage in chain formation, and embodies novel means for reversing the successive bags and threading the draw strings through the hems and subsequently delivering the bags to a collection hopper in an orderly manner, with both draw strings of each bag having their projecting ends lying wholly outside that bag.

More specifically, my machine includes a bag feeder mechanism for advancing successive bags to the reversing mechanism and the string threading needles. The grippers of the feeder mechanism advance the bag chain a predetermined distance after which a seam thread cutter is brought into play for cutting the foremost bag from the chain. The seam thread cutter and the grippers of the feeder mechanism are in the nature of a carriage which advances a predetermined distance before the seam thread cutter is actuated, and the seam thread cutter is spaced a predetermined distance from the grippers of the feeder mechanism. Thus the seam threads are severed at the same distances from the bottom of each bag, regardless of the fact that the connecting seam threads in the chain might be variable as to length.

The feeder mechanism also includes means for positioning the leading or open end of each successive bag in a predetermined position prior to the gripping action of the grippers of the feeder mechanism to provide accommodation for variable spacing between the bags in the chain. In other words, the bags are accurate with respect to length but the bags are not always spaced equal distances one from the other in the chain. Accordingly, each bag is brought into a predetermined and exact position with respect to the feeder mechanism grippers and is gripped in that position, with the seam thread cutter maintaining a definite spacing with respect to the grippers, and the seam thread cutter is brought into play after each bag has been advanced a predetermined distance so that all slack is removed from the bag with the result that the strands are precisely severed in each instance.

As each bag is advanced into the zone of the bag reversing mechanism, a pin action coacts with the hem areas of the bag for opening its mouth preparatory to the entry of a plunger gripper acting to reverse the bag. A conditioning plunger is brought into play for looping the bottom area of the bag inwardly to provide a tongue which is grasped by the plunger gripper. The bag reversing mechanism includes grippers which grasp and hold the top or open end of the bag firmly as the plunger gripper exerts a pull on the bottom of the bag and pulls the bottom through the bag for reversing the same. The grippers of the reversing mechanism are so fashioned as to rotate in a peculiar manner to the end that the open end of the bag will be completely reversed in a neat and regular manner preparatory to insertion of the draw strings.

The conventional square-bottomed tobacco bag is uniform in width from the hem down to the bottom. When such a bag is filled, there is a decrease in its width throughout the greater part of its length, but the bottom of the bag does not shorten transversely of the bag. In other words, the length of the bottom of the bag will remain substantially the same after the bag is filled as it was before, since the corners of the bag project beyond the width of the bag and present an unsightly appearance. It is desirable to reverse the bag in such manner that the corners are tucked in before the bag is filled. After filling, the corners form nicely and are supported by reason of the material within the bag, and the bag maintains a uniform width from top to bottom. In my invention, the reversing mechanism is so designed as to reverse the bags in an efficient manner and at the same time leave the corners of the bag tucked in in such a degree that the bag can be filled in an expeditious manner, with the bag taking a perfectly square bottom with respect to contour, as well as width from top to bottom.

Upon reversal of the bag, the draw string threading mechanism is brought into play for inserting two draw strings which project in opposite directions from the two sides of the bag, and the draw strings are cut for length and knotted to provide closed loops which effectively draw the mouth of the bag to a closed position when the draw strings are pulled simultaneously in opposite directions. The draw string threading mechanism includes two needles which are arranged to enter the two hems immediately adjacent the seam at one side of the bag for inserting one draw string, after which the needles, upon their return trip, draw the second draw string through the hems. A pin action bulges the hems in the path of the needles to facilitate penetration of the hems by the needles for string threading purposes.

One draw string is first pulled for length, threaded through the hems and knotted to provide a pull string of loop formation, after which the second draw string is drawn for length, threaded through the same hems and subsequently knotted in the form of a closed loop, with the two draw strings projecting laterally of the two sides of the bag, and with the projecting runs of the draw strings lying wholly outside the bag. Complete and accurate reversal of the bags at their mouths before the draw strings are inserted permits the draw strings to be so incorporated in the hems that their projecting ends will lie wholly outside the bag. In filling bags, it is important that the bags be of uniform contour and that the ends of the draw strings lie wholly outside the bag. The present invention operates to reverse the bags accurately with respect to contour, and the draw strings are inserted immediately adjacent the two side seams, with the ends of the strings maintained in the clear of the open ends of the bags.

As the two strings are inserted, cut and tied, bag stacking grippers are actuated for moving the successive bags to a collection hopper, where the bags may be collected in bundles of predetermined numbers, boxed or otherwise bundled to facilitate handling and transportation to the user or filling facilities. All the bags are stacked side to side and substantially on end in the collection hopper, with the string ends of the bags uppermost.

In the accompanying drawings:

Figure 2 is a top plan view;

Figure 6 is a side elevational view of the structure illustrated in Figure 4;

Figure 7 is a view taken along the line 7—7 of Figure 3, with a reversed bag and a portion of the frame of the machine illustrated in section;

Figure 8 is a detail view of a portion of the pin action which opens the mouth of the bag for the entrance of the plunger gripper;

Figure 9 is a sectional view along the line 9—9 of Figure 8;

Figure 10 is a sectional view along the line 10—10 of Figure 3;

Figure 11 is a sectional detail view of a portion of the structure of Figure 10;

Figure 12 is an elevational view of the seam thread cutter;

Figure 18 is a view similar to Figure 12 but illustrating the seam thread cutter in its cutting position, with Figure 12 illustrating the seam thread cutter in its normal position;

Figure 19 is a view illustrating the pin action for opening the mouth of the bag;

Figure 20 is a view similar to Figure 19 but illustrating the pin action in its bag opening position;

Figure 21 is a top plan view of a bag grasped by the reversing grippers and partially reversed;

Figure 22 is a view similar to Figure 21 but illustrating the bag completely reversed and the manner in which the bag is contoured with its bottom corners tucked in, and the bag ready for insertion of the draw strings;

Figure 23 is a plan view of a bag grasped by the reversing grippers and illustrating the manner in which the bottom of the bag is folded inwardly to be grasped by the plunger gripper;

Figure 24 is a sectional view along the line 24—24 of Figure 23;

Figure 25 is a fragmentary perspective view illustrating the bottom folding plunger and the specific structure of the plunger gripper which grasps the folded in bottom portion of the bag;

Figure 26 is a sectional detail view of the string insertion needles;

Figure 27 is a sectional view along the line 27—27 of Figure 26;

Figure 28 is a sectional view along the line 28—28 of Figure 26;

Figure 29 is a view similar to Figure 26 but illustrating another position of the needles;

Figure 30 is a view illustrating the manner in which the hems are opened preparatory to insertion of the needles;

Figure 31 is a sectional detail view illustrating the manner in which one of the string grippers coacts with the needles for gripping the untied ends of a string;

Figure 32 is a view illustrating one of the string grippers having its gripping elements inserted between the two runs of a draw string and their respective needles;

Figure 33 is a detail view illustrating the manner in which one of the string grippers pulls the draw string into the zone of its respective knotter;

Figure 34 is a view illustrating a draw string being knotted by one of the knotters;

Figure 37 is a front elevational view of the collection hopper;

Figure 38 is a sectional detail view of one of the grippers of the reversing mechanism;

Figure 39 is a detail view of the actuating means for the reversing grippers, one of which is illustrated in Figure 38;

Figure 40 is a sectional view along the line 40—40 of Figure 38;

Figure 41 is a sectional side elevational view of the collection hopper;

Figure 42 is a sectional detail view illustrating the manner in which the hopper feeding grippers are mounted;

Figures 44 to 60, inclusive, are diagrammatic views illustrating the respective cams of Figure 43.

Figure 1:
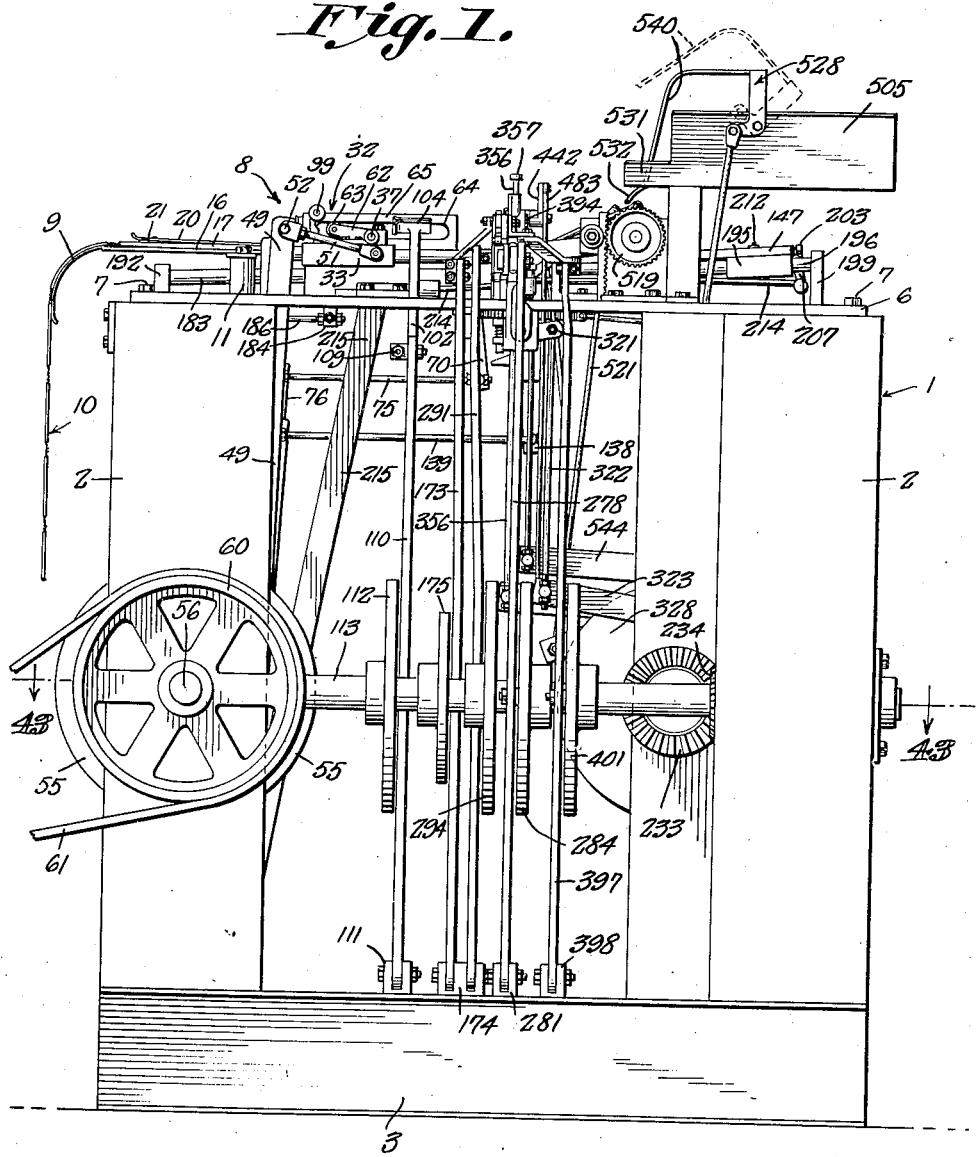
Figure 1 is a side elevational view of a machine in accordance with my invention.

In the embodiment of the invention selected for illustration, Figs. 1 and 2 illustrate a frame 1 including upright channels 2 located at the four corners of the frame and interconnected at their bottoms by horizontal members 3. Upright members 2 may be welded to the horizontal members 3, and top horizontal members 4 are secured to the upright members by bolts 5 (Fig. 6) and carry a horizontally positioned bed plate 6 made secure by bolts 7. Two top horizontal members 4 are sufficient, since these two members parallel each other and are located on opposite sides of the frame structure as a whole, with the bed plate 6 constituting an effective interconnecting and bracing means.

Figs. 1, 2, 4 and 6 illustrate the bag feeder mechanism 8 as being located upon the bed plate 6 and adjacent one end thereof, with the feeder mechanism including a downwardly curved plate 9 across which the bag chain 10 slides as it is progressively moved upwardly and horizontally into the machine. The bag chain may be pulled from a large bundle of bags which are so folded as to permit the chain to be paid out without tangling thereof. Handling of bag chains of this type is well known in the art and need not be described in further detail.

To the bed plate 6 I secure two posts 11 which are bored longitudinally for the reception of bolts 12 extending through the bed plate 6, see Figs. 6 and 12. A bar 13 spans the upper ends of the posts 11 and is bored for the reception of the bolts 12, with the bolt heads 14 arranged to draw the bar 13 tightly to the posts when the bolt nuts 15 are tightened. To the bar 13 is secured a bag supporting plate 16, best illustrated in Figs. 6 and 12. Plate 16 may be welded to the bar 13 and lies in a horizontal plane.

Figure 4:
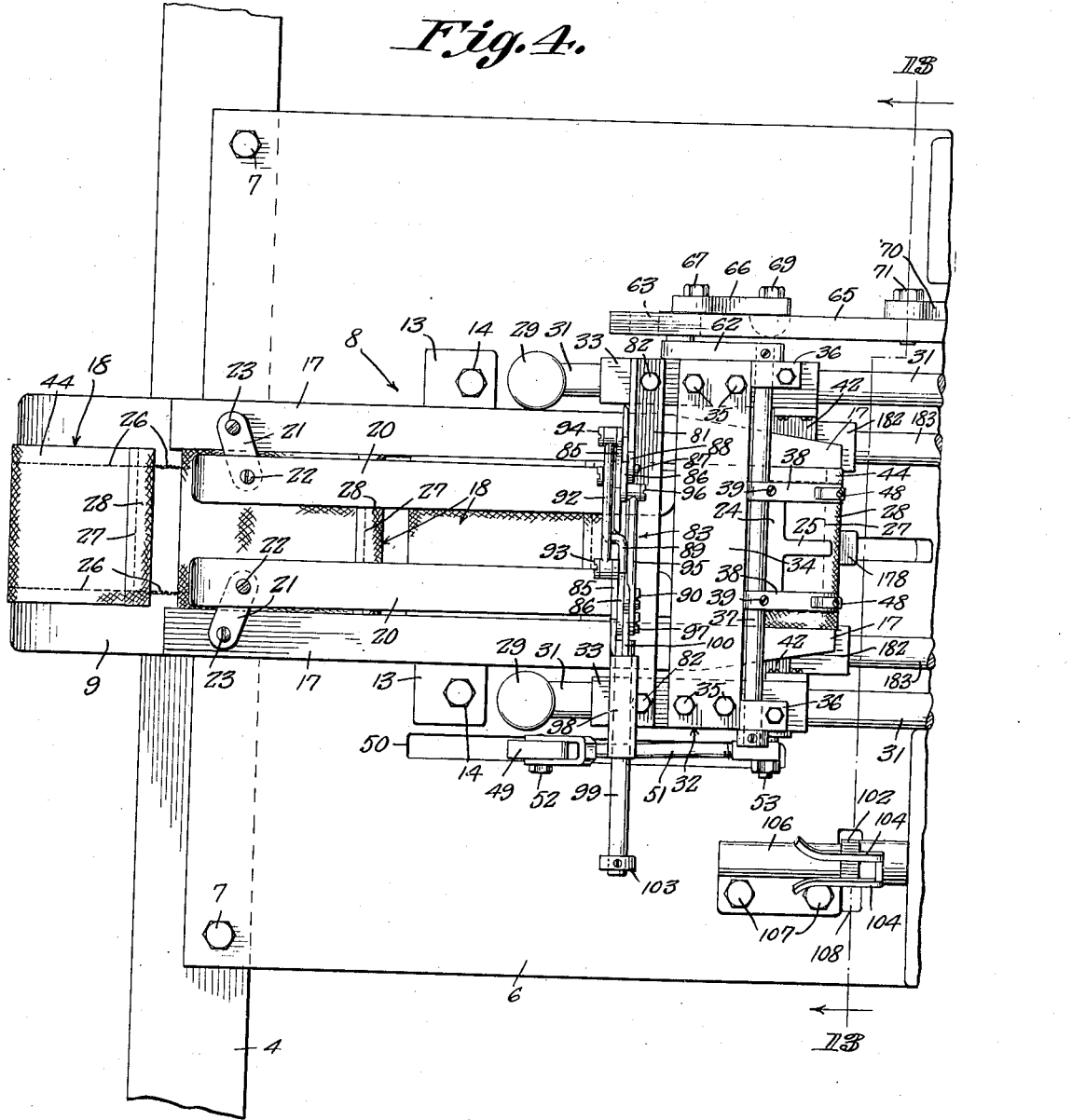
Figure 4 is a top plan view of the feeder mechanism and constitutes a continuation of the top plan view of Fig. 3.

Upon the two side margins of the plate 16 I secure two guide bars 17, see Figs. 4 and 12, which guide bars are spaced so as to have guiding engagement with the edges of the bags 18 in the chain 10 as the chain is advanced into the machine, see Fig. 4. Between the rear end of the plate 16 and the rear ends of the guide bars 17 is secured the forward end of the curved plate 9, and the plate 16 may be slightly offset, as at 19, to provide space for the curved plate 9, see Fig. 6, and the guide bars 17 may be welded to the plate 16.

Figure 15:
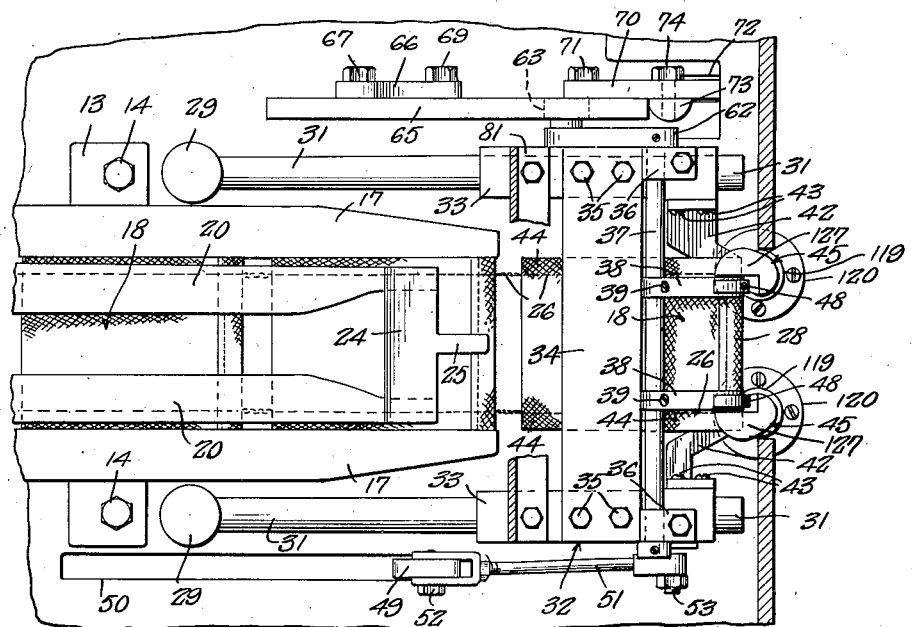
Figure 15 is a plan view of the bag feeder illustrating a bag advanced to the zone of the reversing grippers.

In Fig. 4, I illustrate two spring arms 20 which have their rear ends secured to straps 21 by screws 22, and the straps are secured to the guide bars 17 by screws 23. Referring to Fig. 15, a cross plate 24 is secured to the spring arms 20, with the cross plate spaced slightly inwardly from the inner ends of the guide bars 17. Cross plate 24 is provided with a spring finger 25 which is arranged to press gently against the bag 18 which might be located thereunder, so that that particular bag is pressed between the spring finger and the plate 16. Spring arms 20 incline in the direction of the plate 16 so that their free ends are brought into engagement with the bag 18 thereunderneath, with the spring finger 25 also exerting pressure on that bag. Thus the two spring arms 20 and the spring finger 25 press the bag thereunderneath against the plate 16 so as to restrain the bag chain from accidental displacement.

Fig. 4 illustrates the bags 18 as being connected into the form of the chain 10 through the medium of the side seam threads 26, and each side of the bag is provided with a cross stitch 27 which provides a hem 28 extending the full width of the bag and defining its mouth end. Plate 16 is of such length as to afford support for approximately three of the bags 18, as illustrated in Fig. 4.

Figure 13:
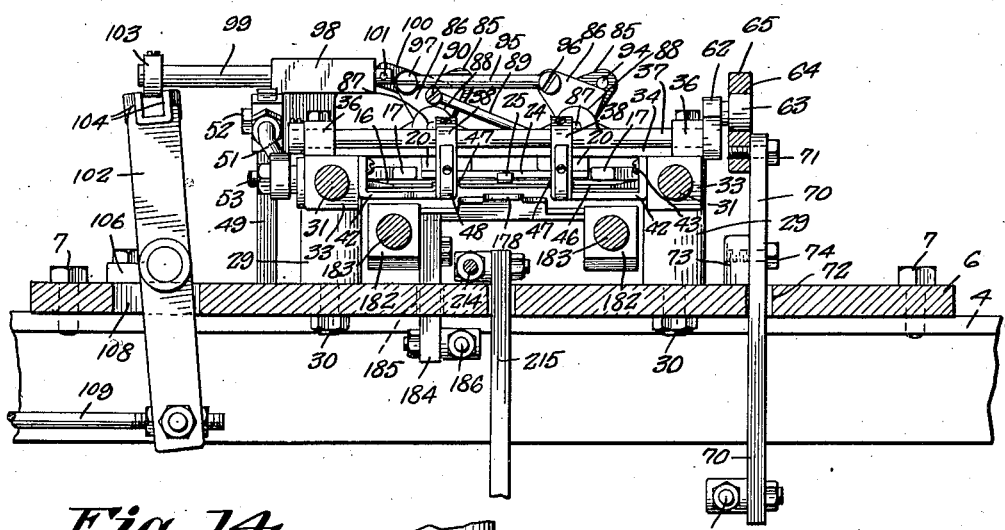
Figure 13 is a sectional view along the line 13—13 of Figure 4.

Referring to Figs. 2, 15, 4 and 13, two posts 29 are mounted on the bed plate 6 closely adjacent the outer edges of the guide bars 17. Fig. 13 illustrates the posts 29 as being provided with bolt extensions 30 extended through openings in the bed plate and fixedly secured thereto. Each post 29 supports a guide bar 31, which guide bars are arranged in parallelism one with the other and also with respect to the bed plate 6. Fig. 15 illustrates each guide bar 31 as having one end secured to one of the posts 29. Guide bars 31 slidably support a carriage 32, see Figs. 4, 15 and 2.

Figure 16:
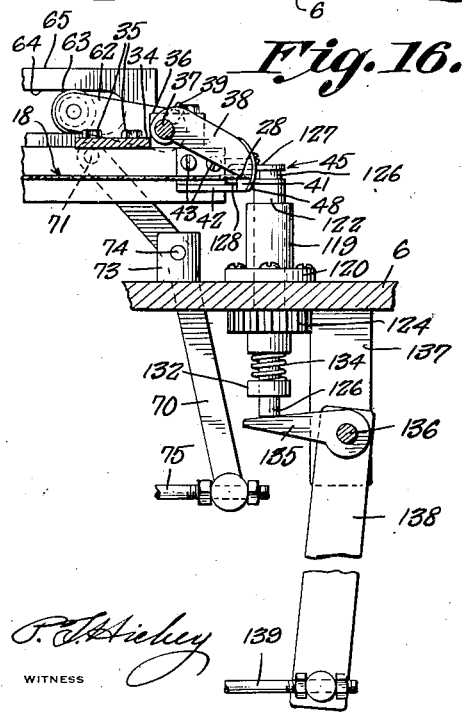
Figure 16 is a sectional detail view of a portion of the structure of Figure 15 illustrating one of the feeder grippers in its advanced position, which is the position of the feeder grippers illustrated in Figure 15.
Figure 17:
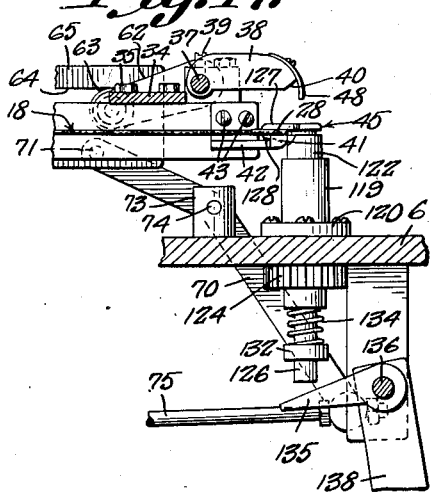
Figure 17 is a view similar to Figure 16 but illustrating one of the feeder grippers as it is moved to a releasing position for freeing the bag for handling by the reversing mechanism.

Carriage 32 comprises blocks 33 bored to slidably receive the guide rods 31, and the blocks 33 are interconnected as a unit through the medium of a bar 34. Bolts 35 pass through the bar 34 and are threaded into the blocks 33 for fixedly securing the bar 34. Figs. 4, 13 and 15 illustrate the bar 34 as being provided with bearings 36 which rotatably support a gripper shaft 37. To the gripper shaft 37 I fixedly secure two gripper arms 38 by set screws 39, see Figs. 4, 13, 15, 16 and 17. Figs. 16 and 17 show one only of the gripper arms, but these arms are identical in construction and operation so that a detailed description of the construction and operation of one gripper arm will apply to both.

Figs. 16 and 17 illustrate the gripper arm 38 as being provided with a face 40 arranged to move toward and away from an abutment 41 through oscillation of the gripper shaft 37. There are two abutments 41, one for each of the gripper arms 38, and these abutments are fashioned integrally with brackets 42 secured to the inner vertical faces of the blocks 33 by screws 43, see Figs. 13 and 15.

The hem 28 of the foremost bag 18 in the chain 10 is pinched between the faces 40 of the gripper arms 38 and their respective abutments 41, as illustrated in Figs. 16, 4 and 15. Figs. 4 and 15 illustrate the gripper arms 38 as being so spaced that the hem 28 is pinched immediately adjacent the side seam threads 26, but on margins of the hem lying between the two side seam threads. The side seam threads are located inwardly of the side edges of the bag, which provides flaps 44 which project laterally of the gripper arms 38. Fig. 4 illustrates the carriage 32 in its rearmost position, at which time the gripper arms 38 are moved downwardly onto the hem 28 of the foremost bag 18, while Fig. 15 illustrates the advanced position of the carriage, at which time the hem 28 is brought into the gripping zone of reversing grippers 45.

The forward end of the bag supporting plate 16, see Fig. 13, is tapered downwardly to a thin edge 46 which is provided with slots 47 into which the abutments 41 enter when the carriage 32 is moved to its rearward position, such as that illustrated in Fig. 4, at which time the hem 28 of the foremost bag 18 lies upon the abutments 41 to be clamped thereto when the gripper arms 38 move downwardly. Thus the bag chain 10 is advanced intermittently as the carriage 32 is advanced for delivering successive bags 18 to the reversing grippers 45. Plate 16 has its forward end terminating flush with the forward ends of the guide bars 17 to afford support for the forward end of the foremost bag, and the gripper arms 38 are provided with positioning fingers 48 extending below the faces 40 so as to engage the top end of the foremost bag and shift the forward end rearwardly in the event that the foremost bag to be gripped has been advanced too far forwardly because of variable spacing between the bags in the chain 10. Spring finger 25 projects a considerable distance forwardly of the cross plate 24 and is located centrally of the bag engaged thereby, so that the side margins of the bag are free to be positioned by the positioning fingers 48. At the same time, the flaps 44 project beyond the outer side faces of the gripping arms 38 to provide ample margin for connection with the reversing grippers 45.

Carriage 32 is actuated by a lever 49, see Figs. 4, 6 and 15. A slot 50 is provided in the bed plate 6 for loosely receiving the lever 49, and the upper end of the lever is pivoted to a shaft 51 through the medium of a bolt 52. The opposite end of the shaft 51 is pivoted to one of the blocks 33 through the medium of a bolt 53. Lever 49 has its lower end pivotally connected with a stationary support 54, see Fig. 43, anchored to one of the beams 3 of the base structure of the frame 1. Actuation of the lever 49 is accomplished by a cam 55 fixed to a drive shaft 56 rotatably journaled in bearings 57 secured to two of the upright channels 2.

Figure 43:
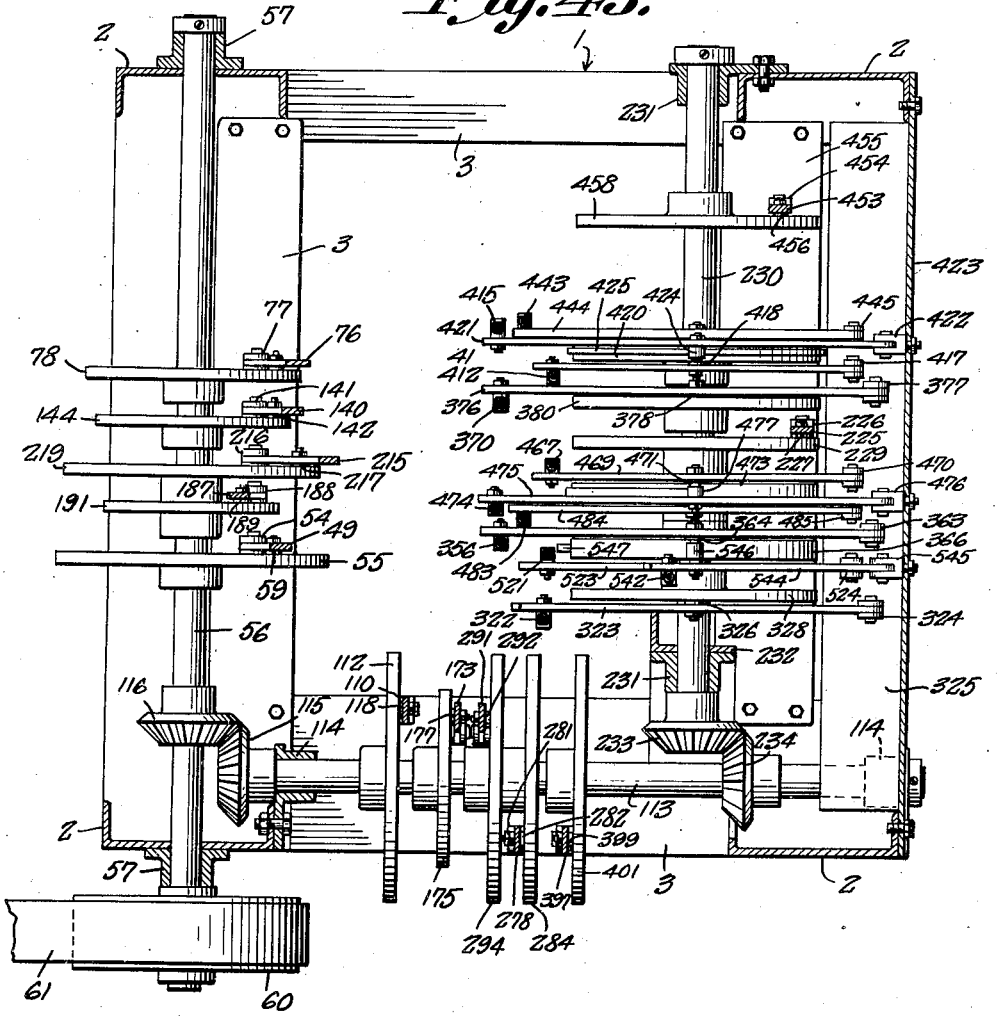
Figure 43 is a sectional view along the line 43—43 of Figure 1 to illustrate the arrangement of the different cams.

Fig. 48 illustrates the cam 55 as having a cam groove 58 in which is disposed a roller 59 projecting laterally of the lever 49, see also Fig. 43. Cam groove 58 is so fashioned as to pivot the lever 49 from its normal position of Figs. 4 and 6 for shifting the carriage 32 from the position of Fig. 4 to the position of Fig. 15 and back to its normal position for each revolution of the drive shaft 56. Shaft 56 is provided with a drive pulley 60 for connection with a belt 61, or other suitable transmission means driven from a suitable source of power (not shown).

Means for actuating the gripper shaft 37 comprises an arm 62, see Figs. 2, 12, 13 and 15, which arm is fixed to the gripper shaft and is provided with a roller 63, see Figs. 13 and 15, which slides in a slot 64 in a bar 65. Referring to Fig. 12, one end of the bar 65 is pivotally connected with a link 66 by a bolt 67, and the lower end of the link 66 is pivotally connected with a lug 68 projecting upwardly from the bed plate 6 through the medium of a bolt 69.

Bar 65 parallels the bed plate 6, and the opposite end of the bar is pivotally connected with a lever 70 through the medium of a bolt 71, see Figs. 13 and 15, which lever extends through a slot 72 in the bed plate 6 and is pivotally connected with a lug 73 through the medium of a bolt 74, with the lug 73 fixedly secured to the bed plate 6. To the lower end of the lever 70 I pivotally connect a link 75, see Fig. 1, which link is pivotally connected with the upper end of a lever 76 having its lower end pivotally connected with a support 77 fixed to one of the frame members 3, see Fig. 43. Fig. 44 illustrates a cam 78 provided with a cam groove 79 for the reception of a roller 80 projecting laterally of the lever 76 intermediate its ends. Cam 78 is fixed to the shaft 56.

Figs. 16 and 17 best illustrate the action of the bar 65 which controls the arm 62 for imparting oscillatory motion to the gripper shaft 37. Slot 64 is of such length as to permit free movement of the carriage 32 relatively to the bar 65. Bolts 67 and 69 of Fig. 12 are spaced apart the same distance as the bolts 71 and 74 of Fig. 13 so that the bar 65 is maintained in parallelism with the bed plate 6 in all relative positions of the bar.

With the carriage 32 in its rearmost position of Fig. 4, the bar 65 is in its elevated position of Fig. 16, with the lever 70 biased by reason of the cam 78 of Fig. 44 to such a degree as to effectively pinch the hem 28 between the faces 40 of the gripper arms 38 and the abutments 41. With the bar 65 positioned according to Fig. 16, the roller 63 rides freely in the slot 64 and the roller lies slightly short of the end of the slot illustrated in this figure. As the reversing grippers 45 secure a firm hold on the margins 44 of the foremost bag 18 of Fig. 15, the cam 78 of Fig. 44 is brought into play for pivoting the lever 70 to the position of Fig. 17. Such movement of the lever 70 moves the bar 65 in the direction of the bed plate 6 and imparts a turning motion to the gripper shaft 37 in such a direction as to shift the grippers 38 from their pinching position of Fig. 16 to the bag releasing position of Fig. 17.

As the carriage 32 returns to its normal position of Fig. 4, the grippers 38 are positioned in slightly spaced relation with the abutments 41 so as to bring the positioning fingers 48 into engagement with the hem 28 of the bag to be grasped, in the event that that bag has been advanced too far forwardly, and as the carriage reaches its rearmost position, the grippers 38 are brought down on the hem 28 for pinching the latter against the abutments 41.

The side seam threads 26 are severed through movement of the carriage 32 and after delivery of the bag to the reversing grippers 45. Upon the blocks 33 I secure an angle 81 by screws 82, which angle carries a thread cutter 83, see Figs. 4 and 18. Thus the thread cutter is carried by the carriage and is brought into action after the bag chain 10 has been advanced so as to remove slack from the bag delivered to the bag reversing mechanism as well as from the side seam threads, so that the latter will always be severed at the necessary distance from the bottom of the bag delivered to the bag reversing mechanism. It is important to cut the side seam threads at a suitable distance from the bottom of the bag to prevent unraveling of the side seams to the end that the sides of the bag will remain effectively sewed to prevent leakage.

Fig. 12 illustrates the normal position of the thread cutter and Fig. 18 illustrates the thread cutter in its thread cutting position. In Figs. 12 and 18, the thread cutter is illustrated as comprising two scissors units 84 so spaced as to cut the side seam threads 26. Each unit 84 includes a blade 85 and a blade 86. The blades 85 and 86 of each scissors unit are pivotally connected together by a screw 87 threaded into a lug 88 on the angle 81.

A link 89 has one end pivotally connected with the blade 86 of one scissors unit above the screw 87 through the medium of a screw 90, and the other end of the link is pivotally connected with the blade 85 in the other scissors unit below the screw 87 of that unit through the medium of a screw 91. A second link 92 has one end pivotally connected with the blade 85 of one scissors unit above the screw 87 of that scissors unit by a screw 93. The other end of the link 92 is pivotally connected with the blade 85 of the other scissors unit above the screw 87 of that scissors unit by a screw 94. A third link 95 has one end pivotally connected with one blade 86 above the screw 87 of that scissors unit 84 by a screw 96, and the other end of the link 95 is pivotally connected with the blade 86 of the other scissors unit 84 above the screw 87 of the latter scissors unit through the medium of a screw 97, see Fig. 13.

Angle 81 carries a bearing 98 which slidably supports a shaft 99 pivotally connected with one end of a link 100 through the medium of a pin 101, and the other end of the link 100 is pivotally connected with the screw 97, best illustrated in Fig. 13. Longitudinal movement is imparted to the shaft 99 by a lever 102, see Figs. 12, 13 and 18.

Fig. 4 illustrates the shaft 99 as being provided with a flange 103 aligned to enter between walls 104 secured to the upper end of the lever 102, see also Fig. 6. Walls 104 diverge at their ends nearest the flange 103 to facilitate entry of the flange between the walls when the carriage 32 is advanced from its normal position of Figs. 4 and 6 to the position of Fig. 15, at which time the flange 103 is positioned between the walls as illustrated in Fig. 12. With the flange 103 positioned according to Fig. 12, the lever 102 is pivoted in the direction of the arrow 105 for imparting longitudinal movement to the shaft 99. Movement of the shaft 99 in the direction of the arrow 105 shifts the blades of the two scissors units 84 from the positions of Fig. 12 to the positions of Fig. 18, at which time the side seam threads 26 are severed and the foremost bag 18 is grasped by the reversing grippers 45.

The action of the lever 102 is rapid, and the lever is shifted from its position of Fig. 18 to its normal position of Fig. 12 before the carriage 32 starts on its return trip. Lever 102 is pivoted intermediate its ends to a bracket 106 secured to the bed plate 6 by bolts 107, see Figs. 2, 6, 12, 13 and 18. Lever 102 extends through a slot 108 in the bed plate 6, see Fig. 13, and the lower end of the lever is pivotally connected with one end of a shaft 109 having its opposite end pivotally connected with the upper end of a lever 110, see Figs. 1 and 6.

The lower end of the lever 110 is pivotally connected with a support 111 secured to one of the members 3, see Fig. 1. Figs. 43 and 49 illustrate a cam 112 which actuates the lever 110. In Fig. 43, cam 112 is mounted on a shaft 113 rotatably journaled in bearings 114 carried by the frame structure, and a bevel gear 115 is keyed to the shaft 113 and arranged in mesh with a bevel gear 116 keyed to the shaft 56. Cam 112 is provided with a groove 117 for the reception of a roller 118 carried by the lever 110, see Fig. 49. The scissors action cuts the side seam threads effectively without shifting the bag chain relatively to its guiding means to that the bags in the chain will always remain in perfect alignment for coaction with the respective grippers.

Figure 14:
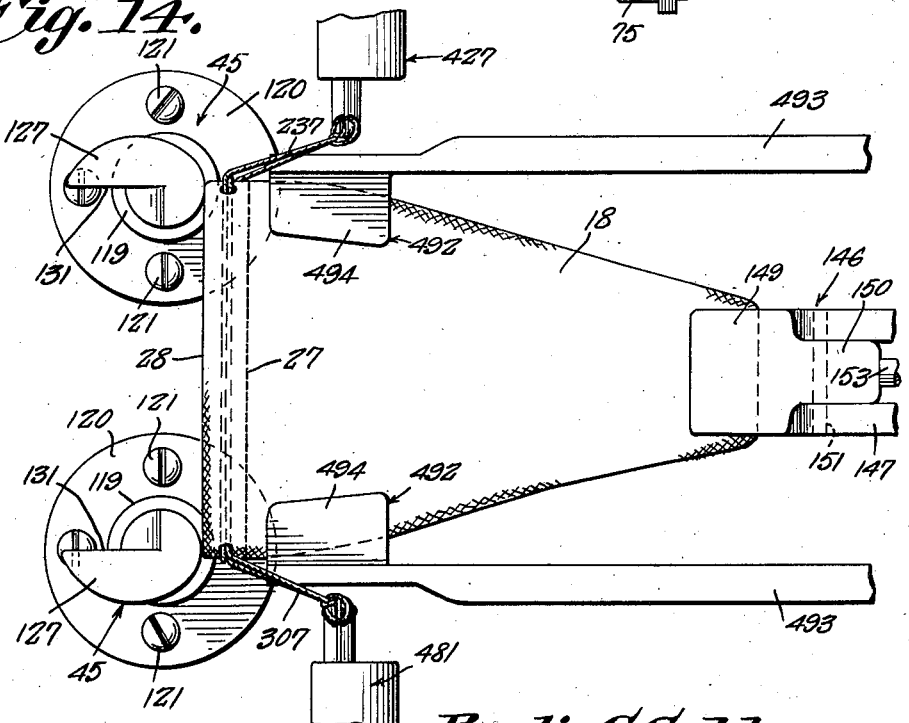
Figure 14 is a plan view of a bag illustrating the draw strings inserted therein, with the bag gripped by the bag stacking grippers preparatory to being delivered to the collection hopper.

Fig. 14 illustrates the reversing grippers 45 positioned to receive the foremost bag in the chain upon advancement of the carriage 32, as more fully illustrated in Fig. 15. The reversing grippers 45 are identical in construction and operation so that the description of one will apply to both. Fig. 38 illustrates one of the reversing grippers 45 in section, which gripper comprises a tube 119 having a flange 120 secured to the bed plate 6 by bolts 121. Inside the tube 119 is rotatably disposed a hollow shaft 122 extending through a bore 123 in the bed plate and provided with a pinion 124 secured thereto by a set screw 125.

A shaft 126 is slidably guided by the hollow shaft 122, and the shaft 126 is provided with a lip 127 arranged to move down on the flap 44 of the bag 18 to clamp the flap against a lip 128 on the upper end of the hollow shaft 122. Lip 128 rides on the upper end of the tube 119, with the latter adapted to be rotated inside the tube through the medium of the pinion 124. Hollow shaft 122 has a slot 129 for the reception of a pin 130 fixed to the shaft 126 so that the latter is keyed to the hollow shaft 122 for rotation therewith, but the shaft 126 may be moved longitudinally of the hollow shaft 122 for spacing the lip 127 from the lip 128 so as to facilitate entrance of the margin 44.

Fig. 16 illustrates the lip 127 in its elevated position as the hemmed end of the bag 18 reaches its final advanced position through the medium of the carriage 32. As the carriage completes its travel in the bag advancing direction, the grippers 38 are elevated to the position of Fig. 17 and the lips 127 move downwardly for pinching the flaps 44 between the lips 127 and 128. Figs. 14 and 15 illustrate the configuration of the lips 127 when viewed from above, and the lips 128 are of the same configuration and lie directly underneath the lips 127. Lips 127 and 128 have straight edges 131 which lie substantially in the lines of the side seam threads 26 to grasp the flanges 44 closely adjacent the grippers 38, see Fig. 15. Lips 127 in Fig. 15 project in the same directions as the lips 127 illustrated in Fig. 14.

In Fig. 38, a collar 132 is secured to the shaft 126 by a set screw 133, and between the collar 132 and the pinion 124 I interpose a compression spring 134 which holds the lip 127 pressed against the flap 44 with sufficient force to secure a firm grasp on the flap.

Fig. 10 illustrates the two shafts 126 as having their lower ends arranged in the path of lifting fingers 135, which fingers are secured to a shaft 136 rotatably journaled in depending brackets 137 secured to the bed plate 6. Fig. 16 illustrates one of the lifting fingers 135 as being elevated for lifting the lip 127 sufficiently far to provide ample clearance for the flange 44, and Fig. 17 illustrates the same lifting finger 135 in its lower position, at which time the compression spring 134 is brought into play.

To the shaft 136 I secure one end of an arm 138 having its lower end pivotally connected with a link 139, see Figs. 16 and 1, which link has its opposite end connected with a lever 140, see Fig. 6. Lever 140 has its lower end pivotally connected with a support 141 secured to one of the members 3, see Fig. 43. Lever 140 is provided with a roller 142 intermediate its ends to ride in a groove 143 in a cam 144, see Fig. 45. In Fig. 43, the cam 144 is secured to the shaft 56.

Fig. 23 illustrates a bag 18 grasped by the reversing grippers 45 and illustrates the greater part of the bag reversing mechanism. The bottom of the bag is pressed inwardly to provide a tongue 145 for connection with a plunger gripper 146, see Figs. 24 and 25. The plunger gripper 146 enters the open end of the bag 18 and secures a firm grasp upon the tongue 145 for turning the bag right side out. Plunger gripper 146 comprises a bar 147 having a jaw 148 fashioned at one end thereof for coaction with a jaw 149 having a shank 150 pivotally mounted on a pin 151, with the shank lying in a slot 152 in the bar 147. Fig. 24 illustrates a rod 153 provided with an angular face 154 arranged to be pressed into engagement with the angular face 155 on the shank 150 for moving the jaw 149 down on the tongue 145 to clamp the latter against the jaw 148.

To facilitate entry of the plunger gripper 146 in the bag 18, Fig. 10 illustrates two pin actions 156 for separating the side walls of the bag in the manner illustrated in Figs. 20 and 24. Fig. 10 illustrates the two pin actions 156 in their normal positions, at which time they are so spaced as to permit the hemmed end of the bag to move freely therebetween, as when the bag is advanced by the carriage 32 into the zone of the reversing grippers 45. The bag 18 illustrated in Fig. 10 has been reversed but is still grasped by the reversing grippers 45.

The pin actions 156 are identical in construction and operation and each comprises a bracket 157 to which I rotatably journal a block 158 which is bored at 159 for slidably receiving a shaft 160 provided with a head 161 having a pin 162 for penetrating the hem 28 on one wall of the bag for lifting that wall away from the other.

Figs. 8 and 9 illustrate one of the heads 161 provided with a bore 163 extending obliquely to the face 164 for the reception of one pin 162 made secure by a set screw 165. Pin 162 has a sharp point 166 for penetrating the material of the bag, and the reach of the sharpened point 166 may be varied through shifting of the pin 162.

In Fig. 10, each shaft 160 is pivotally connected with one end of a bar 167 through the medium of a pin 168 carried by a link 169. Fig. 24 illustrates the links 169 as having shafts 170 rotatably journaled in their respective brackets 157. Each rod 167 is pivotally connected with one of the pins 168. Blocks 158 have shafts 171 rotatably journaled in their respective brackets 157.

With the pin actions 156 positioned according to Fig. 10, movement of the rods 167 in the direction of the arrow 172 will pivot the links 169 and their respective shafts 160 for advancing the heads 161 in the direction of the bag, because of the normal angular alignment of the respective links and shafts. A slight movement of the rods 167 in the direction of the arrow 172 moves the heads 161 to the positions of Fig. 19, at which time the pins 162 are brought into engagement with the hem 28 on each wall of the bag. As the rods 167 are advanced slightly, the heads 161 continue their movement and cause the pins 162 to penetrate the two hems. Links 169 and the shafts 160 are so interconnected as to cause the heads 161 to move in arcs so that the pins 162 effectively penetrate the hems, and the heads 161, upon completion of their travel, are caused to take the separated positions illustrated in Fig. 20 for opening the bag preparatory to reception of the plunger gripper 146, best illustrated in Fig. 24. Movement of the rods 167 in a reverse direction brings the pins 162 in the clear of the bag hems and back to their normal positions of Fig. 10.

In Fig. 10, the rods 167 are pivotally connected with a lever 173 which has its lower end pivotally connected with a support 174 secured to one of the members 3, see Fig. 1. Fig. 50 illustrates a cam 175 provided with a groove 176 for the reception of a roller 177 connected with the lever 173 intermediate its ends, see also Fig. 43. Cam 175 is fixed to the shaft 113. Groove 176 of Fig. 50 is so fashioned as to impart the necessary pivotal movement to the lever 173 for actuating the pin actions 156.

Means for pressing the bottom of the bag inwardly to form the tongue 145 of Figs. 23 and 24 comprises a lip 178 fashioned to push the bottom of the bag between the jaws 148 and 149. Fig. 25 illustrates the jaws 148 and 149 as being grooved at 179 for the reception of the lip 178, so that the tongue 145 will be pinched between the two jaws along their side margins. When the plunger gripper 146 is projected into the bag 18, the rod 153 is retracted sufficiently far from the shank 150 to permit the jaw 149 to be pivoted upwardly for accommodating the lip 178 and the tongue 145.

In Fig. 23, the lip 178 is fashioned at one end of a strap 180 having wings 181 welded to blocks 182 bored to loosely slide on guide rods 183. Fig. 24 illustrates one of the guide rods 183 as being arranged at a slight angle to the bed plate 6. Both Figs. 23 and 24 illustrate the lip 178 in its extreme advanced position, while Fig. 4 illustrates the lip in its retracted position, at which time it projects slightly beyond the hem 28 of the foremost bag 18. Wings 181 connect the blocks 182 as a unit, and the two guide rods 183 lie in the same plane when viewed according to Fig. 24.

Means for sliding the blocks 182 on the guide rods 183 comprises an arm 184, see Figs. 6 and 13, which arm is bolted to one of the blocks 182 and extends through a slot 185 in the bed plate 6, see Fig. 13. The lower end of the arm 184 is pivotally connected with one end of a rod 186, see Figs. 1 and 6, and the opposite end of the rod is pivotally connected with a lever 187. Fig. 43 illustrates the lower end of the lever 187 as being pivotally connected with a support 188 secured to one of the members 3. The lever 187 is provided with a roller 189 which rides in a groove 190 in the cam 191 of Fig. 47. Fig. 43 illustrates the cam 191 as being secured to the shaft 56. Groove 190 is so fashioned as to actuate the lever 187 for moving the lip 178 from its retracted position of Fig. 4 to its extreme advanced position of Figs. 23 and 24. In Figs. 6 and 12, I illustrate a block 192 secured to the bed plate 6, to which block is secured one end of each of the guide rods 183.

In Fig. 41, the bar 147 has its rear end secured to a carriage plate 193 by bolts 194, only one of which is illustrated. The ends of the carriage plate 193 are welded to two blocks 195, see Fig. 37, and the blocks are bored to slide freely on two guide rods 196, see Fig. 3. Posts 197 support the forward ends of the rods 196, which posts are secured to the bed plate 6 by bolts 198, see Figs. 5 and 37. A block 199 is welded to the bed plate 6 for supporting the rear ends of the guide rods 196, with the guide rods arranged at an angle to the bed plate and axially aligned with the guide rods 183, best illustrated in Fig. 1.

Figs. 23, 24, 25 and 41 illustrate the bar 147 as being provided with a slot 200 for the reception of the rod 153, with the rod slidable in bores 201 in webs 202, see Figs. 25 and 41. In Fig. 41, the rear end of the rod 153 is provided with a collar 203 secured thereto by a set screw 204. The collar 203 is provided with a circumferential groove 205 within which a pin 206 on one end of a lever 207 is disposed. Lever 207 is pivotally mounted intermediate its ends on a bolt 208 carried by a bracket 209 secured to the carriage plate 193 by bolts 210.

Fig. 41 illustrates the collar 203 as abutting the web 202 at that end of the bar 147, and the rod 153 is provided with a collar 211 secured thereto by a set screw 212. Collar 211 is slightly spaced from the edge of the web 202 opposite the collar 203, so that collar 211 may be brought into engagement with the web 202 when the lever 207 is pivoted in the direction of the arrow 213. With the lever 207 in the position of Fig. 41, rod 153 is pushed forwardly so that its angular face 154 of Fig. 24 presses against the angular face 155 on the shank 150 to bring the jaw 149 into pressure relation with the jaw 148 for bag gripping purposes. Pivotal movement is imparted to the lever 207 by a rod 214, see Fig. 41, which is pivotally connected at one end with the lever 207. Fig. 41 illustrates the plunger gripper 146 in its rearmost position, while Figs. 23 and 24 illustrate the plunger gripper in its foremost position. The plunger gripper 146, which is carried by the blocks 195 sliding on the guide rods 196, is shifted to its two extreme positions by the rod 214, which rod, together with the lever 207, serves as an actuating means for the rod 153 as well as the plunger gripper 146.

Figs. 1 and 13 illustrate the rod 214 as extending forwardly of the bed plate 6, and the forward end of the rod is pivotally connected with a lever 215 which extends downwardly and is pivotally conected at its lower end with a support 216, see Fig. 43, secured to one of the members 3. A roller 217 is carried by the lever 215 intermediate its ends, which roller operates in a groove 218 in a cam 219, see Fig. 46, with the cam secured to the shaft 56, as illustrated in Fig. 43.

Groove 218 is so fashioned as to shift the plunger gripper 146 from the retracted position of Fig. 41 to the advanced position of Figs. 23 and 24. When a pull is exerted on the shaft 214, the plunger gripper 146 is advanced, with the rod 153 shifted to bring the collar 211 into engagement with the web 202 of Fig. 41. With the shaft 153 retracted, the jaw 149 of Fig. 25 is free and may be pivoted upwardly as the lip 178 is projected into position.

As the lip 178 is advanced to fold the tongue 145 in the bottom of the bag, the cam 219 actuates the lever 215 for moving the rod 214 rearwardly, and such rearward motion of the rod pivots the lever 207 of Fig. 41 in a direction reversely of the arrow 213, so that the pivotal motion of the lever will advance the rod 153 for shoving its angular face 154 against the angular face 155 of the shank 150, see Fig. 24, for pressing the jaw 149 in the direction of the jaw 148. Thus rearward motion of the rod 214 will advance the rod 153 for clamping the tongue 145 between the jaws 148 and 149 before the plunger gripper 146 is actuated. Collars 203 and 211 of Fig. 41 are adjustable so as to secure precise positioning thereof. Continued rearward movement of the rod 214 will shift the plunger gripper 146 rearwardly to the position of Fig. 1. Such rearward travel of the plunger gripper 146 will exert a pull on the bottom end of the bag 18 of Figs. 23 and 24, and since the tongue 145 is located inside the bag 18, movement of the plunger gripper 146 from the positions of Figs. 23 and 24 to the position of Fig. 41 will reverse the bag to bring its right side outside.

According to Fig. 23, the reversing grippers 45 have their lips 127 projecting toward the bottom end of the bag 18, but when the bag 18 has been completely turned to the position of Fig. 22, which illustrates the plunger gripper 146 in its rearmost position, the lips 127 will project in the opposite direction and will lie inside the bag rather than outside thereof.

Fig. 21 illustrates the plunger gripper 146 in a retracted position short of its extreme retracted position. During rearward movement of the plunger gripper 146, the reversing grippers 45 are rotated so as to bring the lips 127 and 128 inside the bag. Means for rotating the reversing grippers 45 comprises a double rack 220, see Fig. 39, which is arranged in mesh with the two pinions 124. Since each pinion 124 is connected with one hollow shaft 122, such as that illustrated in Fig. 38, the two hollow shafts of the two reversing grippers will be rotated simultaneously in opposite directions to turn the reversing grippers 45 in the directions of the arrows 221 of Fig. 21. Fig. 10 illustrates the double rack 220 as lying adjacent the bottom face of the bed plate 6, and the double rack is slidably supported in this position by means of two screws 222 threaded into the bed plate and extending loosely through a slot 223 in the double rack, see Fig. 39.

Figure 5:
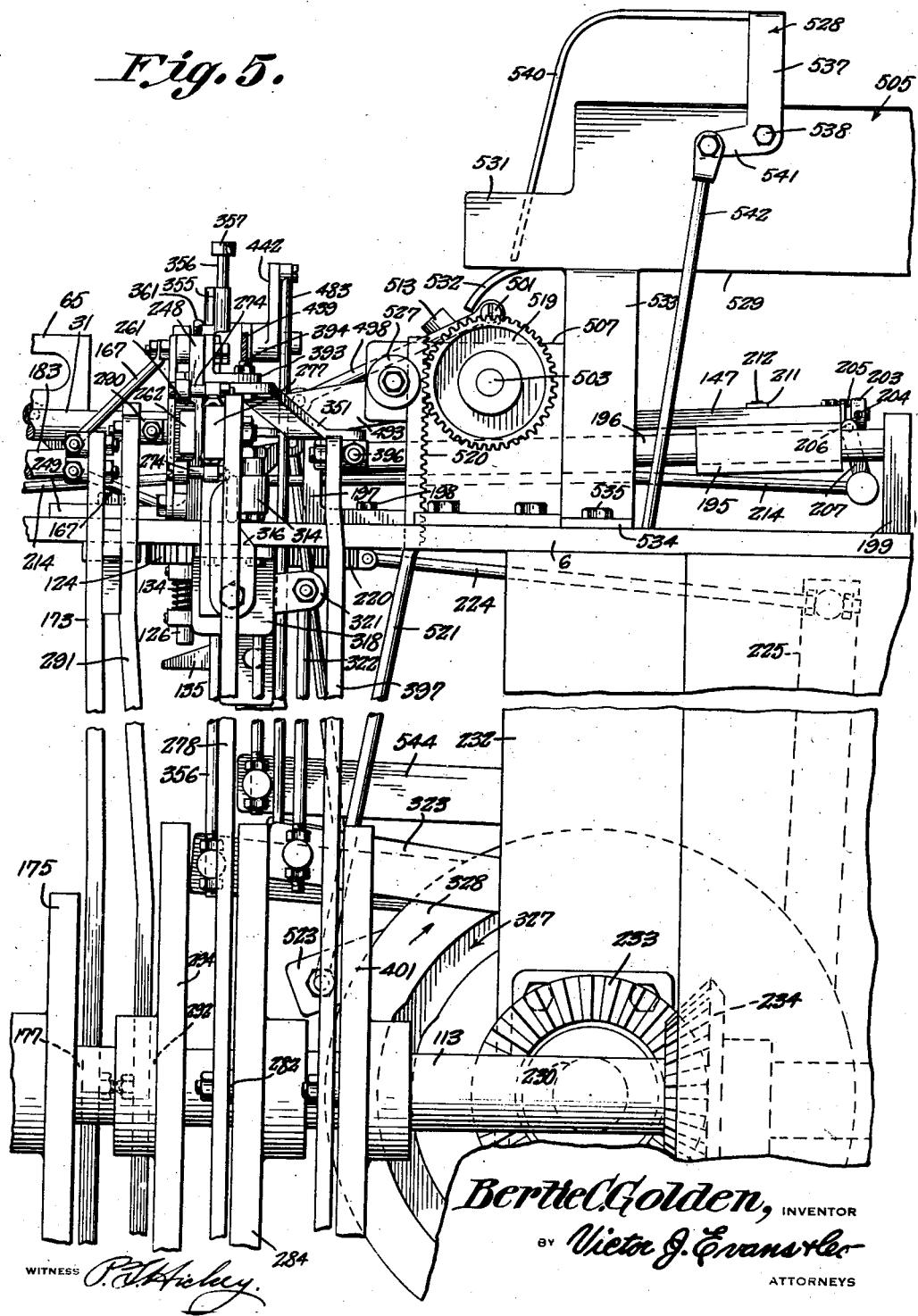
Figure 5 is a side elevational view of the structure illustrated in Figure 3.

Means for actuating the double rack 220 comprises a rod 224 pivotally connected at one end with the double rack, see Figs. 5 and 39, with the other end of the rod pivotally connected with a lever 225, which lever has its lower end pivotally connected with a support 226, see Fig. 43, secured to one of the members 3. Lever 225 is provided with a roller 227 intermediate its ends to operate in a groove 228, see Fig. 57, in a cam 229 secured to a shaft 230, see Fig. 43. Groove 228 of Fig. 57 is so fashioned as to pivot the lever 225 in such manner as to impart reciprocatory motion to the rod 224 for actuating the double rack 220.

Fig. 22 illustrates the two reversing grippers 45 completely reversed, and the plunger gripper 146 and the two reversing grippers 45 retain their grips on the bag 18 of Fig. 22 until the draw strings have been incorporated in the two hems 28 of the bag. Fig. 10 illustrates the bag 18 in its needle acting position, which conforms to the position of the bag of Fig. 22.

In Fig. 43, the shaft 230 is rotatably journaled in bearings 231 mounted on one of the upright channels 2 and an angle 232 having its upper end welded to the bed plate 6 and its lower end similarly secured to one of the members 3, see also Fig. 5. A bevel gear 233 is secured to the shaft 230 and meshes with a bevel gear 234 secured to the shaft 113. It will thus be seen that the shafts 56, 113 and 230 are geared together so as to rotate in unison.

In view of the fact that the bags move in a horizontal plane through the machine, provision must be made for bringing the lip 178 into coaction with the jaws 148 and 149 in the plane through which the bags move. Since the reversing grippers 45, particularly their lips 127 and 128, lie in the plane of the bags advanced on the plate 16, the lip 178 and the plunger gripper 146 must be normally disposed in the clear of the plane of the advancing bags.

The guide rods 183, which constitute a mount for the lip 178, are located beneath the plate 16, and the guide rods are angled so as to elevate the lip 178 as it is moved in the direction of the plunger gripper 146. In the same way, the guide rods 196, which constitute a support for the plunger gripper 146, are angled so as to cause the jaws 148 and 149 to move downwardly relatively to the bed plate 6 as the plunger gripper is being advanced in the direction of the lip 178. Accordingly, the lip 178 is brought into coacting relation with the jaws 148 and 149 at the proper moment and in the plane of the bag to be reversed. Thus the lip 178 may be located underneath the plate 16 so as not to interfere with the advancing bags and at the same time providing an arrangement which is relatively compact in that the lip 178 and its actuating structure is located underneath the plane of the plate 16.

Figure 3:
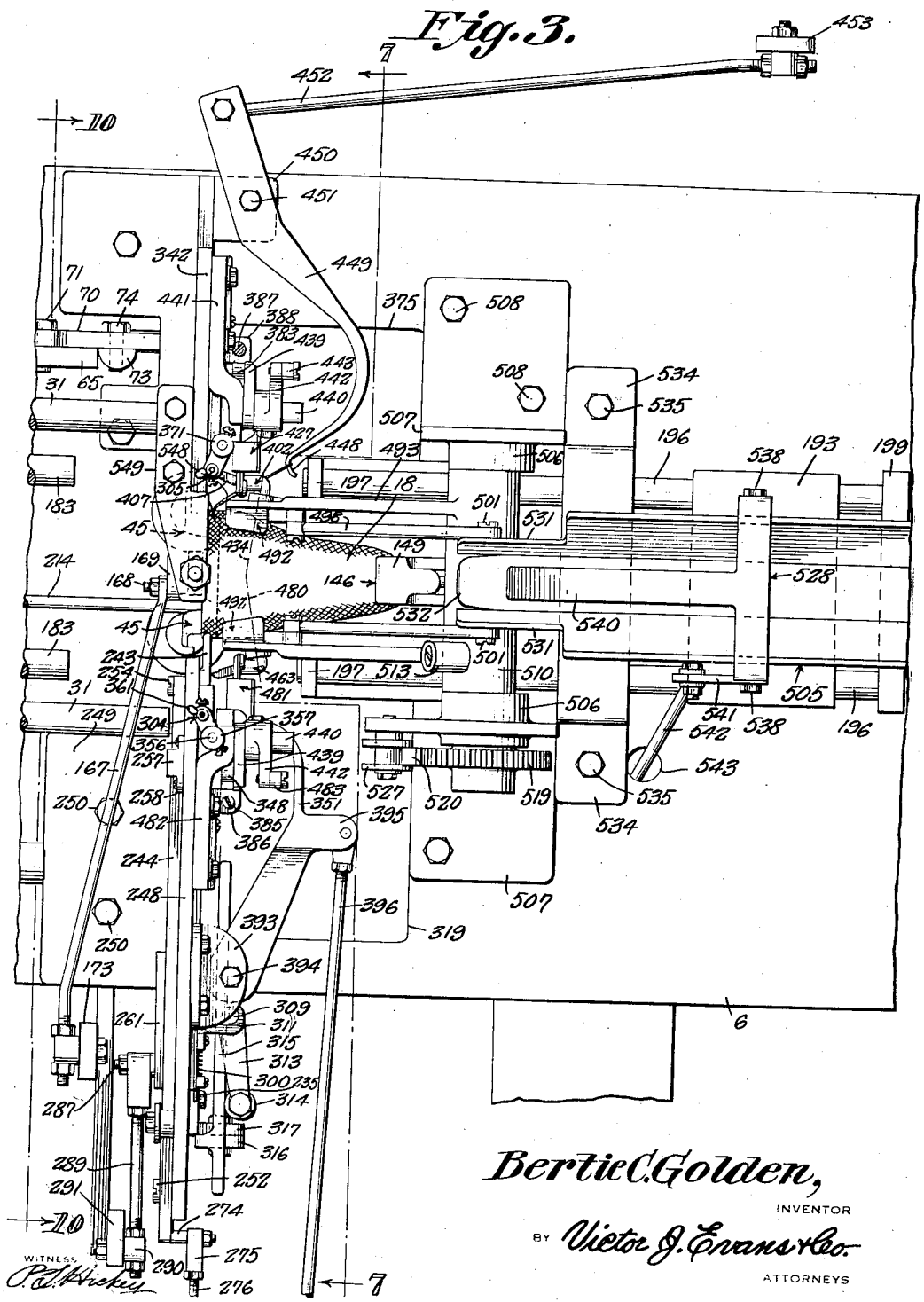
Figure 3 is a top plan view of the reversing mechanism and the draw string threading mechanism.

Figs. 3 and 10 illustrate the bag 18 in the draw string threading position in the machine. In Fig. 30, the draw string threading needles 235 and 236 are arranged in parallel relation and partly advanced for pulling the draw string 237 through the two hems 28. The side walls 238 of the bag 18 are supported in a taut manner, with the upper side wall lying on the upper face of the lip 127 of the adjacent reversing gripper 45, which is largely removed in Fig. 30 for the sake of clearness. The bottom side wall 238 lies adjacent the outer face of the lip 128, with the flanges 44 clamped firmly between the lips 127 and 128.

Both needles 235 and 236 are provided with pointed ends 239 to facilitate penetration of the hems. To enable the points 239 to easily penetrate the two hems immediately upon engagement therewith, I provide two hem lifting needles 240 arranged to penetrate the two hems and lift the hem areas adjacent the needles to provide bulges 241 which are penetrated by the points 239. Needles 240 lie in the plane of the needles 235 and 236, and the points 239 are brought into engagement with the bulges 241 closely adjacent the needles 240 so that the points will penetrate immediately upon engagement with the bulges to the end that the draw string 237 may enter the bag closely adjacent the side seam 242. As the needles 235 and 236 are advanced for threading the draw string 237 through the two hems 28, the points 239 will penetrate the hems on the other side of the bag without any difficulty and without the aid of hem conditioning needles such as those illustrated at 240. The needles 235 and 236 slide along the side walls 238 so that the points 239 will penetrate the two hems on the other side of the bag closely adjacent the side seam on that side.

In Fig. 30, I illustrate the needles 240 as being carried by ears 243 fashioned at the ends of bars 244 which constitute mounts for the needles as well as actuating means therefor. The ears are recessed at 245 which provide room for the bulges 241, and the needles 240 are so angled as to easily penetrate the hems 28 immediately upon engagement therewith. The needles 240 are normally spaced closer together, as illustrated in Fig. 10 so as to engage the hems 28 when the ears 243 are advanced from the position of Fig. 10 to the position of Fig. 30, and after reaching the position of Fig. 30, the ears 243 are separated to form the bulges 241. The needles 240 fit partly inside bores 246 in their respective ears 243, see Fig. 26, and the ears are provided with set screws 247 which clamp the needles in position and permit the needles to be adjusted to precise positions with respect to the hems 28.

Referring to Fig. 10, the bars 244 are mounted on one side of a plate 248 secured edgewise on the bed plate 6 through the medium of a flange 249 and bolts 250. Each bar is provided with a slot 251 adjacent one end thereof for reception of a screw 252 threaded into the plate 248, with the heads of the screws holding the bars 244 against the side of the plate, but the bars are slidable on the plate as well as pivotal about the axes of the screws 252. The other ends of the bars 244 are provided with openings 253 for the reception of screws 254 threaded into the plate 248. Openings 253 are of such size as to permit the bars 244 to move longitudinally the necessary distance in addition to permitting the necessary pivotal movement of the bars for separating the ears 243 from their normal positions of Fig. 10 to the hem bulging positions of Fig. 30.

The bars 244 are urged in the direction of each other to their normal relative positions of Fig. 10 through the medium of pins 255. Fig. 11 illustrates the pin 255 associated with the upper bar 244, which pin is slidable in a bore 256 in a body 257 provided with ears 258 lying adjacent the plate 248 and bored for the reception of screws 259 threaded into the plate 248. The pin of Fig. 11 is urged against the bar 244 by reason of a compression spring 260 disposed in the bore 256. Both pins 255 are spring-pressed and supported in accordance with the structure of Fig. 11.

Fig. 10 illustrates the bars 244 as lying in engagement with a cam member 261 slidable on a bar 262. Thus the cam member 261 constitutes a spacer for the bars 244 for restraining the bars from pivotal movement in the direction of each other beyond the relative positions of Fig. 10. Cam member 261 lies in the plane of the plate 248, and the latter is provided with an opening 263 within which the cam member is disposed, see Figs. 26, 27 and 28. Fig. 28 illustrates the cam member 261 as being provided with an opening 264 for loosely receiving the bar 262, so that the cam member may be shifted longitudinally of the bar 262.

In Fig. 27, the plate 248 is fashioned with a flange 265 against which I position a flange 266 fashioned at one end of the bar 262 and secure the flanges into a unitary structure by means of screws 267, see Figs. 26 and 27. Fig. 10 illustrates the opposite end of the bar 262 as being secured to a web 268 constituting material of the plate 248 through the medium of screws 269.

Figs. 26, 27 and 28 illustrate the cam member 261 as constituting a mount for the needles 235 and 236. The cam member is provided with grooves 270 within which the needles are positioned. A plate 271 is provided with grooves 272 for receiving the needles 235 and 236, but the grooves 270 and 272 are sufficiently shallow to hold the plate 271 slightly spaced from the cam member 261 when the bolts 273 are tightened. Bolts 273 pass loosely through openings in the plate 271 and are threaded into the cam member 261. Thus the needles 235 and 236 may be firmly clamped in position, are maintained in parallel relation and may be adjusted for length.

Means for imparting endwise motion to the bars 244 for advancing the needles 240 into the hems 28 comprises laterally projecting pins 274 carried by the outer ends of the bars, see Figs. 5 and 10. Pins 274 are pivotally connected with beads 275, see Figs. 3, 7 and 10, which heads are connected with rods 276 anchored to a block 277 mounted on a lever 278. Block 277 is provided with a shank 279 passing through an opening in the lever 278 and provided with a nut 280, see Fig. 7. Thus the block 277 is pivotally connected with the upper end of the lever 278. Figs. 1 and 5 illustrate the lever 278 as extending downwardly with its lower end pivotally connected with a support 281 attached to one of the members 3, see Fig. 1. In Fig. 43, the lever 278 is provided with a roller 282 intermediate its ends which rides in a groove 283, see Fig. 52, in a cam 284 mounted on the shaft 113, see Fig. 43. Cam groove 283 is so contoured as to pivot the lever 278 for advancing the bars 244 from their normal retracted positions of Fig. 10 to the hem lifting positions of Fig. 30. However, mere endwise movement of the bars 244 causes the needles 240 to penetrate the hems only, and pivotal motion is imparted to the bars 244 through the medium of the cam member 261 for pivoting the bars 244 to the positions of Fig. 30.

Figs. 10 and 30 illustrate the bars 244 as being provided with cam surfaces 285 arranged in the path of the cam member 261 to be engaged by the latter when advanced in the direction of the arrow 286. Fig. 30 illustrates the bars 244 substantially pivoted to their extreme positions. Further movement of the cam member 261 in the direction of the arrow 268 will pivot the bars 244 a slightly greater distance which will also cause the bulges 241 to increase slightly so that the bulges of Fig. 30 are substantially complete only. While the needles 235 and 236 are carried and advanced by the cam member 261, the points 239 of the needles, when in their retracted positions of Figs. 26 and 27, must travel such distance as to permit the cam member 261 to pivot the bars 244 to their extreme hem bulging positions before the points penetrate the hems.

Means for actuating the cam member 261 includes a bolt 287, see Figs. 10, 27 and 28, secured to the cam member 261, and a head 288 is pivotally mounted on the bolt and connected with one end of a link 289, see Fig. 10. The other end of the link is connected with a head 290, see Figs. 3 and 5, and the head 290 is pivotally connected with the upper end of a lever 291 having its lower end pivotally connected with the support 174, see Fig. 1. In Fig. 43, the lever 291 is provided with a roller 292 intermediate its ends which rides in a groove 293 in a cam 294, see Fig. 51. Cam 294 is mounted on the shaft 113.

Bar 262 is of such length as to guide the cam member 261 throughout its entire travel for advancing the needles 235 and 236 from their extreme retracted position of Fig. 26 to the extreme projected position of Fig. 31. Fig. 31 illustrates the needles 235 and 236 as having their points 239 projected considerable distances beyond the side of the bag opposite the entry side of Fig. 30, the latter figure illustrating the needles slightly advanced beyond the positions of Fig. 26. The groove 293 in the cam 294 of Fig. 51 is so fashioned as to impart a rapid to-and-fro motion to the needles 235 and 236, but the groove is contoured such that the needles will have a period of idleness in each of the positions of Figs. 26 and 31, so that the respective draw strings may be threaded through the needles. Figs. 44 to 60 show all the cams of the machine in their true relative positions, and at the moment that the needles 235 and 236 arrive substantially at the position of Fig. 36 on their travel from the position of Fig. 31 to the position of Fig. 26.

Figs. 26 and 29 illustrate each of the needles 235 and 236 as being hollow, with a string clamp rod 295 slidably mounted in the needle 235 and a string clamp rod 296 slidably mounted inside the needle 236. To the cam member 261 is secured a member 297 bored to loosely receive the clamp rods 295 and 296, and each clamp rod has a body 298 secured thereto by a screw 299. Between each of the bodies 298 and the member 297 is interposed a compression spring 300. The springs are respectively mounted on the clamp rods 295 and 296 for yieldingly urging their respective clamp rods forwardly of the needles 235 and 236.

Each of the needles 235 and 236 is provided with an eye 301 adjacent its point 239 through which the draw string 237 is threaded from the supply string 302 pulled from a ball (not shown). Fig. 29 illustrates the draw string 237 severed from the supply string 302, with the clamp rods 295 and 296 securely clamping the ends of the draw string against the needle abutments 303. Fig. 26 more clearly illustrates the manner in which the supply string 302 is threaded through the eyes 301 of the needles 235 and 236 preparatory to forming the draw string 237.

A needle threader 304 is arranged to thread the supply string 302 through the eyes 301 when the needles 235 and 236 are in their extreme retracted positions of Figs. 26 and 29. A similar needle threader 305 is arranged to thread a second supply string 306 through the eyes 301 when the needles 235 and 236 are in their extreme projected positions of Figs. 31 and 35 to provide the second draw string 307 of Figs. 35 and 36. Figs. 2, 3, 7 and 10 best illustrate the relative spacing of the needle threaders 304 and 305. Fig. 31 illustrates the draw string 237 drawn through the hems 28 and the supply string 306 is threaded through the eyes 301 after the ends of the draw string 237 have been released by the clamp rods 295 and 296 and pulled from the eyes 301.

In Figs. 26 and 27, a finger 308 extends into the path of the bodies 298 for actuating the clamp rods 295 and 296, which finger is secured to a shaft 309 by a set screw 310. Shaft 309 is rotatably journaled in supports 311, see Fig. 7, secured to the cam member 261 by screws 312. An arm 313 has one end fixedly secured to the shaft 309 and the opposite end of the arm is provided with a roller 314 engaging a race plate 315 operable to actuate the arm 313. The springs 300 urge the bodies 298 in the direction of the finger 308 but both bodies 298 do not at all times engage the finger, since the action of the springs is limited by the clamp rods 295 and 296 when engaging their respective needle abutments 303 so as to permit firm clamping of the ends of the two draw strings.

Fig. 7 illustrates the race plate 315 as being provided with two arms 316 for respective pivotal connection with a bracket 317 depending from the plate 248 and a bracket 318 bolted to the bed plate 6, the latter being provided with an opening 319 for accommodating pivotal movement of the associated arm 316. The two arms 316 are pivotally connected with their respective brackets 317 and 318 by bolts 320. Figs. 5 and 7 illustrate one of the arms 316 as being provided with a lever 321 to the end of which is pivotally connected the upper end of a rod 322 having its lower end pivotally connected with a lever 323. Lever 321 extends substantially horizontally and at right angles to its respective arm 316 so that the lever and the arm constitute a bell crank for pivoting the race plate 315.

In Fig. 43, the lever 323 has its opposite end pivotally connected with a support 324 secured to a frame member 325. The lever is provided with a roller 326 intermediate its ends to operate in a groove 327 in a cam 328, see Fig. 54. Cam 328 is keyed to the shaft 230. In Fig. 54, the groove 327 is fashioned with runs 329 and 330 which are concentrically arranged with respect to the axis of the cam and spaced equal distances from the axis. Run 330 is of considerably longer length than the run 329. Runs 331 and 332 are also concentrically arranged about the axis of the cam and at equal distances therefrom. Run 332 is of considerably longer length than the run 331. Runs 333 and 334 are also concentrically arranged with respect to the axis of the cam and at the same distances therefrom, with the run 334 of considerably longer length than the run 333. Arrow 335 indicates the direction of rotation of the cam. Runs 329 and 330 are spaced nearest to the axis of the cam and the runs 333 and 334 are located the greatest distances, while the runs 331 and 332 are located at intermediate positions.

A slight rotation of the cam 328 from the position of Fig. 54 brings the roller 326 into the run 330 which causes the lever 323 to pivot downwardly and exert a pull on the lever 322. Such movement of the lever 322 imparts a pull on the lever 321 of Figs. 5 and 7 which causes the race plate 315 to pivot in the direction of the arrow 336, see Fig. 27, for pivoting the arm 313 in the direction of the arrow 337. Such movement of the arm 313 pivots the finger 308 against the bodies 298 for moving the clamp rods 295 and 296 to their fully retracted positions entirely clear of the eyes 301. At this time, the needles 235 and 236 are positioned according to Figs. 26 and 29 and the clamp rods remain fully retracted during the travel of the roller 326 of Fig. 54 throughout the full length of the run 330.

Needle threader 304 of Figs. 26 and 29 comprises a tube 338 having a bore 339 of such diameter as to provide a loose fit for the supply string 302. Fig. 29 illustrates the tube 338 in its uppermost position while Fig. 26 illustrates the tube in its lowermost or needle threading position. Tube 338 is axially slidable in a vertical bore 340 in a guide 341 bolted to the plate 248.

Needle threader 305 is identical in construction and operation with the needle threader 304, with the exception that its guide 341 is bolted to a plate 342 bolted to the bed plate 6. Fig. 10 illustrates the plate 342 provided with flanges 343 fixedly secured to the bed plate 6 by bolts 344. Accordingly, like reference characters are applied to the two needle threaders. Tube 338 is provided with a string feeding tube 345 of relatively small inside and outside diameters, with the guide 341 provided with a small bore 346 through which the tube 345 projects when the needle threader 304 is in the needle threading position of Fig. 26. Supply string 302 fits tightly in the feeding tube 345 so as to be pulled downwardly with the needle threader. A fine wire may be attached to the end of the supply string 302 and pulled through the feeding tube 345 for pulling the string into the tube, after which the string is frictionally retained against accidental slipping.

In Fig. 29, the lower end of the feed tube 345 is positioned some distance above the face 347 on the guide 341, and Fig. 26 illustrates a cutting blade 348 lying against the face 347 to sweep along the face and sever the supply string 302 to detach the draw string 237 therefrom. Blade 348 bears against the face 347 and has its cutting edge lying thereagainst so that the face and the blade function with a scissors action for cutting the string. Assuming that the roller 326 of Fig. 54 lies in the run 330 of the groove 327, the clamp rods 295 and 296 are in their extreme retracted positions, at which time the ends of the rods completely uncover both eyes 301 in the needles 235 and 236. The threader 304 then moves downwardly from the position of Fig. 29 to the position of Fig. 26. Feeder tube 345 passes through the eye 301 in the needle 235 and the string end 349 is projected into the eye 301 of the needle 236. Continued rotation of the cam 328 brings the roller 326 into the run 332 of the cam which imparts a slight upward movement to the lever 323 for actuating the race plate 315 to move the latter reversely of the arrow 336 of Fig. 27. Race plate 315 moves sufficiently far to bring the finger 308 out of holding engagement with the body 298 attached to the clamp rod 296, whereupon the spring 300 engaging that body 298 causes the end of the clamp rod 296 to firmly clamp the string end 349 against the abutment 303 of the needle 236. Needle threader 304 then moves upwardly to the position of Fig. 29 and the supply string 302 is looped laterally of the needles 235 and 236 to form the draw string 237 with respect to length.

Figs. 26 and 27 illustrate a hook 350 fashioned at one end of a string pulling arm 351. Hook 350 lies closely adjacent the plate 248 while the supply string is being threaded through the needles 235 and 236, and the arm 351 is moved in the direction of the arrow 352 of Fig. 27 after the string end 349 has been clamped against the abutment 303 of the needle 236 and after the feeding tube 345 has moved upwardly to clear the hook 350. Movement of the arm 351 shifts the hook 350 from its full line position of Fig. 27 to the dotted line position illustrated therein which fashions a loop in the supply string to form the draw string 237. String end 349 is firmly clamped against accidental withdrawal so that movement of the arm 351 in the direction of the arrow 352 causes the hook 350 to pull additional string length through the feed tube 345. As the supply string is looped by the hook 350 to fashion the draw string 237, continued rotation of the cam 328 brings the roller 326 into the run 334 for shifting the race plate 315 sufficiently far to move the finger 308 out of pressure engagement with the body 298 attached to the clamp rod 295. Spring 300 acting on that clamp rod moves the latter to securely clamp the supply string against the abutment 303 of the needle 235, after which the blade 348 is brought into play for severing the supply string. At this time, the two ends of the draw string 237 are securely clamped as illustrated in Fig. 29 preparatory to insertion of the draw string in the hems 28, best illustrated in Fig. 30.

In Figs. 7, 10, 26 and 29, the tube 338 of the needle threader 304 is securely clamped in an arm 353 by a set screw 354, which arm projects laterally of a tube 355 in which is slidably disposed a rod 356 having a head 357 arranged to engage the upper end of the tube 355 to move the needle threader 304 downwardly from the position of Fig. 29 to the position of Fig. 26. In Figs. 26 and 29, a compression spring 358 is mounted on the rod 356 and between the lower end of the tube 355 and a bracket 359 bolted to the plate 248. Spring 358 exerts an upward pressure on the tube 355, and the tube is moved downwardly against the tension of the spring when the rod 356 is moved downwardly sufficiently far to bring the head 357 into engagement with the upper end of the tube. With the needle threader 304 positioned according to Fig. 29, the head 357 is spaced from the tube 355 in the manner illustrated in Figs. 7 and 10.

Rod 356 extends downwardly through a bracket 360 bolted to the plate 248 and through the opening 319 in the bed plate 6, see Figs. 7 and 26. Upward movement of the tube 355 is limited by reason of a hook 361 secured to the plate 248 and arranged in the path of the arm 353. The rod 356 is slidable in both brackets 359 and 360, and its lower end is pivotally connected with one end of a lever 362, see Fig. 10. In Fig. 43, the lever 362 is pivotally connected at its opposite end with a support 363 attached to the member 325, and the lever is provided with a roller 364 intermediate its ends. Fig. 55 illustrates the roller 364 as riding in a groove 365 in a cam 366 keyed to the shaft 230. Groove 365 is so fashioned as to impart a downward pull on the rod 356 at the proper moment so that the feed tube 345 is projected through the eye 301 of the needle 235 when both the clamp rods 295 and 296 are in their fully retracted positions.

In Fig. 31, the tube 338 of the needle threader 305 is secured to an arm 367 through the medium of a set screw 368, and the arm 367 projects laterally of a tube 369 in which a rod 370 is slidably disposed, see also Figs. 7 and 10. Rod 370 is provided with a head 371 arranged to engage the upper end of the tube 369 for actuating the needle threader 305. In Fig. 31, a compression spring 372 is mounted on the rod 370 and is interposed between the lower end of the tube 369 and a bracket 373 bolted to the plate 342. Rod 370 is slidably guided by the bracket 373 and also by a bracket 374 bolted to the plate 342, see also Fig. 7. Rod 370 extends through an opening 375 in the bed plate 6, see Fig. 7, and the lower end of the rod is pivotally connected with one end of a lever 376, see Fig. 10. In Fig. 43, the opposite end of the lever 376 is pivotally connected with a support 377 secured to the member 325, and a roller 378 is mounted on the lever intermediate its ends. In Fig. 58, the roller 378 operates in a groove 379 in a cam 380 keyed to the shaft 230. Groove 379 actuates the lever 376 for pulling the rod 370 downwardly, which in turn moves the tube 338 of Fig. 31 downwardly for threading the feed tube 345 through the eye 301 of the needle 235 for positioning the string end 349 in the eye 301 of the needle 236.

Fig. 32 is a view illustrating the structure of Fig. 31 but with the structure rotated ninety degrees. The rod 370 is provided with a bend 381, and the bend passes loosely through an opening 382 in a blade 383 having its cutting edge lying snugly against the face 384 of the guide 341 to coact therewith for shearing the supply string 302 in the same manner as the blade 348 of Fig. 26.

Fig. 7 illustrates the blade 348 as having a pivotal connection 385 with a bracket 386 bolted to the plate 248. Blade 383 has a pivotal connection 387 with a bracket 388 bolted to the plate 342. Fig. 7 also illustrates the rod 356 as having a bend 389 passing loosely through an opening in the blade 348. Bends 381 and 389 impart pivotal motion to the blades 348 and 383, respectively, through reciprocation of their respective rods 370 and 356.

Fig. 32 illustrates the blade 383 as being positioned to one side of the axis of the needle threader 305, with the blade located intermediate the ends of the bend 381, at which time the rod 370 is in its uppermost position and its head 371 spaced some distance from the upper end of the tube 369, see Fig. 7. Accordingly, a slight downward movement of the rod 370 brings the cutting edge 390 of the blade 383 to the left of the axis of the needle threader 305 so that the feed tube 345 of that needle threader may pass downwardly without interference from the blade. The blade remains in the latter position until the needle threader has descended and returned to its upper position after which the blade is brought into play for severing the supply string in the same manner as set forth in connection with the blade 348 and the supply string 302.

In spacing the head 371 of Fig. 7 from the upper end of the tube 369, the rod 370 may descend sufficient distance for positioning the blade 383 in a cutting position before the needle threader 305 is caused to descend. The bend 389 of Fig. 7 actuates the blade 348 in the same manner, since the head 357 of the rod 356 is also spaced some distance from the upper end of the tube 355 when the bend 389 is positioned in the manner illustrated. In other words, both blades 348 and 383 are first moved closely to the plates 248 and 342, respectively, before their respective needle threaders 304 and 305 are caused to descend. Thus the supply strings 302 and 306 are severed by movement of the blades 348 and 383, respectively, in directions away from their respective plates 248 and 342. The bends are so located as to permit both needle threaders to be elevated to their extreme upper positions before their respective blades are caused to cut the respective supply strings.

Fig. 27 illustrates the supply string 302 of Fig. 26 as being looped to fashion the draw string 237. Needles 235 and 236 are slidable in openings 391 in a bracket 392 bolted to the plate 248 to guide the needles and to afford support therefor for any lateral pull that may be exerted thereon, as when the draw string 237 is being fashioned. Figs. 2, 3 and 7 illustrate the arm 351 as having its end opposite the hook 350 pivotally connected with a bracket 393 through the medium of a bolt 394, with the bracket bolted to the plate 248. A lug 395 is fashioned on the arm 351 for pivotal connection with one end of a rod 396. In Fig. 5, the upper end of a lever 397 is pivotally connected with the rod 396, and Fig. 1 illustrates the lever 397 as having its lower end pivotally connected with a support 398 secured to one of the members 3. A roller 399 is mounted on the lever 397 intermediate its ends, see also Fig. 43, which operates in a groove 400 in a cam 401, see Fig. 53. Cam 401 is keyed to the shaft 113.

The groove 400 is so fashioned as to swing the arm 351 to the position of Figs. 3 and 27 before the needle threader 304 is moved to the needle threading position of Fig. 26. Fig. 26 illustrates the string end 349 clamped against the abutment 303 of the needle 236. As the needle threader 304 is elevated, the arm 351 is pivoted to the dotted line position of Fig. 27, the clamp rod 295 is then projected to clamp the supply string against the abutment 303 of the needle 235 and the supply string is cut by the blade 348. The needles 235 and 236 are then advanced and the bars 244 of Fig. 30 advanced to project the pins 240 through the hems 28, and the bulges 241 are formed in the hem through the separating action of the bars 244 imparted thereto by the cam member 261. The cam member is advanced for passing the needles 235 and 236 through the two hems 28 and to the position of Fig. 31. The needles have a period of idleness in the position of Fig. 31 with their eyes 301 axially aligned with the feed tube 345, and during this period of idleness, a string gripper 402 is brought into play for securing a clamped grip on the draw strings 237 closely adjacent the ends thereof. The groove 400 in the cam 401 is so fashioned as to pivot the arm 351 from its dotted line position of Fig. 27 to the full line position illustrated therein during projection of the needles 235 and 236 from the position of Fig. 26 to that illustrated in Fig. 31. Thus the arm offers no resistance to threading of the draw string through the hems and the hook 350 will be so positioned as to permit the bight of the draw string to fall therefrom.

String gripper 402 comprises a tube 403 having a right-angular shaft 404 rotatably journaled in a bearing 405 secured to the bed plate 6 by screws 406, see Fig. 32. To the upper end of the tube 403 is secured a finger 407 and a shaft 408 is slidably mounted inside the tube 403 and is provided with a finger 409 which parallels the finger 407 and is movable toward and away from the latter through reciprocation of the shaft 408 relatively to the tube 403.

String gripping finger 402 is moved from the dotted to the full line position of Fig. 32 as the needles 235 and 236 come to rest in the position of Fig. 31. Each needle 235 and 236 is provided with a recess 410 for the reception of the fingers 407 and 409, as illustrated in Fig. 32, with the finger 407 positioned between the needle 235 and the upper run of the draw string 237 and the finger 409 located between the needle 236 and the lower run of the draw string. Fingers 407 and 409 lie in juxtaposed relation when the string gripper 402 is in the dotted line position of Fig. 32, and the finger 409 moves to the full line position as the string gripper pivots to the needles 235 and 236. Fig. 7 illustrates the shaft 404 as being provided with an arm 411 to the end of which is pivotally connected one end of a rod 412 extending through an opening 413 in the bed plate 6. Fig. 7 also illustrates the shaft 408 as having a pivotal connection at 414 with a rod 415 extending through the opening 375 in the bed plate 6. Vertical movement of the rod 412 imparts pivotal motion to the string gripper 402 while vertical movement of the rod 415 imparts reciprocatory motion to the shaft 408.

In Fig. 10, the rod 412 has its lower end pivotally connected with one end of a lever 416 having its other end pivotally connected with a support 417, see Fig. 43, anchored to the member 325. A roller 418 is mounted on the lever 416 intermediate its ends to operate in a groove 419, see Fig. 59, in a cam 420 keyed to the shaft 230. As the string gripper 402 takes the position of Fig. 32, the rod 415 is moved upwardly for bringing the finger 409 into clamping proximity with the finger 407 with respect to the runs of the draw string 237 positioned therebetween.

The lower end of the rod 415 is pivotally connected with one end of a lever 421, see Figs. 10 and 43, having its opposite end pivotally connected with a support 422 anchored to a member 423 secured to two of the upright channels 2. A roller 424 is mounted on the lever 421 intermediate its ends and rides on the peripheral face of the cam 420. Fig. 59 illustrates the cam 420 as being provided with a cam rib 425 projecting above the peripheral face of the cam for engagement with the roller 424 to actuate the lever 421. Thus the lever 421 is actuated by the cam rib 425 for imparting reciprocatory motion to the rod 415 and the shaft 408 of Fig. 7 to which the finger 409 of Fig. 32 is connected. Fig. 10 illustrates a tension spring 426 as having its upper end connected with the free end of the lever 421 to hold the latter in pressure engagement with the peripheral face and the cam rib 425 of the cam 420. The other end of the spring may be attached to one of the members 3 of the frame structure.

As the draw string 237 is firmly clamped near its ends between the two fingers 407 and 409, the roller 326 of Fig. 54 drops into the run 329 of the groove 327 which causes both clamp rods 295 and 296 to be moved to their fully retracted positions so that movement of the string gripper 402 toward the dotted line position of Fig. 32 will pull the string ends from the eyes 301 of the needles 235 and 236.

In Fig. 32, a knotter 427 is mounted on the plate 342 through the medium of a bracket 428, which knotter is of the conventional scissors type and includes the usual three beaks 429, 430 and 431. Fig. 3 illustrates the relative position of the knotter 427 with respect to the string gripper 402, and Fig. 32 illustrates the beaks projecting downwardly so that the draw string 237 gripped by the string gripper 402 will be pulled crosswise of the three beaks but upon the far sides of the beaks when viewed according to Fig. 32. Fig. 33 illustrates the string gripper 402 in a string retracting position and the beaks 429, 430 and 431 rotated in the direction of the arrow 432 for looping the draw string 237 about the shank structure 433 of the knotter 427. The axis of the shaft 404 of Fig. 7 about which the string gripper 402 is pivoted is illustrated by the dotted line 434 of Fig. 3. Accordingly, the draw string 237 is moved across the far side of the beaks 429, 430 and 431 of Fig. 32 and is then bent back slightly about the beaks as an axis. The beaks rotate as a unit about an axis paralleling the plate 342 which causes the beaks to engage the draw string and loop the string about the shank structure 433 of Fig. 33, as at 435. The operation of knotters of the scissors type is more fully described in the following Patents: 672,635 and 672,636, Colman, Apr. 23, 1901; 755,110, Colman, Mar. 22, 1904; 959,592, Peterson, May 31, 1910; 1,029,853, Colman, June 18, 1912, and 1,072,575, Colman, Sept. 9, 1913.

After formation of the loop 435, as in Fig. 33, continued rotation of the beaks 429, 430 and 431 causes the beak 430 to pivot relatively to the beaks 429 and 431, as illustrated in Fig. 7, so that the run 436 of the draw string 237, see Fig. 33, is receivable between the beak 430 and the beaks 429 and 431. In Fig. 59, the groove 419 is so fashioned as to impart such pivotal or oscillatory motion to the string gripper 402 as to maintain the necessary tautness to or slack in the draw string 237 while the beaks are acting thereon. As the run 436 of Fig. 33 is brought into position between the beaks, continued rotation of the beaks causes the beak 430 to pivot to a position between the beaks 429 and 431. Beaks 429 and 430 function as a scissors to cut off the tail end of the run 436 closely adjacent the loop 435, while the ends of the draw string closely adjacent the point of severance are clamped between the beaks 430 and 431. The ends of the draw string 237 are firmly clamped against accidental withdrawal and the beaks continue rotation to the position of Fig. 34, at which time the draw string 237 may be knotted by merely exerting a pull on the bag 18 which pulls the loop 435 off the grouped beaks with the string ends 437 securely clamped so that the loop pulls over the ends. Thus a pull on the draw string 237 with the string ends 437 clamped between the beaks 429 and 430 closes the loop 435 and forms a tight knot closely adjacent the ends of the draw string.

Beaks 429, 430 and 431 remain in the position of Fig. 34, as best illustrated in Fig. 14, until the draw string 307 has been threaded through the hem 28 and conditioned in accordance with the illustration of draw string 237 in Fig. 34. Means for actuating the knotter 427 of Figs. 32, 33 and 34 comprises a rotative worm 438, see Fig. 7, actuated by a worm rack 439 fixed to a rotative shaft 440 journaled in a bracket 441, see Fig. 3, bolted to the plate 342. Knotter 427 and its actuating means are old and well known in the art and need not be described in further detail.

In Figs. 3 and 7, a lever 442 has one end fixed to the shaft 440 and the other end of the lever is pivotally connected with a rod 443 extending downwardly through the opening 375 of Fig. 7 for pivotal connection with one end of a lever 444, see Figs. 10 and 43, having its opposite end pivotally connected with a support 445 attached to the member 325. In Fig. 59, the lever 444 is provided with a roller 446 intermediate its ends for operation in a groove 447 in the cam 420. Rotation of the cam 420 oscillates the lever 444 for imparting oscillatory motion to the worm rack 439 of Fig. 7, which in turn imparts the necessary rotary motion to the knotter 427.

With the draw string 237 conditioned according to Figs. 14 and 34, the needles 235 and 236 of Fig. 31 have been previously positioned at rest with their eyes 301 axially aligned with the feed tube 345. With the clamp rods 295 and 296 retracted, the needle threader 305 is caused to descend for threading the supply string 306 through the two eyes 301. Such threading of the supply string occurs when the roller 326 of Fig. 54 is positioned in the run 329. A slight rotation of the cam 328 brings the roller 329 into the run 331 of the cam for bringing the clamp rod 296 into clamping engagement with the end of the supply string 306. At this time, the hook 448, see Figs. 3 and 31, fashioned at one end of an arm 449 lies closely adjacent the plate 342 for engagement with the supply string having its end secured against the abutment 303 of the needle 236. Fig. 3 illustrates a bracket 450 attached to the plate 342 and the arm 449 pivotally connected with the bracket through the medium of a bolt 451. Bolt 451 is located intermediate the ends of the arm 449 and the end of the arm opposite the hook 448 is pivotally connected with a rod 452 having its other end pivotally connected with a lever 453. In Fig. 43, the lever 453 has its lower end pivotally connected with a support 454 attached to a frame member 455, with the lever provided with a roller 456 operating in a groove 457, see Fig. 60, in a cam 458 keyed to the shaft 230.

Figure 35:
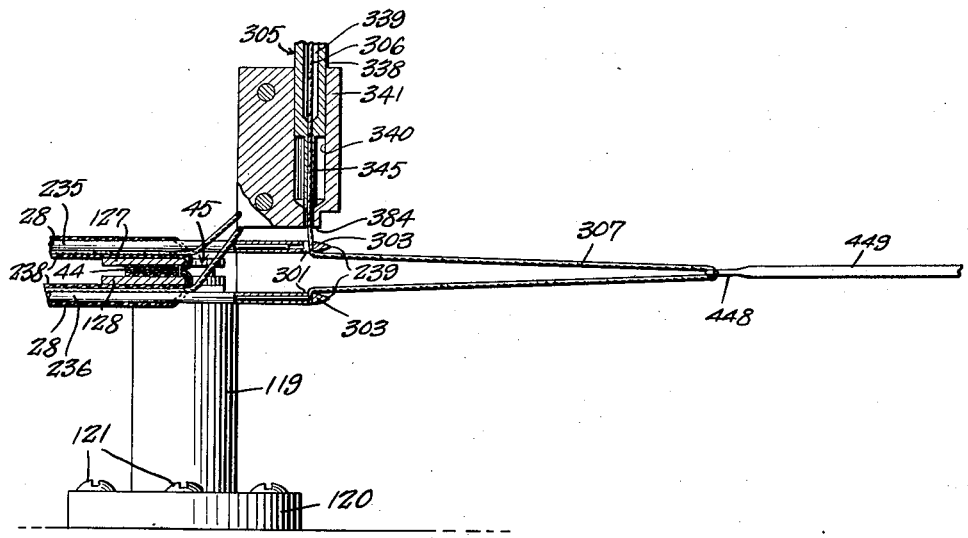
Figure 35 is a sectional detail view illustrating one of the draw strings being pulled for length.

Figs. 3 and 35 illustrate the supply string 306 pulled by the hook 448 to fashion the draw string 307. The cam groove 457 of Fig. 60 is so fashioned as to oscillate the lever 453 for actuating the arm 449 to pull the supply string and fashion the draw string 307. As the draw string 307 is pulled for length, the clamp rod 295 is projected against the abutment 303 of the needle 235 and the blade 383 of Figs. 7 and 32 is actuated for severing the supply string 306 as the threader 305 returns to its uppermost position of Figs. 31 and 35. Such projection of the clamp rod 295 is consummated through positioning of the roller 326 of Fig. 54 in the run 333 of the cam groove 327.

Figure 36:
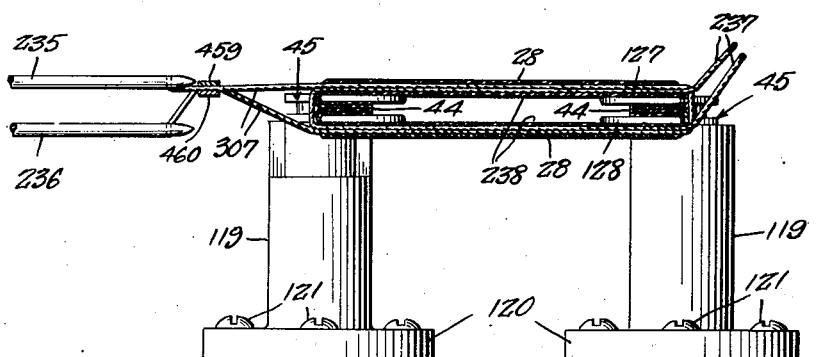
Figure 36 is a view illustrating one draw string pulled for length and grasped by the gripping elements of one of the string grippers.

Upon securing of the ends of the draw string 307 against the abutments 303 of the needles 235 and 236, the needles are retracted to the positions of Fig. 29, and the fingers 459 and 460, see Fig. 36, secure a clamped grip on the draw string 307. Fingers 459 and 460 are respectively identical with the fingers 407 and 409 of Figs. 32 and 33 and are respectively carried by the tube 461 and a shaft 462 of a string puller 463, see Fig. 7. The tube 461 and the shaft 462 are respectively identical with the tube 403 and the shaft 408 of Fig. 32. Tube 461, see Fig. 7, is provided with a shaft 464 rotatable in a bearing 465 secured to the bed plate 6, and the shaft is provided with an arm 466 pivotally connected with the upper end of a rod 467 extending through an opening 468 in the bed plate 6. The lower end of the rod 467, see Fig. 10, is connected with one end of a lever 469 having its other end pivotally connected with a support 470 fastened to the member 325 of Fig. 43. The lever 469 is provided with a roller 471 intermediate its ends which operates in a groove 472, see Fig. 56, in a cam 473 keyed to the shaft 230. Groove 472 is fashioned to oscillate the lever 469 for pivoting the string puller 463. The finger 460 of Fig. 36 is actuated through the medium of a rod 474, see Fig. 7, having its upper end pivotally connected with the shaft 462, and the lower end of the rod 474 is pivotally connected with one end of a lever 475, see Fig. 10, having its opposite end pivotally connected with a support 476, see Fig. 43, attached to the member 423. Lever 475 is provided with a roller 477 intermediate its ends for engagement with the peripheral face of the cam 473. In Fig. 56, the cam 473 is provided with a cam rib 478 extending beyond the peripheral face of the cam for engagement with the roller 477. Fig. 10 illustrates a tension spring 479 having one end connected with the lever 475 for holding the roller 477 of the lever in engagement with the cam. The other end of the spring 479 may be attached to the framework of the machine. Cam rib 478 actuates the lever 475 to impart reciprocatory motion to the rod 474 and the shaft 462 of Fig. 7 for moving the finger 460 of Fig. 36 toward and away from the finger 459. The string clamping action of the fingers 459 and 460 is identical with that of the fingers 407 and 409 of Figs. 32 and 33.

Fig. 3 illustrates the axis of the shaft 464 of Fig. 7 by the dotted line 480 so that the string gripper 463 is arranged identically with the string gripper 402 for coaction with a knotter 481, see Fig. 7, which is identical with the knotter 427. The worm rack 439 of the knotter 481, see Fig. 7, which meshes with the worm 438, has its shaft 440 rotatably journaled in a bracket 482 bolted to the plate 248, see also Fig. 3. The arm 442 of the knotter 481, which is fixed to the shaft 440, has its outer end pivotally connected with a rod 483, see Fig. 7, which extends through the opening 319 in the bed plate 6 for pivotal connection with one end of a lever 484, see Fig. 10, having its opposite end pivotally connected with a support 485 attached to the member 325 of Fig. 43. Fig. 56 illustrates the lever 484 as being provided with a roller 486 intermediate its ends, which roller operates in a groove 487 in the cam 473.

Cam groove 487 is fashioned to reciprocate the rod 483 of Fig. 7 to operate the cam rack 439 of the knotter 481 in the manner set forth in connection with the corresponding parts associated with the knotter 427. Knotter 481 has the same beak construction and the beaks operate to fashion a knot in the draw string 307. String puller 463 of Fig. 7 operates in the same manner as the string puller 402. Fig. 14 illustrates the draw string 237 connected with the knotter 427 and the draw string 307 connected with the knotter 481. Upon connection of both draw strings with their respective knotters, the two knots are drawn tight and the respective strings pulled from the knotters through lifting of the bag 18 when in the position of Fig. 14.

In Fig. 31, the plate 342 is provided with a recess 488, and a body 489 is bolted to the plate and provided with conically shaped recesses 490 terminating in small bores 491 located axially of the needles 235 and 236. The points of the needles have loose fits with respect to the conical recesses 490, but the walls of the recesses function as restraining means for the needles in the event of excessive lateral forces thereon, particularly in the event of unusual forces during pulling of the supply string 306 to fashion the draw string 307 of Fig. 35. Bores 490 provide entrance for the needle points in the event that such needle points should extend beyond the positions illustrated in Fig. 31.

In Fig. 3, the bag 18 has its side edges closely adjacent the reversing grippers 41 lying in gripping proximity with bag lifting clamps 492. The clamps 492 are identical in construction and operation so that the description of one will apply to both. In Fig. 41, the bag lifting clamp 492 includes an arm 493 having a jaw 494 fixed thereto and overlying the side margin of the bag 18. A companion jaw 495 is fashioned at one end of a bell crank 496 pivoted to the arm 493 by a rivet 497. Jaw 495 lies underneath the side margin of the bag 18 directly opposite the jaw 494 so that this margin of the bag may be tightly clamped between the two jaws when the bell crank 496 is pivoted for moving the jaw 495 against the bag. One end of a link 498 is pivotally connected with the bell crank 496 by a bolt 499, and the opposite end of the link is pivotally connected with one end of an arm 500, as by a bolt 501.

Referring to Figs. 3, 37 and 42, the two arms 500 are carried by bodies 502 bored for the reception of a shaft 503, and the bodies are fixed to the shaft by set screws 504. Since the arms 500 are fixedly related to the shaft 503, rotation of the shaft imparts pivotal motion to the bell cranks 496 through the medium of the links 498. The bag lifting clamps 492 operate to stack the bags in a collecting hopper 505.

Shaft 503 is rotatably carried by bearings 506 fashioned on standards 507 secured to the bed plate 6 by bolts 508, see Fig. 3. In Fig. 42, one of the bearings 506 is provided with a sleeve 509 upon which the bearing 510 at one end of one of the arms 493 is loosely mounted. The bearing 511 of the other arm 493 is loosely mounted on the shaft 503, and the bearings 510 and 511 are fixedly related one to the other through the medium of an interconnecting web 512. Bearing 510 is provided with a boss 513 provided with a bore 514 for the reception of a compression spring 515 held in the bore by a plug 516 threaded into the bore. One end of the spring 515 engages a plug 517 frictionally engaging the sleeve 509, and the bearing 510 is rotatable on the sleeve 509 against the frictional resistance incident to engagement of the plug 517 with the sleeve. Links 498 impart motion to the arms 493 and the two arms move as a unit because of the interconnecting web 512.

In Fig. 41, the arm 500 illustrated therein is in its bag clamping position with respect to the relative clamping positions of the jaws 494 and 495. Fig. 41 illustrates the bag delivering position of one of the arms 493 with respect to the hopper 505. Movement of the arm from its full line position to the dotted line position of Fig. 41 is accomplished through rotation of the shaft 503 in a clockwise direction when viewing Fig. 41. Since the arms 500 are fixedly connected with the shaft 503, rotation of the arms in a clockwise direction exerts a pull on the links 498 which causes the bell crank 496 to pivot against the bag 18 to clamp the latter between the jaws 494 and 495. Arm 493 remains in its full line position until the jaw 495 has been shifted from its dotted to full line position. With the two jaws clamped upon the bag 18, further rotation of the arm 500 swings the arm 493 upwardly and rearwardly to its dotted line position. In the latter position, the arm 500 is slightly spaced from the edge 518 of the web 512. Upon rotation of the shaft 503 in a counterclockwise direction, the arm 500 swings upwardly and pivots the jaw 495 to a full open position. The full open position of the jaw is determined through engagement of the arms 500 with the edge 518, after which further rotation of the arm 500 imparts rotary motion to the bearing 502. Thus the arm 493 is swung downwardly to its full line position with the jaw 495 maintained in an open position with respect to the jaw 494. The jaws 494 and 495 are spaced at the time that the bag 18 of Fig. 3 is reversed and pulled to the position illustrated therein. The bag is clamped after the two draw strings are placed therein and the shaft 503 rotated in a clockwise direction sufficiently far to swing the jaw 495 into clamping proximity with the jaw 494. Since the two bodies 502 are fixedly connected through the medium of the web 512, both arms 493 are connected as a unit and the two sets of jaws upon opposite sides of the bag 18 are simultaneously actuated in the same degree.

The bag is firmly clamped between the two sets of jaws so that movement of the two bag lifting clamps from the full to the dotted line position of Fig. 41 exerts a pull on the draw strings 237 and 307 for pulling the knotted ends of the strings from the knotters 427 and 481. The string ends are clamped in their respective knotters in such a degree as to exert a considerable pull on the draw strings when the bag lifting clamps are elevated so that the two knots will be drawn tightly.

Means for actuating the shaft 503 comprises a gear 519 keyed to the shaft, see Figs. 3 and 5, with the gear arranged in mesh with a rack 520 fashioned at one end of a rod 521 which extends through an opening 522 in the bed plate 6, see Fig. 37. The lower end of the rod 521 is pivotally connected with one end of a lever 523, see Fig. 5, and the opposite end of the lever is pivotally connected with a support 524, see Fig. 43, attached to the member 325. In Fig. 55, the lever 523 is provided with a roller 525 intermediate its ends for operation in a groove 526 in the cam 366.

Groove 526 imparts oscillatory motion to the lever 523 for reciprocating the rod 521 which in turn imparts rotary motion to the gear 519 keyed to the shaft 503. In Figs. 3 and 5, a flanged guide wheel 527 is rotatably mounted on one of the standards 507 for holding the rack 520 in meshing engagement with the gear 519. While the reversing clamps 45 remain clamped to the flaps 44, see Fig. 36, until both draw strings 237 and 307 have been threaded through the hem 28, knotted and the bag lifting clamps 492 clamped on the bag, as in Fig. 41, the cam groove 143 of Fig. 45 is so fashioned as to operate the lever 140 for imparting endwise motion to the link 139, which link is connected with the lever 138 of Fig. 16. Movement of the lever 138 for pivoting the fingers 135 of Fig. 10 upwardly lifts the shafts 126 and brings the lips 127 out of clamping relation with the lips 128 to free the bag. The double rack 220 of Fig. 5 is then actuated for rotating the pinions 124 of Fig. 10 for rotating the reversing grippers to the next bag receiving position, as in Fig. 14. The freed bag is then elevated through the action of the bag lifting clamps 492.

In Figs. 1, 3, 5 and 37, a bag pusher 528 is provided for advancing the supply of bags in the hopper as the successive bags are collected from the bag lifting clamps. In Fig. 37, the hopper 505 is provided with a narrow, flat bottom 529 and side walls 530 which converge in the direction of the bottom. The side walls 530 are provided with wall extensions 531, see Fig. 3. The bottom 529 between the extensions 531 is severed from the extensions and bent downwardly to provide a deflecting lip 532, see Figs. 5, 37 and 41.

In Figs. 3 and 5, the bottom 529 is welded to an inverted U-shaped bracket 533 having its flange elements 534 secured to the bed plate 6 by bolts 535. In Fig. 37, bosses 536 are fashioned on the walls 530, to which bosses the legs 537 of the bag pusher 528 are pivotally connected through the medium of bolts 538. The bight 539 of the bag pusher carries a pusher finger 540. In Fig. 5, one of the legs 537 is provided with a right-angular element 541 pivotally connected with the upper end of a rod 542 which extends downwardly through an opening 543 in the bed plate 6, see Fig. 3.

To the lower end of the rod 542 is connected one end of a lever 544, see Fig. 10, and the other end of the lever is pivotally connected with a support 545 secured to the member 423, see Fig. 43. A roller 546 is mounted on the lever 544 to ride on the peripheral face of the cam 366, and the cam is provided with a cam element 547 fashioned to impart reciprocatory motion to the lever 544, see Fig. 55. Such motion of the lever 544 imparts reciprocatory motion to the rod 542. The angular element 541 of Fig. 5 is so connected with the adjacent leg 537 as to provide a bell crank which causes the bag pusher 528 to pivot about the bolts 538 of Fig. 37 as an axis. Upward movement of the rod 542 pivots the bag pusher 528 to a position for bringing the lower end of the finger 540 sufficiently high to clear the bags 18 as they are successively elevated to the receiving end of the hopper 505. Fig. 1 illustrates the bag pusher 528 in its elevated position in dotted lines. The cam element 547 of Figs. 43 and 55 is so fashioned as to pivot the bag pusher 528 in a clockwise direction when viewing Fig. 1 and raise the finger 540 above the bag carried by the bag lifting clamps 492 when moved to the dotted line position of Fig. 41. The finger 540 remains elevated for a relatively short period of time so as to drop over the bag held by the bag lifting clamps. Fig. 37 illustrates the manner in which the finger 540 engages the bag when elevated by the bag lifting clamps, but this view illustrates the bag lifting clamps lowered. As the finger 540 takes the position of Fig. 37, the shaft 503 of Fig. 41 is rotated in a counter-clockwise direction which immediately moves the jaws 495 out of clamping engagement with the bag so that pivotal movement of the bag lifting clamps in a counter-clockwise direction pulls the jaws 494 clear of the bag with the latter held in the hopper 505 by the finger 540.

Fig. 14 illustrates the plunger gripper 146 clamped on the bottom end of the bag with the bag lifting clamps 492 in bag gripping positions, but the plunger gripper is released at the proper moment so that the clamps 492 will retain their firm clamp on the bag, the only resisting forces consisting in withdrawal of the draw strings 237 and 307 from their respective knotters. The plunger gripper 146, particularly its jaws 148 and 149 are considerably narrower than the normal width of the bag 18. This is also true of the lip 178 which fashions the tongue 145 in the bottom margin of the bag, as in Fig. 23. Accordingly, the bag when reversed will take the contour of Fig. 14, with the sides of the bag converging from full bag width in the zone of the jaws 494 and 495 to a width slightly greater than the width of the jaws 148 and 149. This leaves the side margins of the bag tucked in which facilitates effective filling of the bag to the end that the bottom area may take a flat contour and without projecting ears at the corners of the bag. At the same time, the contour of the bag 18, as in Fig. 14, is such that its taper conforms to the angular relation between the walls 530 of Fig. 37. The narrow bottom ends of the bags will rest on the bottom 529 of the hopper and the converging side edges of the bag fit to the two side walls 530. The bags 18 will stack substantially vertically in the hopper 505, and the bags accumulated in the hopper are pushed rearwardly as succeeding bags are delivered thereto. The draw strings 237 and 307 lie wholly outside their respective bags and hang over the edges of the hopper walls 530. The bags are arranged in a compact and orderly manner in the hopper and the bags are of flat formation in the plane of their respective side seams.

From the foregoing description of the various parts of the device, the operation thereof will be readily understood. The foremost bag 18 in Fig. 4 is securely clamped between the abutments 41 and the faces 40 of the gripper arms 38. Figs. 4 and 13 illustrate the carriage 32 in its rearmost position. As the carriage 32 moves rearwardly toward the position of Fig. 4, the gripper shaft 37 is rotated for swinging the gripper arms 38 downwardly, but the arms have a moment of idleness during their downward pivotal movement when in such positions as to bring the positioning fingers 48 into the plane of the bag 18. Should the foremost bag 18 be advanced too far, the positioning fingers 48 will push the bag rearwardly and as the carriage 32 reaches its final rearmost position, the arms 38 are swung down for bringing the faces 40 of Fig. 16 into clamping proximity with the abutments 41 so as to securely clamp the hemmed part of the bag firmly therebetween. While Fig. 16 illustrates one of the arms 38 only and in the foremost position of the carriage 32, the arm 38 illustrated therein is in the clamping position consummated when the carriage is in its rearmost position.

The gripper arms 38 are brought down on the foremost bag 18 immediately inside the side seam threads 16 of that bag so that the flaps 44 will lie outside the two gripper arms. As the carriage 32 is advanced to present the foremost bag 18 to the reversing grippers 45, see Fig. 15, the bag chain 10 is advanced on the bag supporting plate 16. In the event that the foremost bag 18 was previously pushed back by the positioning fingers 48, advancement of the bag will remove slack therefrom and the bag chain will be advanced upon removal of the slack in the bag. After the bag chain 10 has been advanced, the thread cutter 83 of Figs. 2, 13 and 18 is actuated for severing the side seam links between the first two bags in the chain. The actuating mechanism for the thread cutter is so timed as to set the thread cutter into motion only after any slack has been removed from the foremost bag. Since the thread cutter is mounted on the carriage 32, the thread cutter is always actuated to cut the side seam threads at the same distance from the forward end of the foremost bag, thus precluding severance of the side seam threads too close to the bottom of the foremost bag. In this way, movement of the thread cutter with the gripper arms through the medium of a common carriage and arranging the positioning fingers 48 to push an excessively advanced bag back to a given position, cause the thread cutter to sever the side seam threads at the same distance from the top end of the bag regardless of any variable spacing between the respective bags in the chain.

When the foremost bag 18 reaches the position of Fig. 16, the lips 127 of the reversing grippers 45 are spaced in accordance with Fig. 16 so that the two flaps 44 may be positioned between the lips 127 and 128 of the two reversing grippers. The lips 127 are then brought down on the bag, as in Fig. 17, and the gripper arms 38 are elevated. With the bag 18 made secure by the reversing grippers 45, see Fig. 23, the pin actions 156 connect with the two hems 28 and open the mouth of the bag in the manner illustrated in Fig. 24. Opening of the mouth of the bag facilitates insertion of the plunger gripper 146, and the jaws 148 and 149 are located inside the bag closely adjacent the bottom thereof so that projection of the lip 178 to a position between the two jaws, causes the bottom of th bag to be folded inwardly in the form of th tongue 145 of Fig. 23. The jaws 148 and 14 then secure a clamped hold on the tongue 145.

With the plunger gripper 146 and the revers ing grippers 45 positioned according to Fig. 2: rearward motion of the plunger gripper 14 causes the bottom of the bag to be pulled there through, with the reversing grippers rotating in harmony with the rearward travel of the plunger gripper, but in opposite directions so that the lips 127 and 128 will be positioned inside the bag after complete reversal thereof, as illustrated in Fig. 22. Arrows 221 in Fig. 21 illustrate the direction of rotation of the reversing grippers 45 in connection with the rearward travel of the plunger gripper 146.

Upon complete reversal of the bag 18, the reversing grippers 45 retain their clamped connection with the flaps 44 and the hems 28 are located in the path of the needles 235 and 236. Fig. 30 illustrates the action of the bars 244 in their manipulation of the hem lifting needles 240. The bars are advanced slightly to project the needles 240 into the two hems, but not into the wall structure of the bag. The bars are then separated slightly to impart lifting motion to the needles 240 after their penetration of the two hems, so that the needles 240 form the bulges 241 in the hems to facilitate penetration thereof by the needles 235 and 236.

Before the needles 235 and 236 are advanced into the hems 28, the needle threader 304 threads the supply string 302 of Fig. 26 through the eyes 301 of the needles 235 and 236. As the end 349 of the supply string is positioned in the eye 301 of the needle 236, the clamp rod 296 clamps the end against the abutment 303 of that needle. With the end 349 securely clamped, the arm 351 of Fig. 27 is shifted to the dotted line position which pulls the draw string 237 for length. The clamp rod 295 then clamps the supply string against the abutment 303 of the needle 235, the needle threader 304 having previously been moved back to its retracted position of Fig. 29. The supply string 302 is severed by the blade 348 of Figs. 7 and 26. With the draw string 237 clamped in the needles 235 and 236, the needles are advanced to the position of Fig. 30, so that further advancement of the needles threads the draw string through the two hems 28 and the needles come to rest in the position of Fig. 31.

Fig. 32 illustrates the string gripper 402 positioned to locate the finger 407 between one leg of the draw string 237 and the needle 235 and the finger 409 between the other leg of the draw string and the needle 236. Finger 409 is then moved into clamping proximity with respect to the finger 407 to secure a firm grip on the draw string 237. Movement of the string gripper 402 toward the dotted line position of Fig. 32 pulls the ends of the string from the eyes 301 as the clamp bars 295 and 296 are moved to their fully retracted positions.

String gripper 402 pulls the draw string into the knotting zone of the knotter 427. The draw string 237 is partly knotted as indicated by the loop 435 and the string ends 437. The knotter remains in this position for a period of time.

With the needles 235 and 236 positioned according to Fig. 31, assuming that the clamp rods 295 and 296 have been retracted and the ends of the draw string 237 pulled from the needles, the threader 305 is projected downwardly for threading the supply string 306 through the needle eyes 301. As the end of the supply string 306 reaches the position in the eye 301 of the needle 236, the clamp rod 296 clamps the end of the string against the abutment 303 of that needle and the arm 449 is pivoted in a counter-clockwise direction, as when viewing Fig. 3, so that the hook 448 will pull the supply string 306 to fashion the draw string 307 with respect to length. The clamp rod 295 of the needle 236 is then brought into play for clamping the string against the abutment 303, the needle threader 305 having moved upwardly previous to pivotal motion of the arm 449, and the blade 383 of Figs. 32 and 7 is actuated for severing the draw string 307 from the supply string 306.

With the ends of the draw string 307 clamped in the needles 235 and 236, the needles retract to pull the draw string through the hems 28. The string gripper 463 of Fig. 7 operates in the same manner as the string gripper 402 so that the draw string 307 is taken by the string gripper 463 and pulled into the operating zone of the knotter 481, which knotter operates in the same manner as the knotter 427, so that at a given period the draw strings 237 and 307 have their respective knots partially formed and retained by their respective knotters, as illustrated in Fig. 14.

Fig. 14 illustrates both the reversing grippers 45 in their releasing positions with respect to the reversed bag illustrated therein, but the reversing grippers retain their grip on the bag until both draw strings have been threaded and partially knotted. When the bag 18 of Fig. 14 is reversed through the action of the reversing grippers 45 and the plunger gripper 146, the bag lifting clamps 492 are in the position of Fig. 41, at which time the jaws 495 are spaced considerable distances from their respective jaws 494. As the jaws 495 are pivoted to bag clamping positions, the reversing grippers 45 are released from the bag and assume the next bag receiving positions of Fig. 14.

With the bag 18 of Fig. 14 firmly secured by the bag lifting clamps 492, the clamps are elevated to the dotted line position of Fig. 41. When in this dotted line position, the finger 540 is pivoted downwardly across the bag and the jaws 495 are moved to open positions and the bag lifting clamps again swung downwardly for coaction with the next bag being advanced in the machine. The bag lifting clamps 492 secure firm grips on the bag and the partially formed knots in the strings 237 and 307 of Fig. 14 are drawn tightly and the respective strings pulled from the knotters.

In Figs. 3 and 7, a hook 548 is secured to the plate 342 for engagement with the arm 367 on the tube 369. Hook 548 is functionally identical with the hook 361 associated with the needle threader 304. In Fig. 10, the lower bracket 157 of its respective pin action 156 is secured to the bed plate 6. The upper bracket 157 is secured to a member 549 bolted to a bracket 550, which in turn is bolted to the plate 342.

The reversing grippers 45 coact with the plunger gripper 146 for bag reversing purposes, but the reversing grippers serve an additional function as a support for the open end of the bag for string threading purposes. The lips 127 and 128 of the reversing grippers are in the nature of thin blades engaging flatwise against the flaps of the bag so that, when the grippers are reversed with reversal of the bag, the bag will be supported flat in the plane of the side seams, and the reversing grippers hold the bag with such a degree of tautness as to facilitate proper needle action. While the lips 127 and 128 of the respective reversing grippers 45 lie inside the bag when the latter is reversed, the blades are of such relative thinness as to permit the needles to penetrate the bag hems closely adjacent the side seams.

In severing the supply strings prior to knotting the draw strings, the unknotted draw strings are respectively moved into the action zone of the knotters and the knots partially formed. Partial formation of the knots permits the draw strings to remain clamped in the knotters until such time as both draw strings may be simultaneously pulled from the knotters, with such pulling of the draw strings drawing the knots tight and the draw strings are tensioned in directions laterally of the bag so as to positively preclude the draw strings from falling or being deposited in the bag. The bag lifting clamps 492 grip the bag closely adjacent its open end and the knotters are so located as to pull the draw strings laterally and downwardly of the bag, as illustrated in Fig. 14. The bag lifting clamps are so arranged with respect to the bag that the latter pivots upwardly and rearwardly about its bottom and while being moved from the draw string threading position into the collection hopper 505. Thus the knotters hold the draw strings clear of the open end of the bag and the pivotal movement of the bag in its passage to the hopper is such as to prevent the draw strings from falling into their respective bag mouths.

I claim:

1. A machine for stringing bags having hems at their mouth ends, means for threading draw strings through the hems, bag reversing means supporting successive bags after reversal thereof in draw string threading position, and means for feeding bags to said bag reversing means.

2. A machine for stringing bags having hems at their mouth ends, comprising bag reversing and supporting means, means for supplying bags successively to said reversing means, and means for inserting draw strings in the hems of said bags after reversal and while supported by said bag reversing means.

3. A machine for stringing bags received wrong side out and in chain formation from the sewing stage, comprising bag reversing and supporting means, means for advancing successive bags to said bag reversing means, means for severing the foremost bag of the chain from those following it, and means for inserting draw strings in the hems of said bags after reversal and while supported by said reversing means.

4. A bag stringing machine for bags having hems at their mouth ends, needles for threading draw strings through the hems, means for actuating the needles, bag reversing means supporting successive bags after reversal thereof in a draw string threading position with respect to the needles, means for feeding bags to said bag reversing means, and means acting on said hems to bulge the latter in the path of said needles to facilitate penetration of the hems by the needles.

5. A bag stringing machine designed to handle bags received wrong side out and in chain formation from the sewing stage, which comprises means for advancing the bags, means for severing the foremost bag from those following it, means for reversing the bag so as to bring it right side out, and means for inserting draw strings in the hems of the bag after reversal so that the projecting ends of the draw strings lie wholly outside of the bag.

6. In a bag stringing machine designed to handle bags received wrong side out from the sewing stage, the improvement which comprises means for reversing a bag to bring it right side out, draw string inserting means, means for supporting the bag right side out with its hemmed portions accessible to the draw string inserting means, and means for actuating the draw string inserting means to insert draw strings in the hem of the bag while supported right side out, so that the projecting ends of the draw strings lie wholly outside of the bag.

7. In a bag stringing machine, means for supporting a reversed hemmed bag in stringing position with its side flaps and hemmed portions inside the bag, said supporting means comprising two pairs of side flap grippers, the pairs of grippers being spaced apart a distance substantially equal to the width of the bag mouth, and each pair of grippers engaging one side flap within the mouth of the bag, and means for stringing the reversed bag while supported by said pairs of grippers.

8. In a bag stringing machine, draw string threading needle means, means for advancing successive bags to string threading position, reversing grippers at the draw string threading position adapted to support successive bags during the draw string threading operation, bag reversing means coacting with the gripper means for reversing successive bags, said gripper means initially clamping the bags along the outer side margins thereof and being rotatable to retain their grasp on the bags during and after reversal of the bags and during the threading operation.

9. A stringing machine for bags having side seams providing flaps extending along the side margins of the bags, draw string threading means, reversing grippers adjacent the draw string threading means having pinching elements for connection with the flaps of successive bags exteriorly thereof, and bag reversing means coacting with the grippers to reverse successive bags, said reversing grippers rotating and said pinching elements retaining their grasp on the flaps during and after reversal of the bags, and supporting the bags after reversal during the draw string threading operation.

10. A stringing machine for bags having side seams providing flaps extending along the side margins of the bags, draw string threading means, reversing grippers adjacent the draw string threading means having pinching elements for connection with the flaps of successive bags exteriorly thereof, and bag reversing means coacting with the grippers to reverse successive bags, said reversing grippers rotating and said pinching elements retaining their grasp on the flaps during and after reversal of the bags, and supporting the bags after reversal during the draw string threading operation, and means for delivering successive bags to said grippers.

11. A stringing machine for bags having side seams providing flaps extending along the side margins of the bags, and having hems at their mouth portions, draw string threading means, combined bag reversing and supporting grippers adjacent the draw string threading means, said grippers having pinching elements for connection with the flaps of successive bags, bag reversing means coacting with the grippers to reverse successive bags, and means for supplying successive bags to the pinching elements, said reversing grippers being rotatable and the pinching elements retaining their grasp on the flaps of the bags during and after reversal of the bags and during the stringing operation, the flaps being within the bags after reversal thereof, and the projecting ends of the applied draw strings lying wholly outside the mouth of the bag.

12. In a bag stringing machine, a stringing needle, means for supporting a hemmed bag during the stringing operation, means for imparting rectilinear movement to said needle to insert a draw string in the hem of the bag, a conditioning needle adapted to penetrate the hem just prior to the insertion of the stringing needle, means actuated in timed relation to the movement of the stringing needle for imparting rectilinear movement to said conditioning needle in a direction parallel to the direction of movement of the stringing needle until the conditioning needle penetrates the hem of the bag, and means actuated in synchronism with the movement of the stringing needle for diverting the conditioning needle from its rectilinear path to bulge the hem and facilitate entry of the stringing needle.

13. In a bag stringing machine, a stringing needle, means for supporting a hemmed bag in stringing position adjacent the needle, means for imparting rectilinear movement to said needle to insert a draw string in the hem of the bag, a conditioning needle adapted to penetrate the hem prior to the insertion of the stringing needle, means actuated in timed relation to the movement of the stringing needle for imparting rectilinear movement to said conditioning needle in a direction parallel to the direction of movement of the stringing needle until the conditioning needle penetrates the hem of the bag, and means for diverting the conditioning needle slightly from its rectilinear path to bulge the hem and facilitate entry of the stringing needle.

14. In a bag stringing machine, a hollow stringing needle having an eye opening extending therethrough and an abutment adjacent the eye opening, means for feeding thread through said eye opening, a clamping rod slidable within the hollow needle adapted in one position to clamp the thread against said abutment and in another position to release the thread, and means for actuating said clamping rod in timed relation to said thread feeding means.

15. In a bag stringing machine, a hollow stringing needle having an eye opening and an abutment adjacent the eye opening extending therethrough, means for feeding thread through said eye opening, a clamping rod slidable within the hollow needle adapted in one position to clamp the thread against said abutment and in another position to release the thread, and means for actuating said clamping rod in timed relation to said thread feeding means, the thread feeding means comprising a feed tube adapted to pass through the needle eye.

16. A bag stringing machine comprising first and second draw string threading needles each having an eye and being hollow with an abutment adjacent its eye, reversing grippers and a plunger gripper cooperating therewith for reversing successive bags, said reversing grippers supporting the bags in a needle threading position, first and second string clamps respectively operating inside said first and second draw string threading needles and coacting with their respective abutments for clamping the ends of a draw string, means for selectively actuating said string clamps, and needle actuating means for projecting the needles through the bag supported by said reversing grippers and for locating the needles in first and second string threading positions.

17. A bag stringing machine comprising guide means for a chain of bags, draw string threading needle means, reversing gripper means and bag reversing means coacting with said gripper means for reversing successive bags, said gripper means supporting the successive bags in a draw string threading position with respect to said needle means, a carriage having gripper means for connection with the foremost bag in the chain to advance the bag to said reversing gripper means and said bag reversing means, a cutter means carried by said carriage, and means for actuating said cutter means for severing the foremost bag from the chain.

18. A bag stringing machine comprising guide means for a chain of bags, draw string threading needle means, reversing gripper means and bag reversing means coacting with said gripper means for reversing successive bags, said gripper means supporting the successive bags in a draw string threading position with respect to said needle means, a carriage having gripper means for connection with the foremost bag in the chain to advance the bag to said reversing gripper means and said bag reversing means, and a severing means actuated in timed relation to the movement of said carriage for severing successive foremost bags from the chain.

19. A bag stringing machine comprising guide means for a chain of bags, draw string threading needle means, reversing gripper means and bag reversing means coacting with said gripper means for reversing successive bags, said gripper means supporting the successive bags in a draw string threading position with respect to said needle means, a carriage having gripper means for coacting with the foremost bag in the chain to advance the bag to said reversing gripper means and said bag reversing means, a cutter means carried by said carriage, and means for actuating said cutter means after advancement of the foremost bag to said gripper means and said reversing means for severing that bag from the chain, said cutter means being definitely spaced with respect to said carriage gripper means to sever successive foremost bags from the chain at a predetermined distance from said carriage gripper means.

20. A bag stringing machine comprising guide means for a chain of bags, draw string threading needle means, reversing gripper means and bag reversing means coacting with said gripper means for reversing successive bags, said gripper means supporting the successive bags in a draw string threading position with respect to said needle means, a carriage having gripper means for connection with the foremost bag in the chain to advance the bag to said reversing gripper means and said bag reversing means, and for severing successive foremost bags from the chain.

21. A bag stringing machine comprising guide means for a chain of bags, draw string threading needle means, reversing gripper means and bag reversing means coacting with said gripper means for reversing successive bags, said gripper means supporting the successive bags in a draw string threading position with respect to said needle means, a carriage having gripper means for connection with the foremost bag in the chain to advance the bag to said reversing gripper means and said bag reversing means, a cutter means carried by said carriage, means for actuating said cutter means after advancement of the foremost bag to said gripper means and said reversing means for severing successive foremost bags from the chain, said cutter means being definitely spaced with respect to said carriage gripper means to sever the bags from the chain at a predetermined distance from said carriage gripper means, and bag positioning means actuated by a part of said carriage gripper means for prelocating the next foremost bag in the chain before being gripped by the carriage gripper means.

22. A bag stringing machine comprising guide means for a chain of bags, draw string threading needle means, reversing gripper means and bag reversing means coacting with said gripper means for reversing successive bags, said gripper means supporting the successive bags in a draw string threading position with respect to said needle means, a carriage having gripper means for connection with the foremost bag in the chain to advance the bag to said reversing gripper means and said bag reversing means, a severing means actuated in timed relation to the movement of said carriage for severing the successive foremost bags from the chain, said severing means being definitely spaced with respect to said carriage gripper means to sever the successive foremost bags from the chain at a predetermined distance from the carriage gripper means, and bag positioning means actuated by a part of said carriage gripper means for prelocating the next foremost bag in the chain before being gripped by the carriage gripper means.

23. A bag stringing machine comprising a guide means for bags having continuous side seams connecting the bags in chain formation, draw string threading needle means, reversing gripper means and bag reversing means coacting with said gripper means for reversing successive bags, said gripper means supporting the successive bags in a draw string threading position with respect to said needle means, a carriage having gripper means for connection with the foremost bag in the chain to advance the bag to said reversing gripper means and said bag reversing means, and scissors means carried by said carriage for severing the side seams between the first two bags in the chain.

24. A bag stringing machine comprising a guide for bags having continuous side seam threads connecting the bags in chain formation, said side seam threads being located on the bags to provide flaps along the side margins of the bags, draw string threading needle means, reversing grippers and bag reversing means coacting with said reversing grippers for reversing successive bags, said grippers connecting with said flaps and arranged for supporting the successive bags in a draw string threading position with respect to said needle means, a carriage having grippers for connection with the foremost bag in the chain for advancing the bag to said reversing grippers and reversing means, a cutter means carried by said carriage for severing the side seam threads between the first two bags in the chain, and means for actuating said cutter means after advancement of the foremost bag to said reversing grippers and reversing means.

25. A bag stringing machine comprising a guide for bags having continuous side seam threads connecting the bags in chain formation, said side seam threads being located on the bags to provide flaps along the side margins of the bags, draw string threading needle means, reversing grippers and bag reversing means coacting with said reversing grippers for reversing successive bags, said grippers connecting with said flaps and arranged for supporting the successive bags in a draw string threading position with respect to said needle means, a carriage having grippers for connection with the foremost bag in the chain for advancing the bag to said reversing grippers and reversing means, a cutter means carried by said carriage for severing the side seam threads between the first two bags in the chain, said cutter means being located a predetermined distance from said carriage grippers to sever the side seam threads a predetermined distance from the bottom of the bag being severed from the chain, and means for actuating said cutter means after advancing the foremost bag to said reversing grippers and reversing means.

26. A bag stringing machine comprising a guide for bags having continuous side seam threads connecting the bags in chain formation, said side seam threads being located on the bags to provide flaps along the side margins of the bags, draw string threading needle means, reversing grippers and bag reversing means coacting with said reversing grippers for reversing successive bags, said grippers connecting with said flaps and arranged for supporting the successive bags in a draw string threading position with respect to said needle means, a carriage having grippers for connection with the foremost bag in the chain for advancing the bag to said reversing grippers and reversing means, a cutter means carried by said carriage for severing the side seam threads between the first two bags in the chain, said cutter means being located a predetermined distance from said carriage grippers to sever the side seam threads a predetermined distance from the bottom of the bag being severed from the chain, means for actuating said cutter means after delivery of the foremost bag to said reversing grippers and reversing means, and positioning means associated with said carriage grippers for prelocating the foremost bag in the chain before being gripped by said carriage grippers.

27. A bag stringing machine comprising a guide for bags having continuous side seam threads connecting the bags in chain formation, said side seam threads being located on the bags to provide flaps along the side margins of the bags, draw string threading needle means, reversing grippers and bag reversing means coacting with said reversing grippers for reversing successive bags, said grippers connecting with said flaps and arranged for supporting the successive bags in a draw string threading position with respect to said needle means, a carriage having grippers for connection with the foremost bag in the chain for advancing the bag to said reversing grippers and reversing means, a cutter means carried by said carriage for severing the side seam threads between the first two bags in the chain, said carriage grippers comprising abutments fixedly related to said carriage and a rock shaft carried by the carriage and provided with gripper arms coacting with said abutments, and means for rocking said shaft to adjust the gripper arms relatively to said abutments.

28. A bag stringing machine comprising a guide for bags having continuous side seam threads connecting the bags in chain formation, said side seam threads being located on the bags to provide flaps along the side margins of the bags, draw string threading needle means, reversing grippers and bag reversing means coacting with said reversing grippers for reversing successive bags, said grippers connecting with said flaps and arranged for supporting the successive bags in a draw string threading position with respect to said needle means, a carriage having grippers for connection with the foremost bag in the chain for advancing the bag to said reversing grippers and reversing means, a cutter means carried by said carriage for severing the side seam threads between the first two bags in the chain, said carriage grippers comprising abutments fixedly related to said carriage and a rock shaft carried by the carriage and provided with gripper arms coacting with said abutments, means for rocking said shaft to adjust the gripper arms relatively to said abutments, and positioning fingers carried by said gripper arms for shifting excessively advanced foremost bags to a predetermined position.

29. A bag stringing machine comprising guide means for a chain of bags, draw string threading needle means, reversing gripper means and bag reversing means coacting with said gripper means for reversing successive bags, said gripper means supporting the successive bags in a draw string threading position with respect to said needle means, a carriage having gripper means for connection with the foremost bag in the chain to advance the bag to said reversing gripper means and said bag reversing means, a cutter means carried by said carriage, means for actuating said cutter means after advancement of the foremost bag to said gripper means and said reversing means for severing that bag from the chain, said carriage gripper means comprising abutments fixedly related to said carriage and a rock shaft carried by the carriage and provided with gripper arms coacting with said abutments, and means for rocking said shaft to adjust the gripper arms relatively to said abutments.

30. A bag stringing machine comprising a guide for bags having continuous side seam threads connecting the bags in chain formation, said side seam threads being located on the bags to provide flaps along the side margins of the bags, draw string threading needle means, reversing grippers and bag reversing means coacting with said reversing grippers for reversing successive bags, said grippers connecting with said flaps and arranged for supporting the successive bags in a draw string threading position with respect to said needle means, a carriage having grippers for connection with the foremost bag in the chain for advancing the bag to said reversing grippers and reversing means, a cutter means carried by said carriage for severing the side seam threads between the first two bags in the chain, said carriage grippers comprising abutments fixedly related to said carriage and a rock shaft carried by the carriage and provided with gripper arms coacting with said abutments, a rock arm fixed to said rock shaft, and means operatively associated with said rock arm for actuating the latter to adjust said gripper arms relatively to said abutments.

31. A bag stringing machine comprising guide means for a chain of bags, draw string threading needle means, reversing gripper means and bag reversing means coacting with said gripper means for reversing successive bags, said gripper means supporting the successive bags in a draw string threading position with respect to said needle means, a carriage having gripper means for connection with the foremost bag in the chain to advance the bag to said reversing gripper means and said bag reversing means, a cutter means carried by said carriage for severing the foremost bag from the chain, said reversing gripper means clamping the bags along outer side margins adjacent the mouths thereof and rotating to retain their grasp on the bag after reversal thereof and during action of the draw string threading needle means.

32. A bag stringing machine comprising guide means for a chain of bags, draw string threading needle means, reversing gripper means and bag reversing means coacting with said gripper means for reversing successive bags, said gripper means supporting the successive bags in a draw string threading position with respect to said needle means, a carriage having gripper means for connection with the foremost bag in the chain to advance the bag to said reversing gripper means and said bag reversing means, a cutter means carried by said carriage, and means for actuating said cutter means after advancement of the foremost bag to said gripper means and said reversing means for severing that bag from the chain, said cutter means being definitely spaced with respect to said carriage gripper means to sever successive foremost bags from the chain at a predetermined distance from said carriage gripper means, said reversing gripper means clamping the bags along outer side margins adjacent the mouths thereof and rotating to retain their grasp on the bag after reversal thereof and during action of the draw string threading needle means.

33. A bag stringing machine comprising a guide for bags having continuous side seam threads connecting the bags in chain formation, said side seam threads being located on the bags to provide flaps along the side margins of the bags, draw string threading needle means, reversing grippers and bag reversing means coacting with said reversing grippers for reversing successive bags, said grippers connecting with said flaps and arranged for supporting the successive bags in a draw string threading position with respect to said needle means, a carriage having grippers for connection with the foremost bag in the chain for advancing the bag to said reversing grippers and reversing means, a cutter means carried by said carriage for severing the side seam threads between the first two bags in the chain, said reversing gripper means clamping the bags along outer side margins adjacent the mouths thereof and rotating to retain their grasp on the bag after reversal thereof and during action of the draw string threading needle means.

34. A bag stringing machine comprising a guide for bags having continuous side seam threads connecting the bags in chain formation, said side seam threads being located on the bags to provide flaps along the side margins of the bags, draw string threading needle means, reversing grippers and bag reversing means coacting with said reversing grippers for reversing successive bags, said grippers connecting with said flaps and arranged for supporting the successive bags in a draw string threading position with respect to said needle means, a carriage having grippers for connection with the foremost bag in the chain for advancing the bag to said reversing grippers and reversing means, a cutter means carried by said carriage for severing the side seam threads between the first two bags in the chain, said carriage grippers comprising abutments fixedly related to said carriage and a rock shaft carried by the carriage and provided with gripper arms coacting with said abutments, and means for rocking said shaft to adjust the gripper arms relatively to said abutments, said reversing gripper means clamping the bags along outer side margins adjacent the mouths thereof and rotating to retain their grasp on the bag after reversal thereof and during action of the draw string threading needle means.

35. A bag stringing machine comprising draw string threading needles, reversing grippers and a plunger gripper coacting therewith for reversing successive bags, said plunger gripper entering the bags through the mouths thereof, a plunger-like member adapted to engage the bottom of successive bags to press a margin of the bottom area thereof into gripping relation with said plunger gripper, said reversing grippers rotating after connection with respective bags to maintain connection therewith after reversal of the bags, and said reversing grippers supporting successive bags in a draw string threading position with respect to said needles.

36. A bag stringing machine comprising draw string threading needles, reversing grippers and a plunger gripper coacting therewith for reversing successive bags, said plunger gripper entering the bags through the mouths thereof, a pin action means engageable with two opposite sides of successive bags for opening the mouths thereof preparatory to entry of said plunger gripper, a plunger-like member adapted to engage the bottom of successive bags to press a margin of the bottom area thereof into gripping relation with said plunger gripper, said reversing grippers rotating after connection with respective bags to maintain connection therewith after reversal of the bags, and said reversing grippers supporting successive bags in a draw string threading position with respect to said needles.

37. A bag stringing machine comprising draw string threading needles, reversing grippers and a plunger gripper coacting therewith for reversing successive bags, said plunger gripper entering the bags through the mouths thereof, two pin actions engageable with opposite sides of the respective bags for opening the mouths thereof preparatory to entry of said plunger gripper, a plunger-like member adapted to engage the bottom of successive bags to press a margin of the bottom area thereof into gripping relation with said plunger gripper, said reversing grippers rotating after connection with respective bags to maintain connection therewith after reversal of the bags, and said reversing grippers supporting successive bags in a draw string threading position with respect to said needles.

38. A bag stringing machine for bags having side seams located on the bags to provide flaps extending along the side margins of the bags, draw string threading needles and means for actuating the needles, reversing grippers having pinch elements for connection with flaps of successive bags exteriorly thereof and a plunger gripper coacting therewith for reversing the bags, said plunger gripper entering the successive bags through the mouths thereof, a plunger-like member adapted to engage the bottoms of successive bags to press a margin of the bottom area thereof into gripping relation with said plunger gripper, said reversing grippers rotating and said pinch elements retaining their grasp on said flaps after reversal of the bags, and said pinch elements supporting successive bags in a needle threading position with respect to said needles.

39. A bag stringing machine comprising a guide for bags having continuous side seam threads connecting the bags in chain formation and the side seam threads located on the bags to provide flaps extending along the side margins of the bags, draw string threading needles and means for actuating the needles, reversing grippers having pinch elements for connection with flaps of successive bags exteriorly thereof and a plunger gripper coacting therewith for reversing the bags, said plunger gripper entering the successive bags through the mouths thereof, a plunger-like member adapted to engage the bottoms of successive bags to press a margin of the bottom area thereof into gripping relation with said plunger gripper, said reversing grippers rotating and said pinch elements retaining their grasp on said flaps after reversal of the bags, said pinch elements supporting successive bags in a needle threading position with respect to said needles, a carriage having gripper devices for connection with the foremost bag in the chain to advance the bag to said reversing grippers, side seam thread cutters carried by said carriage, and means for actuating said thread cutters for severing the foremost bag from the chain.

40. A bag stringing machine for bags having side seam threads along their side margins connecting the bags in chain formation, a guide for the chain of bags, draw string threading needles and means for actuating the needles, reversing grippers and bag reversing means coacting with the grippers for reversing successive bags, said reversing grippers supporting the successive bags in a draw string threading position with respect to said needles, a carriage having second grippers for connection with the foremost bag in the chain to advance the latter on said guide and the bag to said reversing grippers and reversing means, scissors units carried by said carriage for severing said side seam threads between the respective bags, said scissors units having a predetermined fixed spacing with respect to said second grippers to sever the side seam threads a predetermined distance from the adjacent end of the foremost bag, and means for actuating said scissors units when said chain is advanced a predetermined distance on said guide.

41. A bag stringing machine for bags having side seam threads along their side margins connecting the bags in chain formation, a guide for the chain of bags, draw string threading needles and means for actuating the needles, reversing grippers and bag reversing means coacting with the grippers for reversing successive bags, said reversing grippers supporting the successive bags in a draw string threading position with respect to said needles, a carriage having grippers for connection with the foremost bag in the chain to advance the latter on said guide and the bag to said reversing grippers and reversing means, scissors units carried by said carriage for severing said side seam threads between the respective bags, said scissors units having a predetermined fixed spacing with respect to said carriage grippers to sever the side seam threads a predetermined distance from the adjacent end of the foremost bag, a common actuating means for said scissors units for actuating the latter when said chain is advanced a predetermined distance on said guide, the bags in said chain having their mouths at their leading ends with respect to movement of the chain along said guide, said reversing means comprising a plunger gripper actuated to be projected inside successive bags delivered to said reversing grippers and a plunger member actuated to press bottom areas of successive bags into gripping relation with said plunger gripper, and pin actions actuated to engage opposite sides of successive bags delivered to said reversing grippers for opening the mouths thereof to facilitate entry of said plunger gripper.

42. A bag stringing machine for bags having side seam threads along their side margins connecting the bags in chain formation, a guide for the chain of bags, draw string threading needles and means for actuating the needles, reversing grippers and bag reversing means coacting with the grippers for reversing successive bags, said reversing grippers supporting the successive bags in a draw string threading position with respect to said needles, a carriage having grippers for connection with the foremost bag in the chain to advance the latter on said guide and the bag to said reversing grippers and reversing means, scissors units carried by said carriage for severing said side seam threads between the respective bags, said scissors units having a predetermined fixed spacing with respect to said carriage grippers to sever the side seam threads a predetermined distance from the adjacent end of the foremost bag, means for actuating said scissors units when said chain is advanced a predetermined distance on said guide, the bags in said chain having their mouths at their leading ends with respect to movement of the chain along said guide, said reversing means comprising a plunger gripper actuated to be projected inside successive bags delivered to said reversing grippers and a plunger member actuated to press bottom areas of successive bags into gripping relation with said plunger gripper, pin actions actuated to engage opposite sides of successive bags delivered to said reversing grippers for opening the mouths thereof to facilitate entry of said plunger gripper, said plunger gripper being positioned above the plane of said guide and said plunger member being located below the plane of said guide, and said plunger gripper and the plunger member cooperatively meeting substantially in the plane of the guide.

43. A bag stringing machine comprising guide means for a chain of bags, draw string threading needle means, reversing gripper means and bag reversing means coacting with said gripper means for reversing successive bags, said gripper means supporting the successive bags in a draw string threading position with respect to said needle means, a carriage having gripper means for connection with the foremost bag in the chain to advance the bag to said reversing gripper means and said bag reversing means, a cutter means carried by said carriage, means for actuating said cutter means for severing the foremost bag from the chain, needle threader means for threading said draw string threading needle means with a draw string supply, puller means coacting with said draw string threading needle means for pulling the draw strings for length, cutters for severing the draw strings from the draw string supply, and knotters for tying the respective draw strings after threading of the latter through the successive bags by said draw string threading needle means.

44. A bag stringing machine comprising guide means for a chain of bags, draw string threading needle means, reversing gripper means and bag reversing means coacting with said gripper means for reversing successive bags, said gripper means supporting the successive bags in a draw string threading position with respect to said needle means, a carriage having gripper means for connection with the foremost bag in the chain to advance the bag to said reversing gripper means and said bag reversing means, a cutter means carried by said carriage, means for actuating said cutter means during travel of the foremost bag to said gripper means and said reversing means for severing successive foremost bags from the chain, said cutter means being definitely spaced with respect to said carriage gripper means to sever the bags from the chain at a predetermined distance from said carriage gripper means, bag positioning means actuated by a part of said carriage gripper means for prelocating the next foremost bag in the chain before being gripped by the carriage gripper means, needle threader means for threading said draw string threading needle means with a draw string supply, puller means coacting with said draw string threading needle means for pulling the draw strings for length, cutters for severing the draw strings from the draw string supply, and knotters for tying the respective draw strings after threading of the latter through the successive bags by said draw string threading needle means.

45. A bag stringing machine comprising a guide for bags having continuous side seam threads connecting the bags in chain formation, said side seam threads being located on the bags to provide flaps along the side margins of the bags, draw string threading needle means, reversing grippers and bag reversing means coacting with said reversing grippers for reversing successive bags, said grippers connecting with said flaps and arranged for supporting the successive bags in a draw string threading position with respect to said needle means, a carriage having grippers for connection with the foremost bag in the chain for advancing the bag to said reversing grippers and reversing means, a cutter means carried by said carriage for severing the side seam threads between the first two bags in the chain, means for actuating said cutter means during travel of the foremost bag to said reversing grippers and reversing means, needle threader means for threading said draw string threading needle means with a draw string supply, puller means coacting with said draw string threading needle means for pulling the draw strings for length, cutters for severing the draw strings from the draw string supply, and knotters for tying the respective draw strings after threading of the latter through the successive bags by said draw string threading needle means.

46. A bag stringing machine comprising a guide for bags having continuous side seam threads connecting the bags in chain formation, said side seam threads being located on the bags to provide flaps along the side margins of the bags, draw string threading needle means, reversing grippers and bag reversing means coacting with said reversing grippers for reversing successive bags, said grippers connecting with said flaps and arranged for supporting the successive bags in a draw string threading position with respect to said needle means, a carriage having grippers for connection with the foremost bag in the chain for advancing the bag to said reversing grippers and reversing means, a cutter means carried by said carriage for severing the side seam threads between the first two bags in the chain, said cutter means being located a predetermined distance from said carriage grippers to sever the side seam threads a predetermined distance from the bottom of the bag being severed from the chain, positioning means associated with said carriage grippers for prelocating the foremost bag in the chain before being gripped by said carriage grippers, needle threader means for threading said draw string threading needle means with a draw string supply, puller means coacting with said draw string threading needle means for pulling the draw strings for length, cutters for severing the draw strings from the draw string supply, and knotters for tying the respective draw strings after threading of the latter through the successive bags by said draw string threading needle means.

47. A bag stringing machine comprising a guide for bags having continuous side seam threads connecting the bags in chain formation, said side seam threads being located on the bags to provide flaps along the side margins of the bags, draw string threading needle means, reversing grippers and bag reversing means coacting with said reversing grippers for reversing successive bags, said grippers connecting with said flaps and arranged for supporting the successive bags in a draw string threading position with respect to said needle means, a carriage having grippers for connection with the foremost bag in the chain for advancing the bag to said reversing grippers and reversing means, a cutter means carried by said carriage for severing the side seam threads between the first two bags in the chain, said carriage grippers comprising abutments fixedly related to said carriage and a rock shaft carried by the carriage and provided with gripper arms coacting with said abutments, means for rocking said shaft to adjust the gripper arms relatively to said abutments, needle threader means for threading said draw string threading needle means with a draw string supply, puller means coacting with said draw string threading needle means for pulling the draw strings for length, cutters for severing the draw strings from the draw string supply, and knotters for tying the respective draw strings after threading of the latter through the successive bags by said draw string threading needle means.

48. A bag stringing machine comprising a guide for bags having continuous side seam threads connecting the bags in chain formation, said side seam threads being located on the bags to provide flaps along the side margins of the bags, draw string threading needle means, reversing grippers and bag reversing means coacting with said reversing grippers for reversing successive bags, said grippers connecting with said flaps and arranged for supporting the successive bags in a draw string threading position with respect to said needle means, a carriage having grippers for connection with the foremost bag in the chain for advancing the bag to said reversing grippers and reversing means, a cutter means carried by said carriage for severing the side seam threads between the first two bags in the chain, said first-mentioned gripper means clamping the bags along outer side margins adjacent the mouths thereof and rotating to retain their grasp on the bag after reversal thereof and during action of the draw string threading needle means, needle threader means for threading said draw string threading needle means with a draw string supply, puller means coacting with said draw string threading needle means for pulling the draw strings for length, cutters for severing the draw strings from the draw string supply, and knotters for tying the respective draw strings after threading of the latter through the successive bags by said draw string threading needle means.

49. A bag stringing machine comprising draw string threading needles, reversing grippers and a plunger gripper coacting therewith for reversing successive bags, said plunger gripper entering the bags through the mouths thereof, a plunger-like member adapted to engage the bottom of successive bags to press a margin of the bottom area thereof into gripping relation with said plunger gripper, said reversing grippers rotating after connection with respective bags to maintain connection therewith after reversal of the bags, said reversing grippers supporting successive bags in a draw string threading position with respect to said needles, needle threader means for threading said draw string threading needles with a draw string supply, puller means coacting with said draw string threading needles for pulling the draw strings for length, cutters for severing the draw strings from the draw string supply, and knotters for tying the respective draw strings after threading of the latter through the successive bags by said draw string threading needles.

50. A bag stringing machine comprising draw string threading needles, reversing grippers and a plunger gripper coacting therewith for reversing successive bags, said plunger gripper entering the bags through the mouths thereof, a pin action means engageable with two opposite sides of successive bags for opening the mouths thereof preparatory to entry of said plunger gripper, a plunger-like member adapted to engage the bottom of successive bags to press a margin of the bottom area thereof into gripping relation with said plunger gripper, said reversing grippers rotating after connection with respective bags to maintain connection therewith after reversal of the bags, said reversing grippers supporting successive bags in a draw string threading position with respect to said needles, needle threader means for threading said draw string threading needles with a draw string supply, puller means coacting with said draw string threading needles for pulling the draw strings for length, cutters for severing the draw strings from the draw string supply, and knotters for tying the respective draw strings after threading of the latter through the successive bags by said draw string threading needles.

51. A bag stringing machine comprising draw string threading needles, reversing grippers and a plunger gripper coacting therewith for reversing successive bags, said plunger gripper entering the bags through the mouths thereof, two pin actions engageable with opposite sides of the respective bags for opening the mouths thereof preparatory to entry of said plunger gripper, a plunger-like member adapted to engage the bottom of successive bags to press a margin of the bottom area thereof into gripping relation with said plunger gripper, said reversing grippers rotating after connection with respective bags to maintain connection therewith after reversal of the bags, said reversing grippers supporting successive bags in a draw string threading position with respect to said needles, needle threader means for threading said draw string threading needles with a draw string supply, puller means coacting with said draw string threading needles for pulling the draw strings for length, cutters for severing the draw strings from the draw string supply, and knotters for tying the respective draw strings after threading of the latter through the successive bags by said draw string threading needles.

52. A bag stringing machine for bags having side seams located on the bags to provide flaps extending along the side margins of the bags, draw string threading needles and means for actuating the needles, reversing grippers having pinch elements for connection with flaps of successive bags exteriorly thereof and a plunger gripper coacting therewith for reversing the bags, said plunger gripper entering the successive bags through the mouths thereof, a plunger-like member adapted to engage the bottoms of successive bags to press a margin of the bottom area thereof into gripping relation with said plunger gripper, said reversing grippers rotating and said pinch elements retaining their grasp on said flaps after reversal of the bags, said pinch elements supporting successive bags in a needle threading position with respect to said needles, needle threader means for threading said draw string threading needles with a draw string supply, puller means coacting with said draw string threading needles for pulling the draw strings for length, cutters for severing the draw strings from the draw string supply, and knotters for tying the respective draw strings after threading of the latter through the successive bags by said draw string threading needles.

53. A bag stringing machine comprising a guide for bags having continuous side seam threads connecting the bags in chain formation and the side seam threads located on the bags to provide flaps extending along the side margins of the bags, draw string threading needles and means for actuating the needles, reversing grippers having pinch elements for connection with flaps of successive bags exteriorly thereof and a plunger gripper coacting therewith for reversing the bags, said plunger gripper entering the successive bags through the mouths thereof, a plunger-like member adapted to engage the bottoms of successive bags to press a margin of the bottom area thereof into gripping relation with said plunger gripper, said reversing grippers rotating and said pinch elements retaining their grasp on said flaps after reversal of the bags, said pinch elements supporting successive bags in a needle threading position with respect to said needles, a carriage having gripper devices for connection with the foremost bag in the chain to advance the bag to said reversing grippers, side seam thread cutters carried by said carriage, needle threader means for threading said draw string threading needles with a draw string supply, puller means coacting with said draw string threading needles for pulling the draw strings for length, cutters for severing the draw strings from the draw string supply, and knotters for tying the respective draw strings after threading of the latter through the successive bags by said draw string threading needles.

54. A bag stringing machine for bags having side seam threads along their side margins connecting the bags in chain formation, a guide for the chain of bags, draw string threading needles and means for actuating the needles, reversing grippers and bag reversing means coacting with the grippers for reversing successive bags, said reversing grippers supporting the successive bags in a draw string threading position with respect to said needles, a carriage having second grippers for connection with the foremost bag in the chain to advance the latter on said guide and the bag to said reversing grippers and reversing means, scissors units carried by said carriage for severing said side seam threads between the respective bags, said scissors units having a predetermined fixed spacing with respect to said second grippers to sever the side seam threads a predetermined distance from the adjacent end of the foremost bag, a common actuating means for said scissors units for actuating the latter when said chain is advanced a predetermined distance on said guide, needle threader means for threading said draw string threading needles with a draw string supply, puller means coacting with said draw string threading needles for pulling the draw strings for length, cutters for severing the draw strings from the draw string supply, and knotters for tying the respective draw strings after threading of the latter through the successive bags by said draw string threading needles.

55. A bag stringing machine for bags having side seam threads along their side margins connecting the bags in chain formation, a guide for the chain of bags, draw string threading needles and means for actuating the needles, reversing grippers and bag reversing means coacting with the grippers for reversing successive bags, said reversing grippers supporting the successive bags in a draw string threading position with respect to said needles, a carriage having second grippers for connection with the foremost bag in the chain to advance the latter on said guide to said reversing grippers and reversing means, scissors units carried by said carriage for severing said side seam threads between the respective bags, said scissors units having a predetermined fixed spacing with respect to said second grippers to sever the side seam threads a predetermined distance from the adjacent end of the foremost bag, a common actuating means for said scissors units for actuating the latter when said chain is advanced a predetermined distance on said guide, the bags in said chain having their mouths at their leading ends with respect to movement of the chain along said guide, said reversing means comprising a plunger gripper actuated to be projected inside successive bags delivered to said reversing grippers and a plunger member actuated to press bottom areas of successive bags into gripping relation with said plunger gripper, pin actions actuated to engage opposite sides of successive bags delivered to said reversing grippers for opening the mouths thereof to facilitate entry of said plunger gripper, needle threader means for threading said draw string threading needles with a draw string supply, puller means coacting with said draw string threading needles for pulling the draw strings for length, cutters for severing the draw strings from the draw string supply, and knotters for tying the respective draw strings after threading of the latter through the successive bags by said draw string threading needles.

56. A bag stringing machine for bags having side seam threads along their side margins connecting the bags in chain formation, a guide for the chain of bags, draw string threading needles and means for actuating the needles, reversing grippers and bag reversing means coacting with the grippers for reversing successive bags, said reversing grippers supporting the successive bags in a draw string threading position with respect to said needles, a carriage having second grippers for connection with the foremost bag in the chain to advance the latter on said guide to said reversing grippers and reversing means, scissors units carried by said carriage for severing said side seam threads between the respective bags, said scissors units having a predetermined fixed spacing with respect to said second grippers to sever the side seam threads a predetermined distance from the adjacent end of the foremost bag, a common actuating means for said scissors units for actuating the latter when said chain is advanced a predetermined distance on said guide, the bags in said chain having their mouths at their leading ends with respect to movement of the chain along said guide, said reversing means comprising a plunger gripper actuated to be projected inside successive bags delivered to said reversing grippers and a plunger member actuated to press bottom areas of successive bags into gripping relation with said plunger gripper, pin actions actuated to engage opposite sides of successive bags delivered to said reversing grippers for opening the mouths thereof to facilitate entry of said plunger gripper, said plunger gripper being positioned above the plane of said guide and said plunger member being located below the plane of said guide, said plunger gripper and the plunger member cooperatively meeting substantially in the plane of the guide, needle threader means for threading said draw string threading needles with a draw string supply, puller means coacting with said draw string threading needles for pulling the draw strings for length, cutters for severing the draw strings from the draw string supply, and knotters for tying the respective draw strings after threading of the latter through the successive bags by said draw string threading needles.

57. The invention described in claim 43 wherein there is provided a bag collection hopper, said knotters partially tying the respective draw strings but retaining clamped connection therewith, and bag transfer means for moving the successive bags from the draw string threading position to said collection hopper after release of the bags by said reversing gripper means and said bag reversing means, said bag transfer means exerting a pull on the draw strings before the latter are released from their respective knotters to tighten the knots in the draw strings.

58. A bag stringing machine for bags having hems at their mouth ends, needle means for threading draw strings through the hems, means for actuating the needle means, bag reversing means supporting successive bags after reversal thereof in a draw string threading position with respect to the needle means, and means for feeding bags to said bag reversing means.

59. The invention described in claim 58 wherein there are provided knotters for knotting draw strings threaded through said hems.

60. The invention described in claim 58 wherein there are provided knotters for knotting draw strings threaded through said hems, a collection hopper, and means for transferring threaded bags to the collection hopper.

61. The invention described in claim 58 wherein there are provided threaders for said needle means, cutters for severing strings threaded in the needle means, and means for actuating said threaders and operatively connected with said cutters for actuating the latter.

62. The invention described in claim 58 wherein the needles are provided with string clamps, threaders for selectively threading the needle means from two string supplies, string pullers for respectively pulling strings threaded in the needle means for draw string lengths, cutters for severing the draw strings from the string supplies, and knotters for knotting the respective draw strings after threading of the latter through the hems.

63. The invention described in claim 58 wherein the bag reversing means comprises reversing grippers and a plunger gripper coacting therewith for reversing the bags, said plunger gripper entering the successive bags through the mouths thereof, pin actions engageable with the hems for opening the mouths of the bags to facilitate entry of the plunger gripper, and a plunger-like member adapted to engage the bottom of the successive bags to press margins of the bottoms thereof into gripping relation with said plunger gripper, said reversing grippers grasping the successive bags at their side margins adjacent the mouths thereof before reversal of the bags and rotating to lie partly inside the reversed bags for supporting the latter in a draw string threading position with respect to said needles.

64. The invention described in claim 58 wherein the bag reversing means comprises reversing grippers and a plunger gripper coacting therewith for reversing the bags, said plunger gripper entering the successive bags through the mouths thereof, pin actions engageable with the hems for opening the mouths of the bags to facilitate entry of the plunger gripper, a plunger-like member adapted to engage the bottom of the successive bags to press margins of the bottoms thereof into gripping relation with said plunger gripper, said reversing grippers grasping the successive bags at their side margins adjacent the mouths thereof before reversal of the bags and rotating to lie partly inside the reversed bags for supporting the latter in a draw string threading position with respect to said needles, said needles being connected and actuated as a unit and being provided with clamp means for securing the ends of the draw strings for passage through said hems, knotters for tying the respective draw strings, and string grippers for pulling the respective draw strings into operating relation with their respective knotters.

65. The invention described in claim 58 wherein the bag reversing means comprises reversing grippers and a plunger gripper coacting therewith for reversing the bags, said plunger gripper entering the successive bags through the mouths thereof, pin actions engageable with the hems for opening the mouths of the bags to facilitate entry of the plunger gripper, a plunger-like member adapted to engage the bottom of successive bags to press margins of the bottoms thereof into gripping relation with said plunger gripper, said reversing grippers grasping the successive bags at their side margins adjacent the mouths thereof before reversal of the bags and rotating to lie partly inside the reversed bags for supporting the latter in a draw string threading position with respect to said needles, said needles being connected and actuated as a unit and being provided with clamp means for securing the ends of the draw strings to the needles for passage through said hems, means for threading strings to the needles, means coacting with certain of said clamp means for pulling the strings to draw string length, means for cutting the draw strings from their respective supplies, knotters for tying the respective draw strings, and string grippers for pulling the respective draw strings into operating relation with respect to their respective knotters.

66. The invention described in claim 17 wherein said needle means are connected and actuated as a unit and are provided with clamp means for securing the ends of the draw strings to the needle means for passage through said bags, means for threading strings to the needle means, means coacting with certain of said clamp means for pulling the strings to draw string length, means for cutting the draw strings from their respective strings, knotters for tying the respective draw strings, and string grippers for pulling the respective draw strings into operating relation with respect to their respective knotters.

67. The invention described in claim 58 wherein said needle means are connected and actuated as a unit and are provided with clamp means for securing the ends of the draw strings to the needle means for passage through said bags, means for threading strings to the needle means, means coacting with certain of said clamp means for pulling the strings to draw string length, means for cutting the draw strings from their respective strings, knotters for tying the respective draw strings, and string grippers for pulling the respective draw strings into operating relation with respect to their respective knotters.

68. A bag stringing machine comprising first and second draw string threading needles each having an eye and being hollow with an abutment adjacent its eye, reversing grippers and a plunger gripper cooperating therewith for reversing successive bags, said reversing grippers supporting the bags in a needle threading position, first and second string clamps respectively operating inside said first and second draw string threading needles and coacting with their respective abutments for clamping the ends of a draw string, means for selectively actuating said string clamps, and needle actuating means for projecting the needles through the bag supported by said reversing grippers and for locating the needles in first and second string threading positions, a first threader for threading a string through the eyes of both needles in the first string threading position thereof, said means actuating said second string clamp for securing the string against the abutment of the second needle, a pull means operating between the needles and actuated for drawing the string to draw string length, said first-mentioned means being fashioned to bring the first string clamp into clamping relation with the abutment of the first needle after pulling the draw string for length, a first cutter actuated to sever the string after securing of both ends of the draw string by said clamps, a draw string gripper for clamping the ends of the draw string after threading of the latter through the bag and location of the needles in said second string threading position, said first-mentioned means moving said string clamps to non-clamping positions in the second string threading position, a first knotter coacting with said string gripper to fashion a knot in the draw string, a second threader for threading a string through the eyes of the needles in their second needle threading position, a pull means operating between said needles and actuated to pull the second string for length to fashion a second draw string, said first-mentioned means actuating said second clamp to secure the end of said second string before being pulled to draw string length, said first-mentioned means bringing said first clamp into clamping relation with its respective abutment to secure the other end of the draw string, a cutter for severing the second string to detach the second draw string therefrom, a second string gripper arranged to clamp the ends of said second draw string when said needles are moved to their first needle threading position, a second knotter coacting with said second string gripper for fashioning a knot in said second draw string, and said first-mentioned means moving said string clamps to non-clamping positions after connection of the second draw string with said second string gripper.

BERTIE C. GOLDEN.